United States Patent
Laroia et al.

(10) Patent No.: US 7,898,983 B2
(45) Date of Patent: Mar. 1, 2011

(54) METHODS AND APPARATUS SUPPORTING TRAFFIC SIGNALING IN PEER TO PEER COMMUNICATIONS

(75) Inventors: Rajiv Laroia, Far Hills, NJ (US); Junyi Li, Bedminster, NJ (US); Aleksandar Jovicic, Urbana, IL (US); Thomas Richardson, South Orange, NJ (US); Xinzhou Wu, Monmouth Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 429 days.

(21) Appl. No.: 11/773,947

(22) Filed: Jul. 5, 2007

(65) Prior Publication Data

US 2009/0010179 A1    Jan. 8, 2009

(51) Int. Cl.
*G01R 31/08* (2006.01)

(52) U.S. Cl. .................. 370/254; 370/320; 370/324; 370/335; 370/349; 342/387; 342/450; 342/456; 342/465; 455/438; 455/456; 455/456.6; 455/561

(58) Field of Classification Search .................. 370/320, 370/324, 335, 342, 349; 342/387, 450, 456, 342/465; 455/438, 456, 456.5, 456.6, 560, 455/561
See application file for complete search history.

(56) References Cited

U.S. PATENT DOCUMENTS

| | | | |
|---|---|---|---|
| 5,396,543 A * | 3/1995 | Beeson et al. ............... | 455/560 |
| 5,774,450 A | 6/1998 | Harada et al. | |
| 5,943,375 A | 8/1999 | Veintimilla | |
| 6,058,106 A | 5/2000 | Cudak et al. | |
| 6,144,653 A * | 11/2000 | Persson et al. ............... | 370/337 |
| 6,477,382 B1 * | 11/2002 | Mansfield et al. ........... | 455/458 |

(Continued)

FOREIGN PATENT DOCUMENTS

EP    1367783 A1    12/2003

(Continued)

OTHER PUBLICATIONS

International Search Report and Written Opinion, PCT/US08/068244 - International Search Authority - European Patent Office - Nov. 26, 2008.

(Continued)

*Primary Examiner*—Ayaz R Sheikh
*Assistant Examiner*—Andrew C Lee
(74) *Attorney, Agent, or Firm*—James K. O'Hare

(57) ABSTRACT

Methods and apparatus related to peer to peer communication networks are described. An active connection list is maintained by a wireless communications device supporting peer to peer communications. In various embodiments, the active connection identifier list being maintained is in addition to a list of discovered peers in the local vicinity. Paging signaling, e.g., peer to peer paging signaling, is used to establish active connections. Air link peer to peer traffic resources include traffic control resources and traffic data resources. A wireless communications device seeking to transmit on a traffic data resource transmits a traffic request signal on a traffic control resource. An active connection identifier is, in some embodiments, associated with a particular subset of traffic control resources. Thus, a wireless communications device monitors the portion or portions of the traffic control resource corresponding to its active connections for traffic request signals, but need not monitor other portions.

46 Claims, 31 Drawing Sheets

U.S. PATENT DOCUMENTS

| | | |
|---|---|---|
| 6,483,856 B1 | 11/2002 | Bird |
| 6,614,810 B1 * | 9/2003 | Lee et al. .................... 370/471 |
| 6,681,115 B1 * | 1/2004 | McKenna et al. ........... 455/517 |
| 6,894,975 B1 | 5/2005 | Partyka |
| 7,027,415 B1 * | 4/2006 | Dahlby et al. ............... 370/322 |
| 7,218,623 B1 * | 5/2007 | Proctor, Jr. .................. 370/335 |
| 7,313,120 B2 | 12/2007 | Ekberg et al. |
| 7,342,895 B2 * | 3/2008 | Serpa et al. ................. 370/254 |
| 7,356,022 B2 * | 4/2008 | Takano et al. ............... 370/350 |
| 7,570,615 B2 * | 8/2009 | Bolin et al. ................. 370/329 |
| 7,684,381 B2 | 3/2010 | Schrum, Jr. et al. |
| 7,706,822 B2 | 4/2010 | Emeott et al. |
| 2002/0159401 A1 | 10/2002 | Boger |
| 2002/0163894 A1 * | 11/2002 | Alapuranen et al. ......... 370/335 |
| 2003/0147426 A1 | 8/2003 | Cronin et al. |
| 2004/0001429 A1 * | 1/2004 | Ma et al. .................... 370/210 |
| 2004/0047328 A1 * | 3/2004 | Proctor et al. ............... 370/342 |
| 2004/0090929 A1 | 5/2004 | Laux et al. |
| 2004/0116143 A1 * | 6/2004 | Love et al. .................. 455/522 |
| 2004/0125776 A1 * | 7/2004 | Haugli et al. ................ 370/338 |
| 2004/0156485 A1 | 8/2004 | Poustchi et al. |
| 2004/0204850 A1 | 10/2004 | MacNeille et al. |
| 2004/0246915 A1 | 12/2004 | Watanabe |
| 2005/0020262 A1 | 1/2005 | Kim |
| 2005/0117525 A1 | 6/2005 | Poustchi et al. |
| 2005/0177639 A1 | 8/2005 | Reunamaki et al. |
| 2005/0265306 A1 | 12/2005 | Schrum, Jr. et al. |
| 2006/0013160 A1 | 1/2006 | Haartsen |
| 2006/0140215 A1 | 6/2006 | Fleming |
| 2007/0058661 A1 | 3/2007 | Chow |
| 2007/0070943 A1 | 3/2007 | Livet et al. |
| 2007/0189249 A1 | 8/2007 | Gurevich et al. |

FOREIGN PATENT DOCUMENTS

| | | |
|---|---|---|
| EP | 2012479 A1 | 1/2009 |
| WO | WO0186859 A2 | 11/2001 |
| WO | WO2005076533 | 8/2005 |
| WO | WO2005076543 | 8/2005 |
| WO | WO2007038129 | 4/2007 |
| WO | WO2007082249 | 7/2007 |
| WO | WO2007082252 | 7/2007 |
| WO | WO2009009313 | 1/2009 |

OTHER PUBLICATIONS

Chuprun S., et al: "Comparison of FH/CDMA and DS/CDMA for wireless survivable networks" Universal Personal Communications 1998. ICUPC '98. IEEE 1998 International Conference on Florence, Italy Oct. 5-9, 1998, New York, NY, USA, IEEE, US, vol. 2, Oct. 5, 1998, pp. 1305-1309, XP010315050.

* cited by examiner

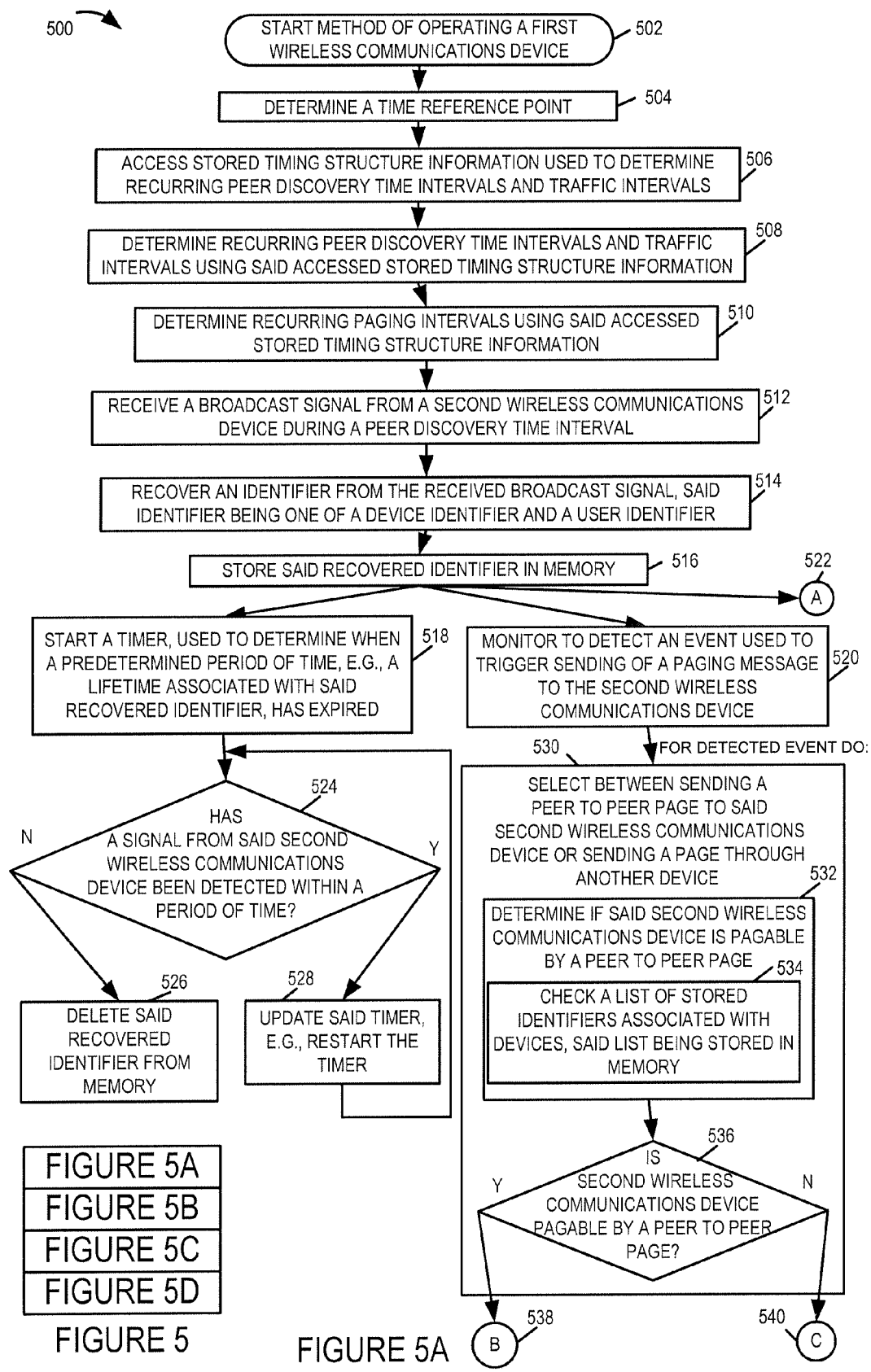

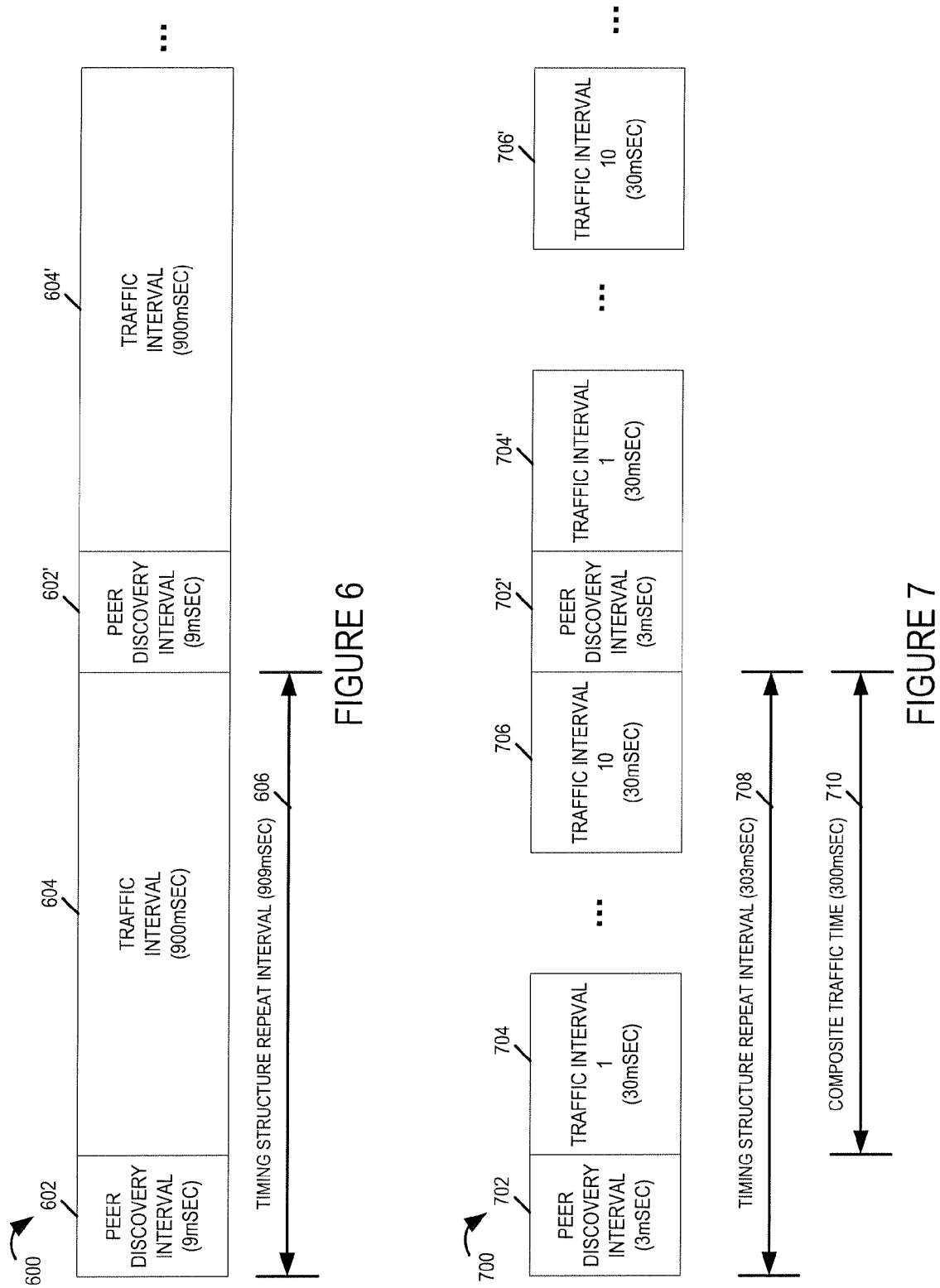

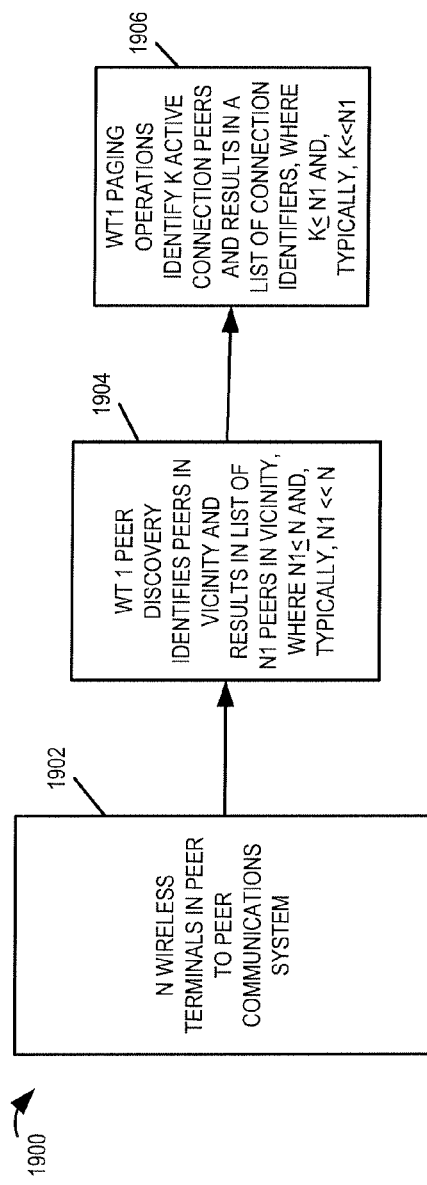
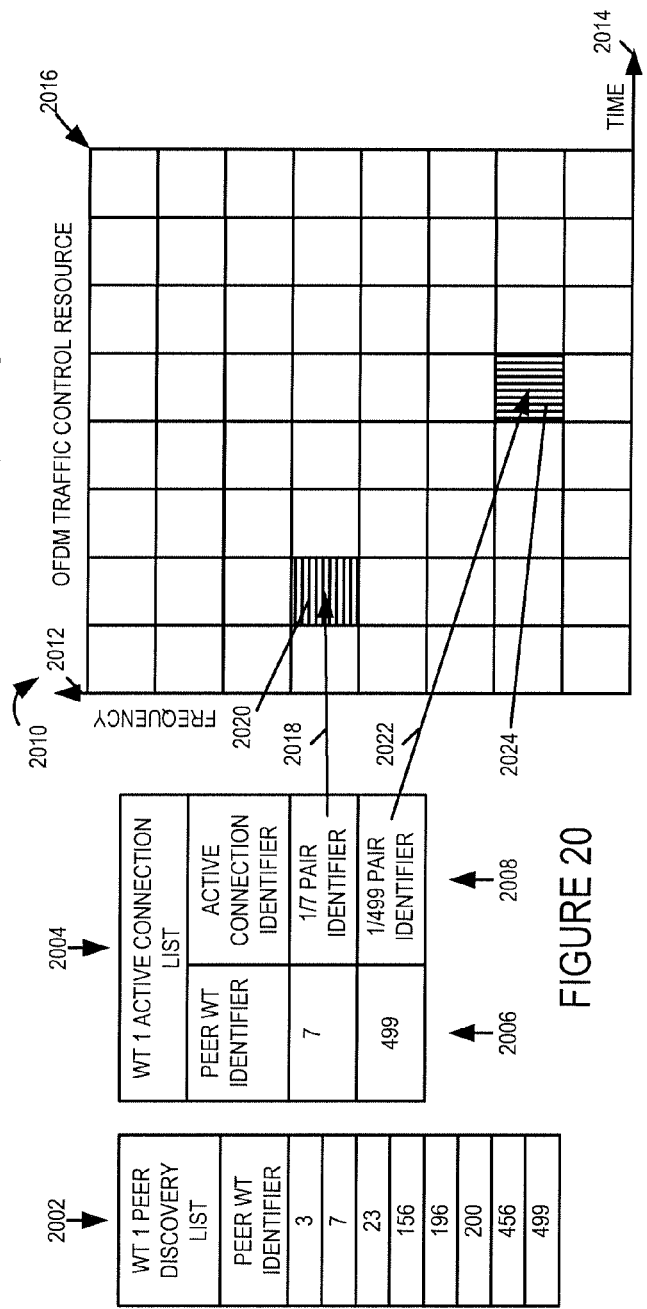
FIGURE 19
FIGURE 20

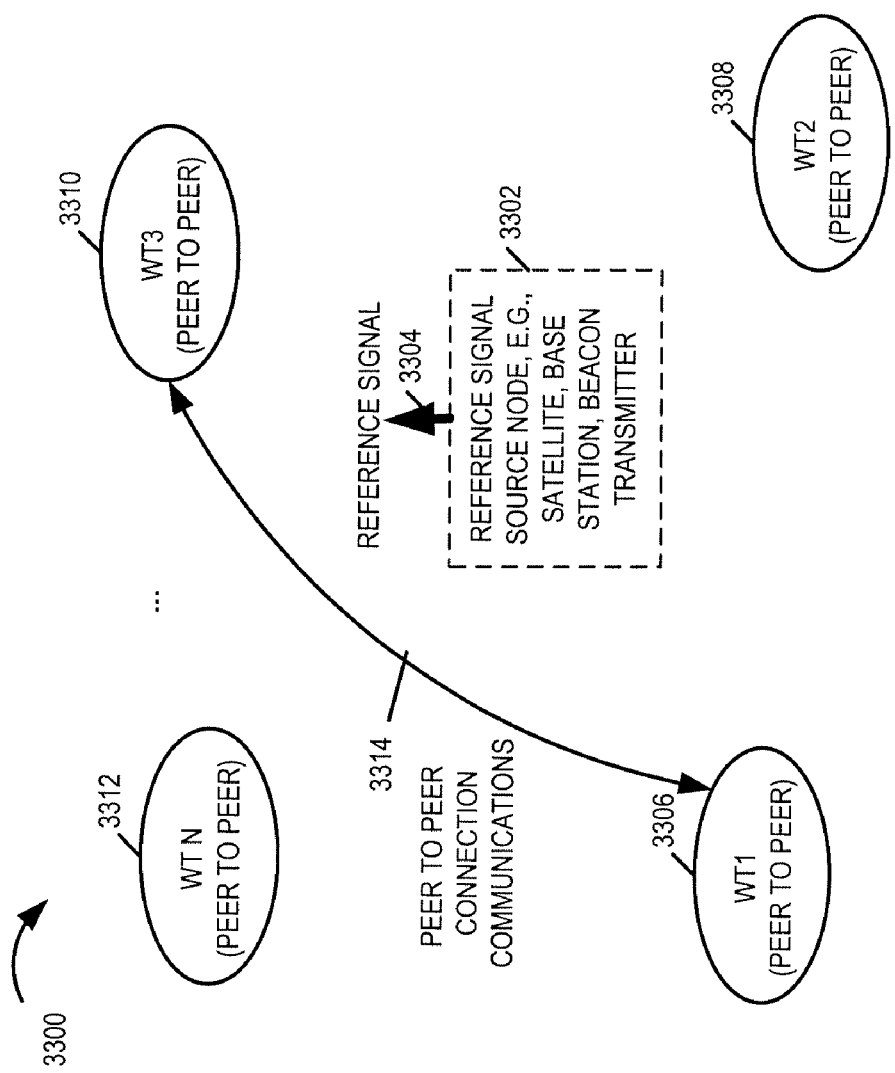

METHODS AND APPARATUS SUPPORTING TRAFFIC SIGNALING IN PEER TO PEER COMMUNICATIONS

FIELD

Various embodiments are directed to methods and apparatus for wireless communication, more particularly, to methods and apparatus for use in peer to peer wireless communication.

BACKGROUND

Wireless communications devices are common place. Many cellular systems use centralized controllers and/or other network based control mechanisms to control wireless device operation so that cellular devices operate in an efficient and relatively synchronized manner. Unfortunately, in peer to peer systems such centralized control and/or network based synchronization mechanisms are normally lacking.

In the case of peer to peer systems, it would be desirable if peer devices could discover the presence of other peer devices in the vicinity, detect when peer devices leave the vicinity and/or use knowledge of the presence of particular devices and/or the state of activity of such devices to make communication and/or paging decisions. It would also be desirable if a peer device could take active device information into consideration when making one or more communications and/or resource utilization decisions.

SUMMARY

Methods and apparatus related to peer to peer communication networks are described. A peer to peer active connection list is maintained by a wireless communications device supporting peer to peer communications. In various embodiments, the active connection identifier list being maintained is in addition to a list of discovered peers in the local vicinity. Paging signaling, e.g., peer to peer paging signaling, is used to establish active connections. Air link peer to peer traffic resources include traffic control resources and traffic data resources. A wireless communications device seeking to transmit on a traffic data resource transmits a traffic request signal on a traffic control resource. An active connection identifier is, in some embodiments, associated with a particular subset of traffic control resources. Thus, a wireless communications device, in some embodiments, monitors the portion or portions of the traffic control resource corresponding to its active connections for traffic request signals, but need not monitor other portions. In some embodiments, the traffic control resource associated with a particular connection identifier is hopped over time in accordance with a predetermined hopping sequence. In some embodiments, a traffic control resource used for communicating a traffic request signal has a predetermined association to a particular traffic data resource, e.g., traffic data segment, in the peer to peer timing structure.

One exemplary embodiment includes a peer to peer recurring timing structure including peer discovery intervals, paging intervals, and traffic intervals. In some but not necessarily all such embodiments, the following event sequence occurs for the communication of user data in a peer to peer traffic segment. (1) Two peer wireless communications devices are powered on in a local vicinity and are coarsely synchronized with respect to the same peer to peer timing structure; (2) at least one of the wireless communications devices performs a peer discovery operation during a peer discovery interval detecting the presence of the other wireless communications device; (3) one of the wireless communications devices sends a page signal to the other wireless communications device; (4) an active connection is established; (5) one of the communications devices sends a traffic request signal to the other wireless communications device using a traffic control resource corresponding to the active connection; and (6) the wireless communications device which sent the traffic request signal sends traffic data using a traffic data resource. Some other embodiments include portions of the previously described sequence, e.g., one or more steps of the sequence. Some embodiments may use less than the full set of steps described in the exemplary sequence discussed above.

An exemplary method of operating a first communications device, in accordance with various embodiments includes: maintaining a list of active connection identifiers corresponding to communications devices with which said first communications device has received or sent at least one paging signal; and monitoring a traffic control resource during a traffic interval for a traffic request signal corresponding to at least one connection identifier included in said list of active connection identifiers.

An exemplary first communications device supporting peer to peer wireless operations in accordance with various embodiments includes: an active connection list maintenance module for maintaining a list of active connection identifiers corresponding to communications devices with which said first communications device has received or sent at least one paging signal; and a traffic resource request monitoring module for monitoring a traffic control resource during a traffic interval for a traffic request signal corresponding to at least one connection identifier included in said list of active connection identifiers.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIG. 6 is a drawing illustrating an exemplary peer to peer timing structure used by wireless terminals in accordance with various embodiments.

FIG. 7 is a drawing illustrating an exemplary peer to peer timing structure used by wireless terminals in accordance with various embodiments.

FIG. 19 is a drawing illustrating the refinement of monitoring, by a wireless terminal, as a function of peer discovery operations and paging operations in accordance with various embodiments.

FIG. 20 is a drawing illustrating an example corresponding to FIG. 19 and further illustrating that the wireless terminal determines a portion or portions of the traffic control resources to use as a function of a connection identifier list.

FIG. 33 is a drawing of an exemplary peer to peer communications network in accordance with various embodiments.

DETAILED DESCRIPTION

Figure 1:
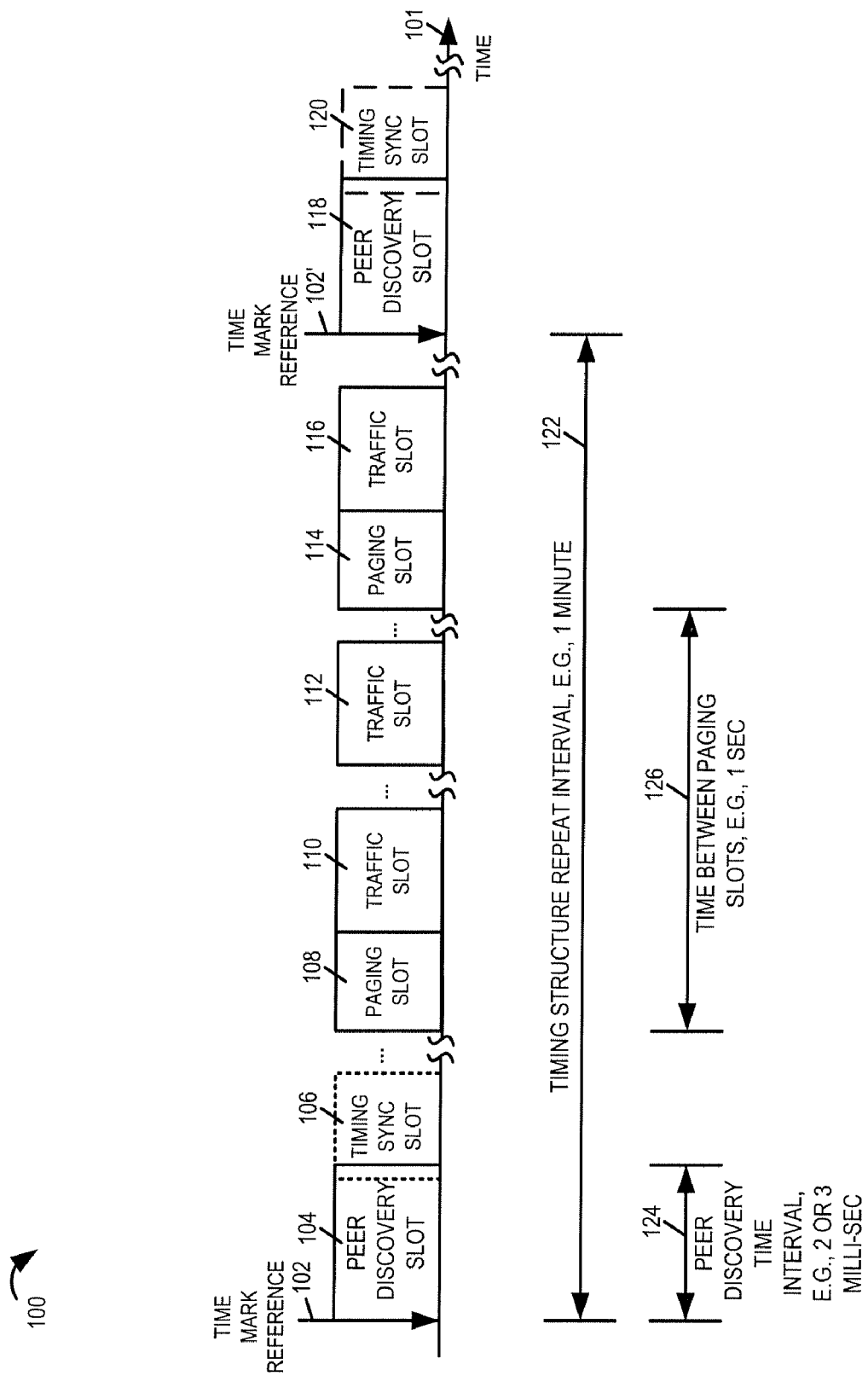
FIG. 1 is drawing of an exemplary recurring peer to peer communications system timing structure in accordance with various embodiments.

FIG. 1 is drawing of an exemplary recurring peer to peer communications system timing structure 100 in accordance with various embodiments. The exemplary timing structure 100 includes a plurality of different types of slots including a peer discovery slot type, a timing synchronization slot type, a paging slot type, and a traffic slot type. In some embodiments, a timing synchronization slot is included as part of a peer discovery slot. In some other embodiments, a timing synchronization slot is non-overlapping with a timing synchronization slot, e.g., a timing synchronization slot follows a peer discovery slot.

A first iteration of the exemplary recurring peer to peer communications system timing structure 100, which starts at time mark reference 102, has a timing structure repeat interval 122, includes peer discovery slot 104, timing synchronization slot 106, paging slot 108, traffic slot 110, traffic slot 112, paging slot 114 and traffic slot 116. A second iteration of the exemplary recurring peer to peer communication system timing structure has the same set of slot types in the same order. The second iteration of the exemplary recurring peer to peer communication system timing structure starts at time mark reference 102' and includes peer discovery slot 118 and timing synchronization slot 120.

The duration of the timing structure repeat interval 122 is much larger than the duration of any individual slot. The duration of the timing structure repeat time interval is, e.g., 1 minute in duration. The duration of the peer discovery time interval 124 is, e.g., 2 or 3 milli-seconds in duration. The duration of the time between successive paging slots 126 is, e.g., 1 sec in duration. In various embodiments with regard to one iteration of the timing structure, the number of peer discovery slots is less than the number of paging slots, and the number of paging slots is less than or equal to the number of traffic slots. In some embodiments, there is only one peer discovery slot per iteration of the recurring timing structure. In various embodiments with regard to one iteration of the timing structure, the amount of time allocated to traffic slots is greater than the combined amount of time allocated to peer discovery and paging slots. In some such embodiments, the amount of time allocated to traffic is much larger than the combined amount of time allocated to peer discovery and paging slots, e.g., at least 5 times larger.

Figure 2:
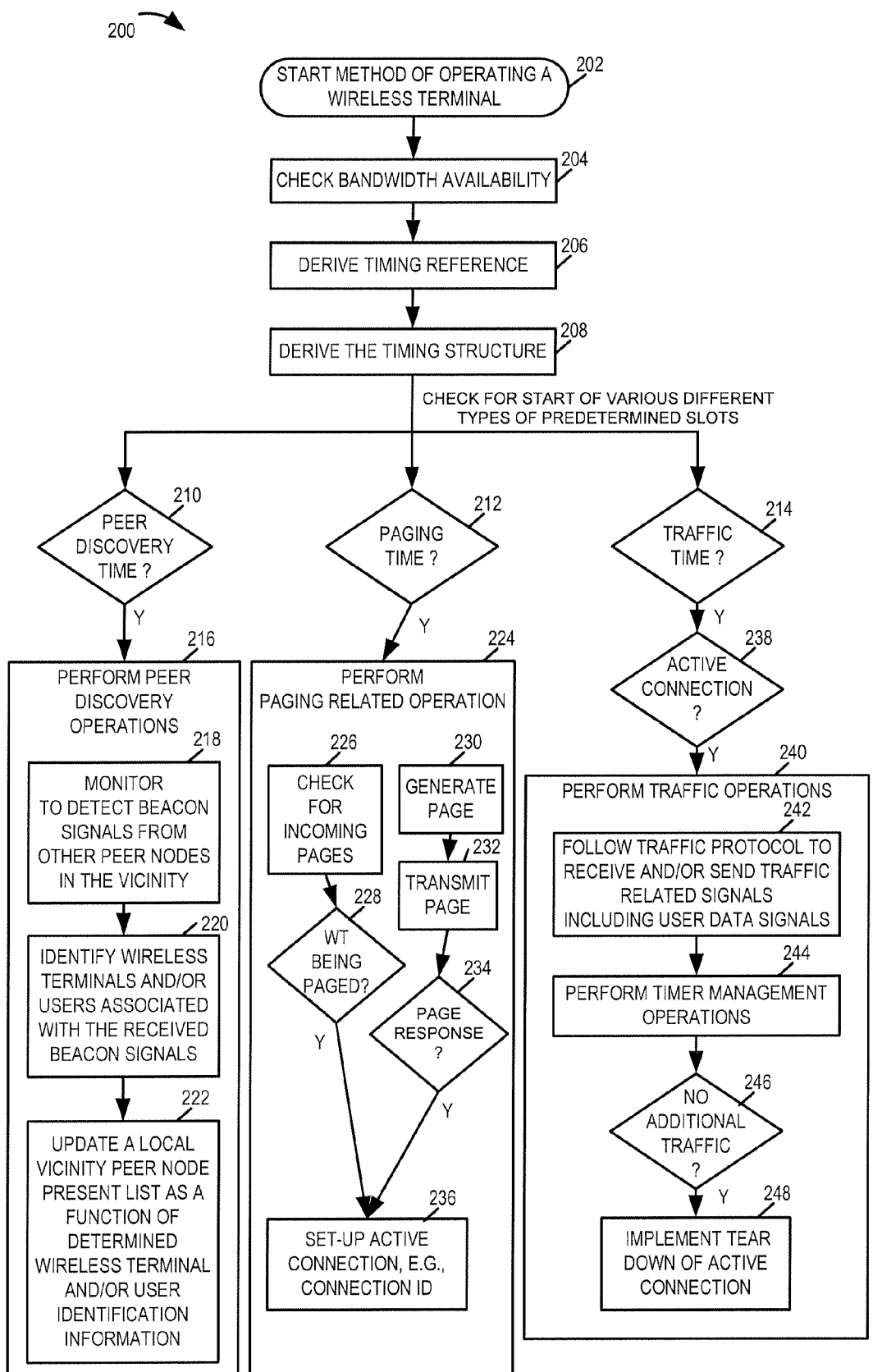
FIG. 2 is a flowchart of an exemplary method of operating a wireless terminal as part of a peer to peer communications system in accordance with various embodiments.

FIG. 2 is a flowchart 200 of an exemplary method of operating a wireless terminal as part of a peer to peer communications system in accordance with various embodiments. Operation starts in step 202, where the wireless terminal is powered on and initialized and proceeds to step 204. In step 204, the wireless terminal checks for bandwidth availability. Then, in step 206 the wireless terminal derives a timing reference and in step 208, the wireless terminal derives the timing structure. Operation proceeds from step 208 to steps 210, 212 and 214, where the wireless terminal checks, on an ongoing basis, for different types of predetermined slots being used in the peer to peer communication system recurring timing structure, e.g., a timing structure such as timing structure 100 illustrated in FIG. 1.

In step 210, the wireless terminal checks if it is time to perform peer discovery, and if it is, then operation proceeds from step 210 to step 216. In step 212, the wireless terminal checks if it is time allocated to perform paging operations, and if it is, then operation proceeds from step 212 to step 224. In step 214, the wireless terminal checks if it is time allocated to perform traffic operations, and if it is, then operation proceeds from step 214 to step 238.

In step 216, the wireless terminal performs peer discovery operations. Step 216 includes sub-steps 218, 220 and 222. In sub-step 218, the wireless terminal monitors to detect beacon signals from other peer nodes in the vicinity, and then in sub-step 220 the wireless terminal identifies wireless terminal and/or users associated with the received beacon signals. Operation proceeds from sub-step 220 to sub-step 222. In sub-step 222, the wireless terminal updates a local vicinity peer node present list as a function of determined wireless terminal and/or user identification information. In various embodiments, in at least some iterations of step 216, the wireless terminal, in addition to or in place of sub-steps in step 216, transmits a beacon signal to announce its presence to other wireless terminals in the vicinity.

In step 224, the wireless terminal performs paging related operations. Step 224 includes sub-steps 226, 228, 230, 232, 234 and 236. Different sub-steps may be, and sometimes are, performed at different times, e.g., in response to wireless terminal needs and/or interests and/or as a function of attributes of a particular paging slot, e.g., information identifying wireless terminals which can be paged in that particular slot. In sub-step 226, the wireless terminal checks for incoming pages. Operation proceeds from step 226 to step 228, where the wireless terminal checks the detected incoming pages and determines if the wireless terminal is being paged. If the wireless terminal determines that it is being paged, then operation proceeds from sub-step 228 to sub-step 236. In sub-step 230, the wireless terminal generates a page, and then in sub-step 232 the wireless terminal transmits the page. Operation proceeds from sub-step 232 to sub-step 234, in which the wireless terminal monitors for a page response. If a page response is detected by the wireless terminal, then operation proceeds from sub-step 234 to sub-step 236. In sub-step 236, the wireless terminal sets up an active connection. The active connection set-up includes, e.g., the communication of a connection identifier.

Returning to step 238, in step 238, the wireless terminal determines if there is an active connection, and if there is then operation proceeds to step 240, where the wireless terminal performs traffic operations. If there is not a current active connection, then the wireless terminal, in some embodiments, performs no further action with regard to the traffic slot, e.g., the wireless terminal goes into a power saving mode with regard to traffic slot. Step 240 includes sub-steps 242, 244 246 and 248. In sub-step 242, the wireless terminal follows traffic protocol rules to receive and/or send traffic related signals including user data signals. In sub-step 244, the wireless terminal performs timer management operations and in sub-step 246, the wireless terminal decides whether or not there is additional traffic to be communicated. If the wireless terminal determines in sub-step 246 that there is no additional traffic, then operation proceeds to sub-step 248 where the wireless terminal implements the tear down of the active connection. If there is still additional traffic to be communicated the active connection is left intact, e.g., and additional traffic can be communicated during a subsequent traffic slot.

Figure 3:
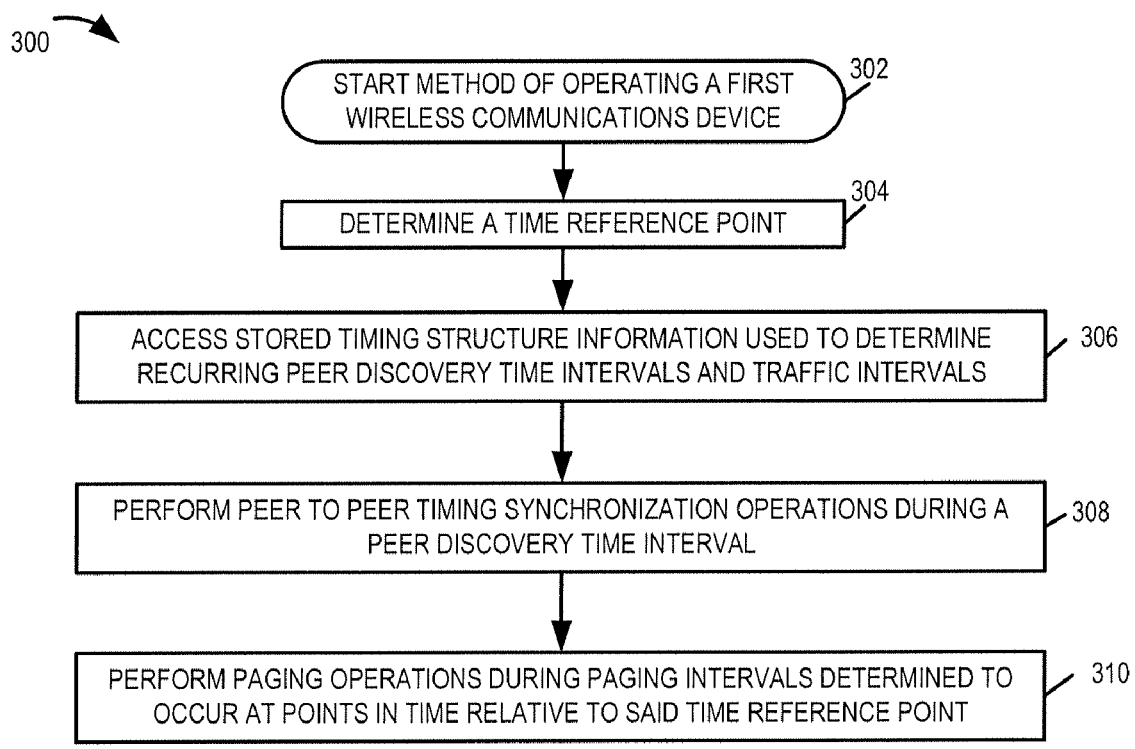
FIG. 3 is a flowchart of an exemplary method of operating a first communications device, e.g., a mobile node using OFDM signaling and supporting peer to peer communications, in accordance with various embodiments.

FIG. 3 is a flowchart 300 of an exemplary method of operating a first communications device, e.g., a mobile node using OFDM signaling and supporting peer to peer communications, in accordance with various embodiments. Operation starts in step 302, where the first communications device is powered on and initialized and proceeds to step 304, where the first communications device determines a time reference point. Operation proceeds from step 304 to step 306, in which the first communications device accesses stored timing structure information used to determine recurring peer discovery time intervals and traffic intervals. In various embodiments, the accessed stored timing information further includes information used to determine recurring paging intervals. In various embodiments, the stored timing structure information indicates that multiple paging time intervals occur between peer discovery time intervals during at least one period of time for which timing structure information is stored. In some embodiments, the traffic intervals occupy more time than the time occupied by the combination of paging time intervals and peer discovery time intervals during one iteration of a communications timing structure defined by said stored timing structure information. Operation proceeds from step 306 to step 308. In step 308, the first wireless communication device performs a peer to peer timing synchronization operation during a peer discovery time interval. In some other embodiments, the first wireless terminal performs peer to peer timing synchronization operation during a timing/synchronization time interval following a peer discovery time interval. Operation proceeds from step 308 to step 310. In step 310, the first wireless communications device performs paging operations during paging intervals determined to occur at points in time relative to said time reference point.

Figure 4:
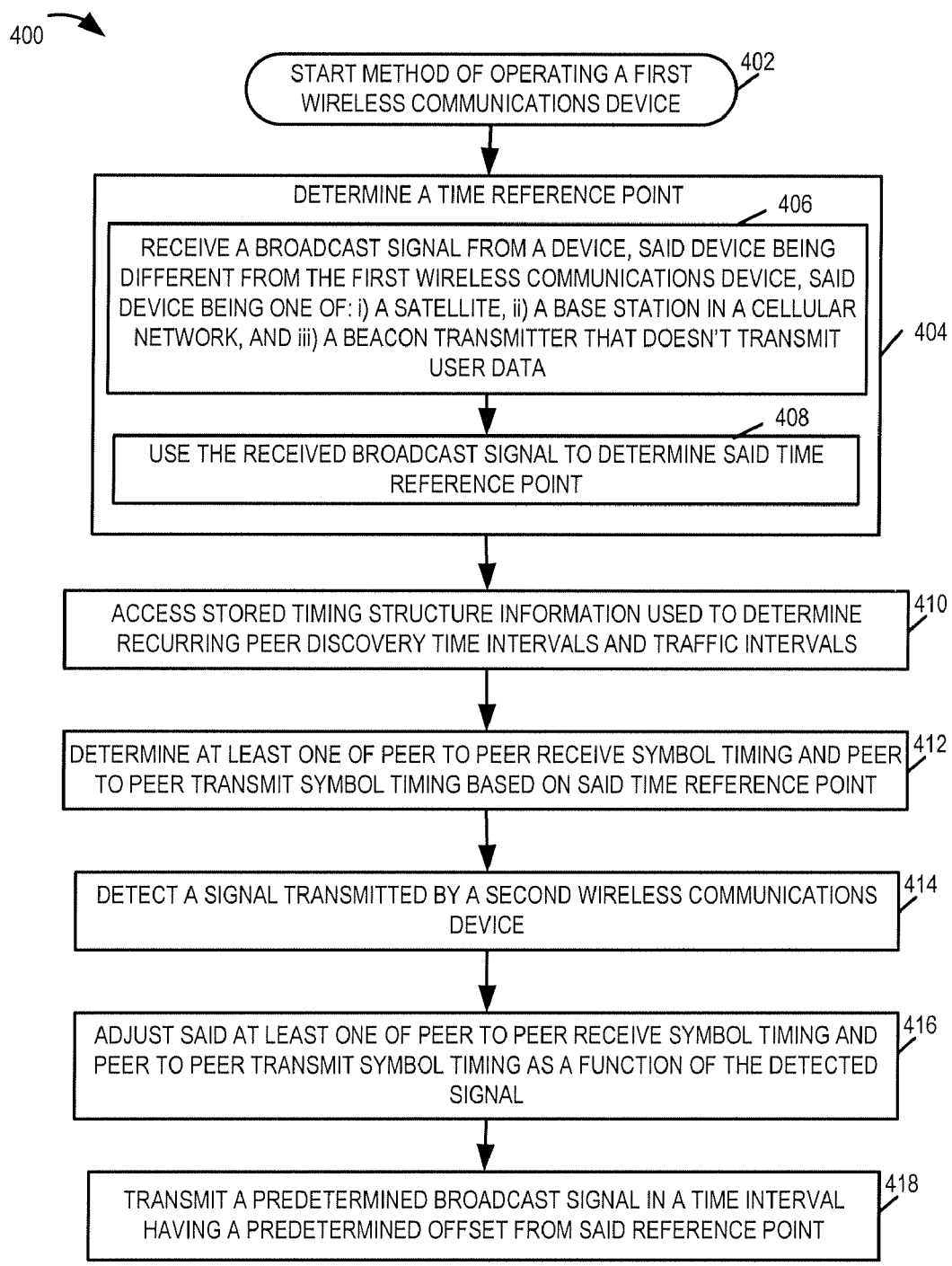
FIG. 4 is a flowchart of an exemplary method of operating a first wireless communications device, e.g., a wireless terminal such as a mobile node supporting peer to peer operations and using OFDM signaling, in accordance with various embodiments.

FIG. 4 is a flowchart 400 of an exemplary method of operating a first wireless communications device, e.g., a wireless terminal such as a mobile node supporting peer to peer operations and using OFDM signaling, in accordance with various embodiments. Operation starts in step 402, where the first wireless communications device is powered on and initialized and proceeds to step 404. In step 404, the first wireless communications device determines a time reference point. Step 404 includes sub-steps 406 and 408. In sub-step 406, the first wireless communications device receives a broadcast signal from a device, said device being different from the first wireless communications device, said device being one of: i) a satellite, ii) a base station in a cellular network, and iii) a beacon transmitter that doesn't transmit user data. In some other embodiments, the received broadcast signal is from one of: i) a broadcast transmitter broadcasting a government or international body defined reference signal and ii) a broadcast transmitter transmitting a commercial broadcast signal such as a reference signal used in television and/or radio signals. Operation proceeds from sub-step 406 to sub-step 408. In sub-step 408, the first wireless communications device uses the received broadcast signal to determine the time reference point. Operation proceeds from step 404 to step 410.

In step 410, the first communications device accesses stored timing structure information used to determine recurring peer discovery time intervals and traffic intervals. In various embodiments, the accessed stored timing structure information also indicates where recurring timing synchronization intervals occur relative to the determined time reference point. Operation proceeds from step 410 to step 412. In step 412, the first wireless communications device determines at least one of peer to peer receive symbol timing and peer to peer transmit symbol timing based on said timing reference point. Then, in step 414, the first wireless communications device detects a signal transmitted by a second wireless communications device, e.g., another mobile node. The detected signal is, e.g., a traffic signal used to communicate user data. Alternatively, the detected signal is, e.g., a predetermined broadcast signal. The predetermined broadcast signal is, in some embodiments, one of: (i) a multi-tone time varying signal and (ii) a predetermined time varying NP sequence signal. In some embodiments, the predetermined broadcast signal is a signal received from the second wireless communications device in one of a plurality of recurring timing synchronization intervals. Operation proceeds from step 414 to step 416. In step 416, the wireless terminal adjusts at least one of peer to peer receive symbol timing and peer to peer transmit symbol timing as a function of the detected signal from step 414. Operation proceeds from step 416 to step 418. In step 418, the wireless terminal transmits a predetermined broadcast signal in a time interval having a predetermined offset from said reference point. In some embodiments, the broadcast signal is a beacon signal annunciating the first wireless communication device's presence and is transmitted in a peer discovery interval.

Figure 5B:
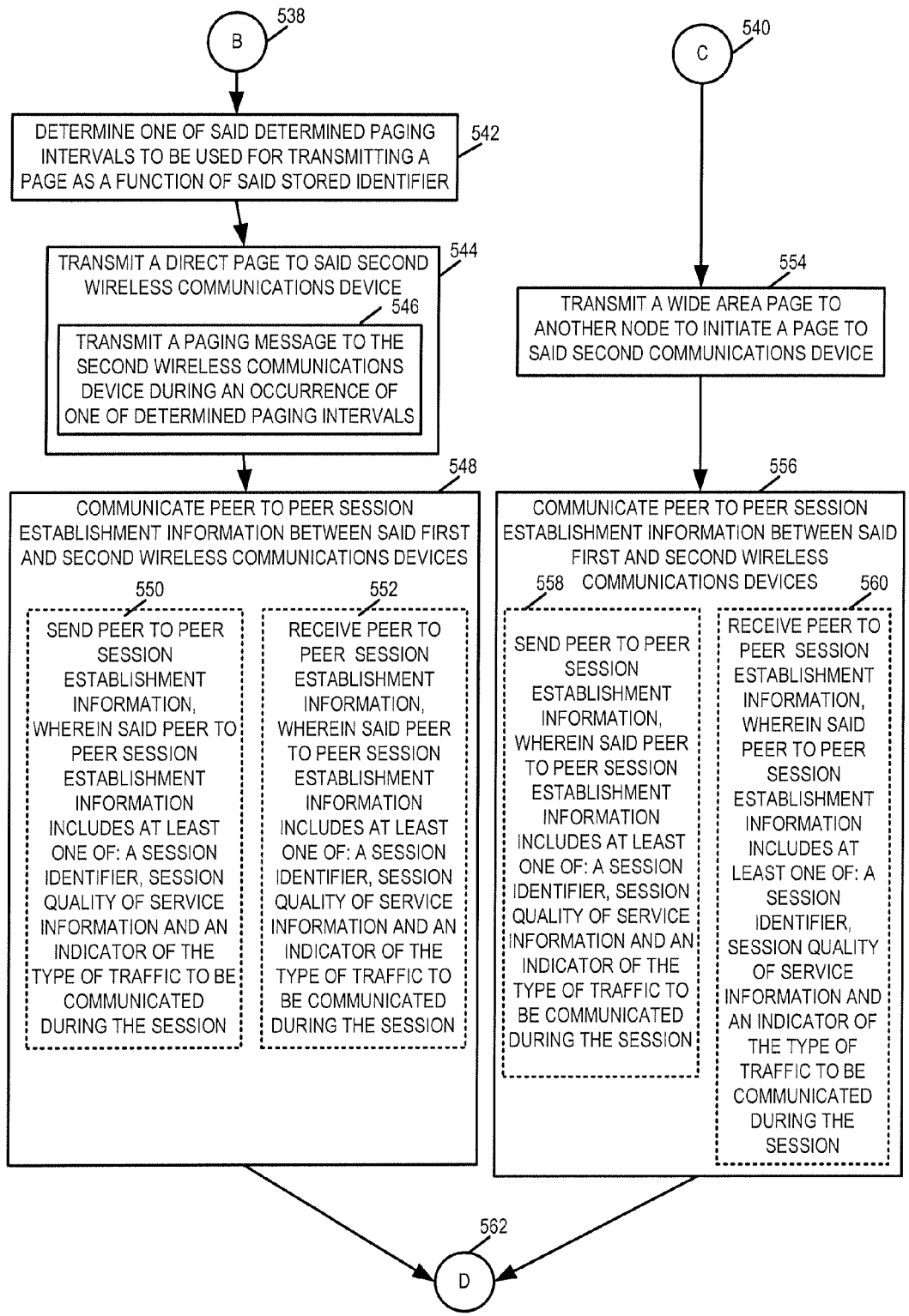
FIG. 5 comprising the combination of FIGS. 5A, 5B, 5C and 5D is a flowchart 500 of an exemplary method of operating a first wireless communications device, e.g., a wireless terminal such as a mobile node supporting peer to peer communications and using OFDM signaling, in accordance with various embodiments.
Figure 5C:
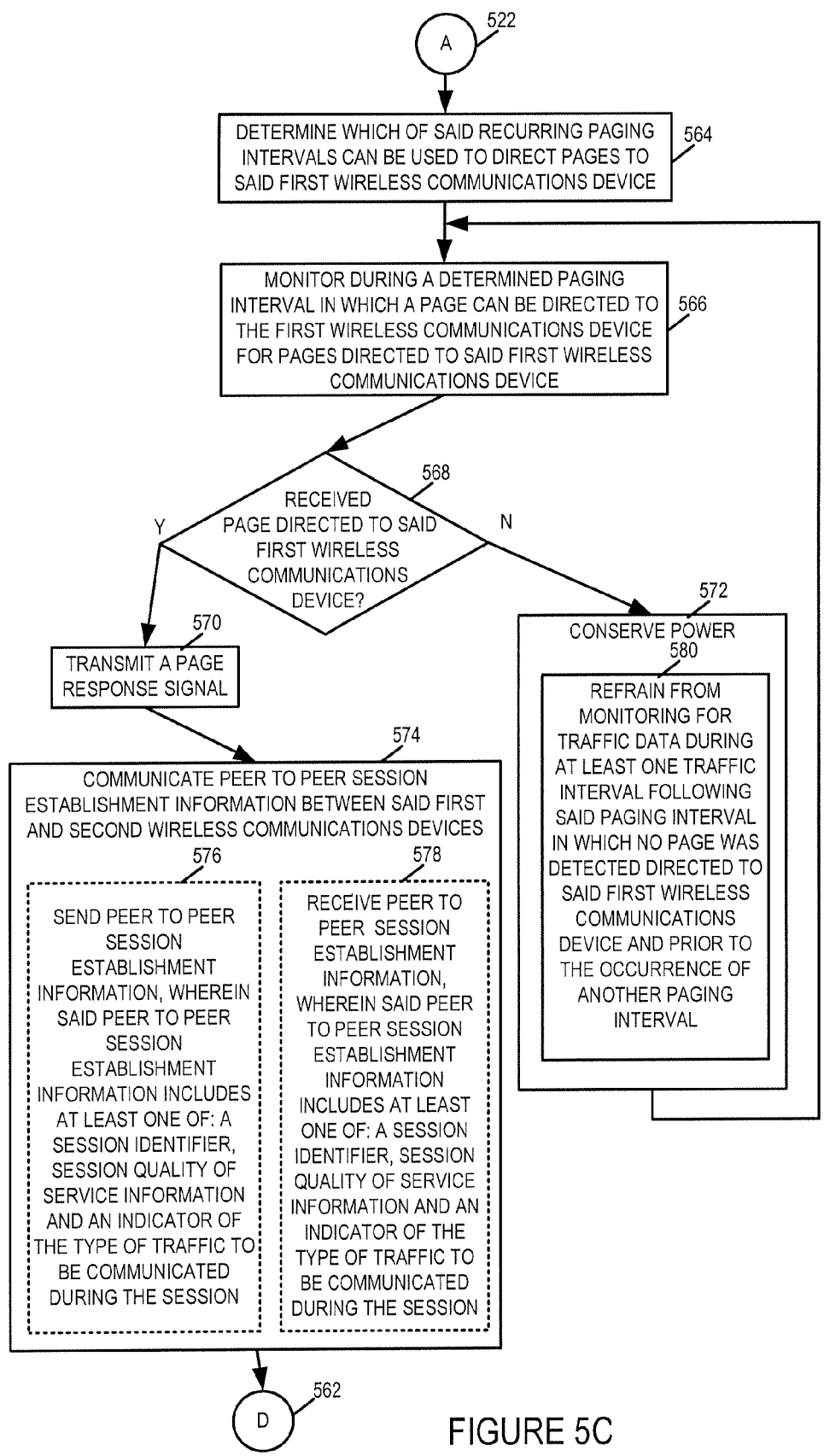
Figure 5D:
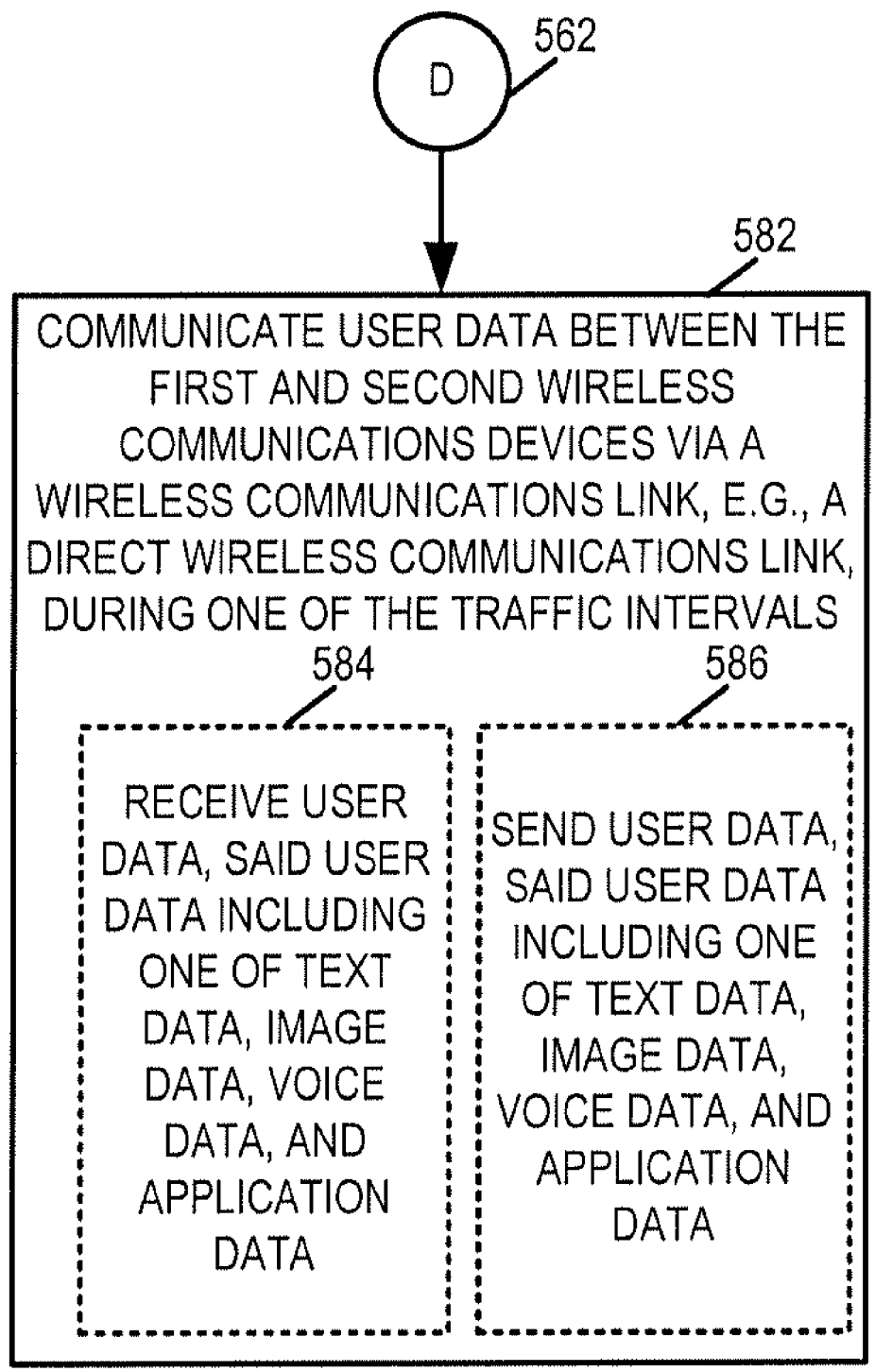

FIG. 5 comprising the combination of FIGS. 5A, 5B, 5C and 5D is a flowchart 500 of an exemplary method of operating a first wireless communications device, e.g., a wireless terminal such as a mobile node supporting peer to peer communications and using OFDM signaling, in accordance with various embodiments. Operation starts in step 502, where the first wireless communications device is powered on and initialized and proceeds to step 504. In step 504, the first wireless communications device determines a time reference point, and then in step 506 the first wireless communications device accesses stored timing structure information used to determine recurring peer discovery time intervals and traffic intervals. In various embodiments, the accessed stored timing structure information also includes information used to determine recurring paging time intervals. Operation proceeds from step 506 to step 508, in which the first wireless communications device determines recurring peer discovery time intervals and traffic intervals using said accessed stored timing structure information. Operation proceeds from step 508 to step 510. In step 510, the first wireless communications device determines recurring paging intervals using said accessed stored timing structure information. Operation proceeds from step 510 to step 512.

In step 512, the first wireless communications device receives a broadcast signal from a second wireless communications device during a peer discovery time interval. In various embodiments, the second wireless communications device is another wireless terminal such a mobile node supporting peer to peer communications and using OFDM signaling. In some embodiments, the received broadcast signal is a user beacon signal. Then, in step 514, the first wireless communications device recovers an identifier from the received broadcast signal, said identifier being one of a device identifier and a user identifier, and in step 516, the first wireless communications device stores said recovered identifier in memory. Operation proceeds from step 516 to steps 518, 520 and, via connecting node A 522 to step 564.

In step 518, the first wireless communications device starts a timer used to determine when a predetermined period of time, e.g., a lifetime associated with said recovered identifier of step 514, has expired. Operation proceeds from step 518 to step 524. In step 524, the first wireless communications device determines if a signal from said second wireless communications device has been detected within a period of time. If a signal is detected before the timer expires, then operation proceeds from step 524 to step 528, where the first wireless communications device updates the timer, e.g., restarts the timer. If a signal is not detected and the timer expires, then operation proceeds from step 524 to step 526, where the first wireless communications device deletes said recovered identifier, which was stored in step 516, from memory.

Returning to step 520, in step 520, the first wireless communications device monitors to detect an event used to trigger sending of a paging message to the second wireless communications device. Operation proceeds from step 520 to step 530 for a detected event. In step 530, the first wireless communications device selects between sending a peer to peer page to said second wireless communications device or sending a page through another device, e.g., a base station. Step 530 includes sub-steps 532 and 536. In sub-step 532, the first wireless communications device determines if said second wireless communications device is pagable by a peer to peer page. Sub-step 532 includes sub-step 534, in which the first wireless communications device checks a list of stored identifiers associated with devices, said list being stored in memory. Operation proceeds from sub-step 532 to sub-step 536, in which the first wireless communications device proceeds differently depending on the determination of sub-step 532. If it is determined in sub-step 532 that the second wireless communications device is pagable by a peer to peer page, then operation proceeds from sub-step 536, via connecting node B 538, to step 542. If it is determined in sub-step 532 that the second wireless communications device is not pagable by a peer to peer page, then operation proceeds from sub-step 536, via connecting node C 540, to step 554.

In step 542, the first wireless communications device determines one of said determined paging intervals to be used for transmitting a page as a function of said stored identifier. Operation proceeds from step 542 to step 544. In step 544, the first wireless communications device transmits a direct page to said second wireless communications device. Step 544 includes sub-step 546, in which the first wireless communications device transmits a paging message to the second wireless communications device during an occurrence of one of the determined paging intervals. Operation proceeds from step 544 to step 548.

In step 548, the first wireless communications device participates in the communication of peer to peer session establishment information between the first and second wireless communications devices. Step 548 includes one or more of sub-steps 550 and 552. In sub-step 550 the first wireless communications device sends peer to peer session establishment information, wherein said peer to peer session establishment information includes at least one of: a session identifier, session quality of service information, and an indicator of the type of traffic to be communicated during the session. In sub-step 552 the first wireless communications device receives peer to peer session establishment information, wherein said peer to peer session establishment information includes at least one of: a session identifier, session quality of service information, and an indicator of the type of traffic to be communicated during the session. Operation proceeds from step 548 via connecting node D 562 to step 582.

Returning to step 554, in step 554, the first wireless communications device transmits a wide area page to another node, e.g., a base station, to initiate a page to the second communications device. Operation proceeds from step 554 to step 556.

In step 556, the first wireless communications device participates in the communication of peer to peer session establishment information between the first and second wireless communications devices. Step 556 includes one or more of sub-steps 558 and 560. In sub-step 558 the first wireless communications device sends peer to peer session establishment information, wherein said peer to peer session establishment information includes at least one of: a session identifier, session quality of service information, and an indicator of the type of traffic to be communicated during the session. In sub-step 560 the first wireless communications device receives peer to peer session establishment information, wherein said peer to peer session establishment information includes at least one of: a session identifier, session quality of service information, and an indicator of the type of traffic to be communicated during the session. Operation proceeds from step 556 via connecting node D 562 to step 582.

In step 564, the first wireless communications device determines which of said recurring paging intervals can be used to direct pages to said first wireless communications device. Operation proceeds from step 564 to step 566. In step 566, the first wireless communications device monitors during a determined paging interval in which a page can be directed to the first wireless communications device for pages directed to the first wireless communications device. Operation proceeds from step 566 to step 568. In step 568, the wireless terminal determines if a page was received directed to the first wireless communications device and proceeds as a function of the determination. If a page was received directed to the first wireless communications device, then operation proceeds from step 568 to step 570; otherwise operation proceeds from step 568 to step 572.

In step 570, the first wireless communications device transmits a page response signal. Operation proceeds from step 570 to step 574. In step 574, the first wireless communications device participates in the communication of peer to peer session establishment information between the first and second wireless communications devices. Step 574 includes one or more of sub-steps 576 and 578. In sub-step 576 the first wireless communications device sends peer to peer session establishment information, wherein said peer to peer session establishment information includes at least one of: a session identifier, session quality of service information, and an indicator of the type of traffic to be communicated during the session. In sub-step 578 the first wireless communications device receives peer to peer session establishment information, wherein said peer to peer session establishment information includes at least one of: a session identifier, session quality of service information, and an indicator of the type of traffic to be communicated during the session. Operation proceeds from step 574 via connecting node D 562 to step 582.

Returning to step 572, in step 572, the first wireless communications device is operated to conserve power. Step 572 includes sub-step 580, in which the first wireless communications device is controlled to refrain from monitoring for traffic data during at least one traffic interval following said paging interval in which no page was detected directed to the said first wireless communications device and prior to the occurrence of another paging interval. Operation proceeds from step 572 to step 566, where the first wireless communications device monitors another paging interval.

Returning to step 582, in step 582, the first wireless communications device participates in the communication of user data between the first and second wireless communications devices via a direct wireless communications link during one of the traffic intervals. Step 582 includes one or more of sub-steps 584 and 586. In sub-step 584, the first wireless communications device receives user data, said user data including one of text data, image data, voice data, and application data. In sub-step 586, the first wireless communications device sends user data, said user data including one of text data, image data, voice data, and application data.

FIG. 6 is a drawing illustrating an exemplary peer to peer timing structure 600 used by wireless terminals in accordance with various embodiments. Exemplary peer to peer timing structure 600 includes a peer discovery time interval 602 followed by a traffic interval 604. Then, the pattern repeats as illustrated by peer discovery time interval 602' followed by traffic interval 604'. Each peer discovery interval (602, 602') has a duration of 9 msec, while each traffic interval (604, 604') has a duration of 900 msec. The timing structure repeat interval 606 is 909 msec.

It may be observed that the duration of the peer discovery interval, which is 9 msec, is less than 10 msec. It may also be observed that the total time allocated to traffic intervals is 100 times the total time allocated to peer discovery intervals. In some other embodiments, the total time allocated to traffic intervals is more than 100 times the total time allocated to peer discovery intervals.

FIG. 7 is a drawing illustrating an exemplary peer to peer timing structure 700 used by wireless terminals in accordance with various embodiments. Exemplary peer to peer timing structure 700 includes a peer discovery time interval 702 followed by ten traffic intervals (traffic interval 1 704, . . . , traffic interval 10 706). Then, the pattern repeats as illustrated by peer discovery time interval 702' followed by ten traffic intervals (traffic interval 1 704', . . . , traffic intervals 10 706'). Each peer discovery interval (702, 702') has a duration of 3 msec, while each traffic interval (704, . . . , 706, 704', . . . , 706') has a duration of 30 msec. The timing structure repeat interval 708 is 303 msec, and the composite traffic time 710 in one iteration of the recurring timing structure is 300 msec.

It may be observed that the duration of the peer discovery interval, which is 3 msec, is less than 10 msec. It may also be observed that the total time allocated to traffic intervals is 100 times the total time allocated to peer discovery intervals. In some other embodiments, the total time allocated to traffic intervals is more than 100 times the total time allocated to peer discovery intervals. It may also be observed that the are 10 times as many traffic time intervals as there are peer discovery intervals in one iteration of the recurring timing structure. In some other embodiments, there are more than 10 times as many traffic time intervals as there are peer discovery intervals in one iteration of the recurring timing structure.

Figures 8, 9:
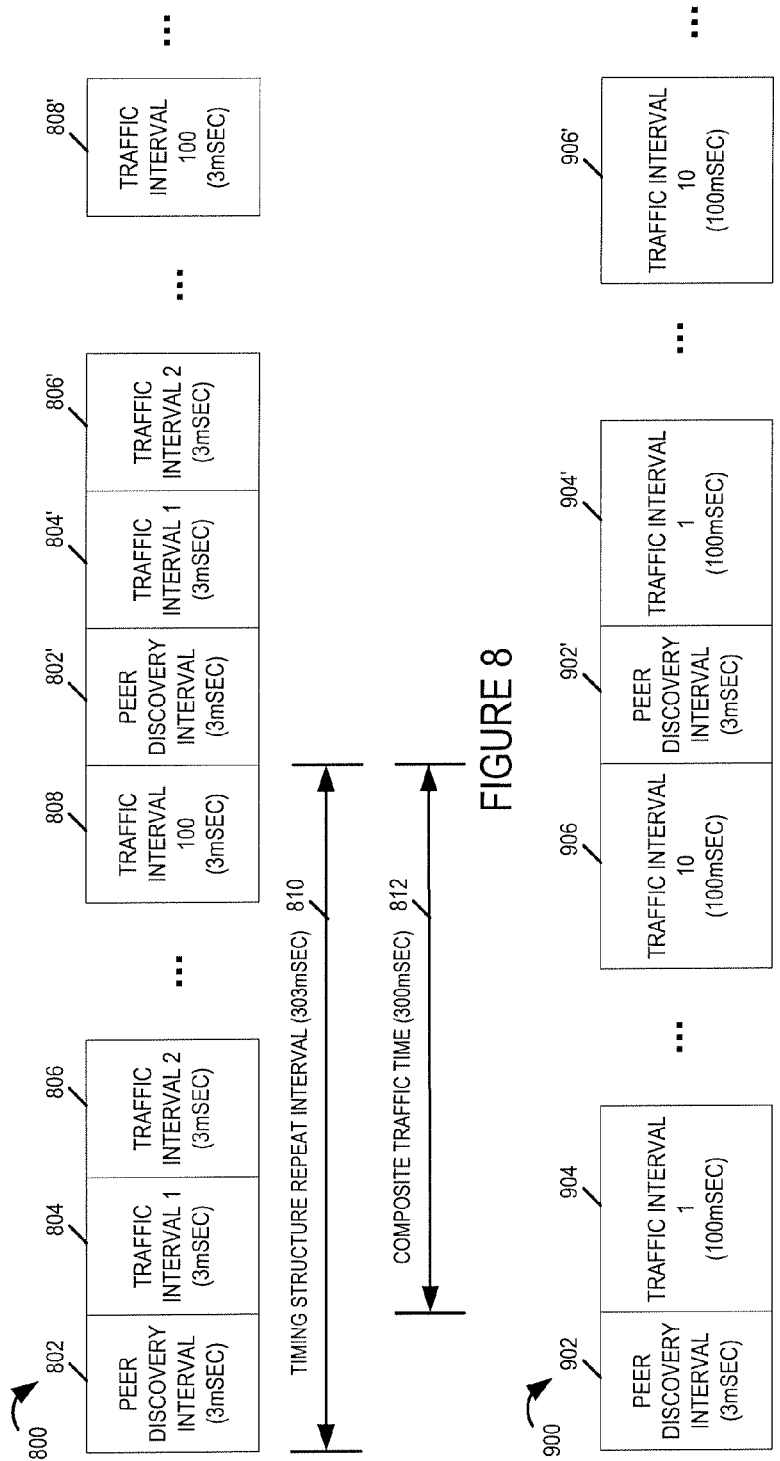
FIG. 8 is a drawing illustrating an exemplary peer to peer timing structure used by wireless terminals in accordance with various embodiments.
FIG. 9 is a drawing illustrating an exemplary peer to peer timing structure used by wireless terminals in accordance with various embodiments.

FIG. 8 is a drawing illustrating an exemplary peer to peer timing structure 800 used by wireless terminals in accordance with various embodiments. Exemplary peer to peer timing structure 800 includes a peer discovery time interval 802 followed by 100 traffic intervals (traffic interval 1 804, traffic interval 2 806, . . . , traffic interval 100 808). Then, the pattern repeats as illustrated by peer discovery time interval 802' followed by traffic intervals (traffic interval 1 804', traffic interval 2 806', . . . , traffic interval 100 808'). Each peer discovery interval (802, 802') has a duration of 3 msec, and each traffic interval (804, 806, . . . , 808, 804', 806', . . . 808')

has a duration of 3 msec. The timing structure repeat interval 810 is 303 msec, and the composite traffic time 812 in one iteration of the recurring timing structure is 300 msec.

It may be observed that the duration of the peer discovery interval, which is 3 msec, is less than 10 msec. The duration of a traffic interval is 3 msec; therefore, the duration of a peer discovery interval and the duration of a traffic interval is the same. It may also be observed that the total time allocated to traffic intervals is 100 times the total time allocated to peer discovery intervals. In some other embodiments, the total time allocated to traffic intervals is more than 100 times the total time allocated to peer discovery intervals. It may be observed there are 100 times as many traffic time intervals as there are peer discovery intervals in one iteration of the recurring timing structure. In various embodiments, there are at least 10 times as many traffic intervals as there are peer discovery intervals in one iteration of the recurring timing structure.

FIG. 9 is a drawing illustrating an exemplary peer to peer timing structure 900 used by wireless terminals in accordance with various embodiments. Exemplary peer to peer timing structure 900 includes a peer discovery time interval 902 followed by ten traffic intervals (traffic interval 1 904, . . . , traffic interval 10 906). Then, the pattern repeats as illustrated by peer discovery time interval 902' followed by traffic intervals (traffic interval 1 904' . . . , traffic interval 10 906'). Each peer discovery interval (902, 902') has a duration of 3 msec, and each traffic interval (904, . . . , 906, 904', . . . , 906') has a duration of 100 msec. The timing structure repeat interval 908 is 1003 msec, and the composite traffic time 910 in one iteration of the recurring timing structure is 1 sec.

It may be observed that the duration of the peer discovery interval, which is 3 msec, is less than 10 msec. It may also be observed that the total time allocated to traffic intervals is approximately 333 times the total time allocated to peer discovery intervals. In some other embodiments, the total time allocated to traffic intervals is more than 100 times the total time allocated to peer discovery intervals. It may be observed there are 10 times as many traffic time intervals as there are peer discovery intervals in one iteration of the recurring timing structure. In various embodiments, there are more than 10 times as many traffic intervals as there are peer discovery intervals in one iteration of the recurring timing structure. It may also be observed that the gap time between two successive peer discovery intervals 912 is 1 sec. In some other embodiments, the gap time between two successive peer discovery intervals is greater than 1 sec.

Figure 10:
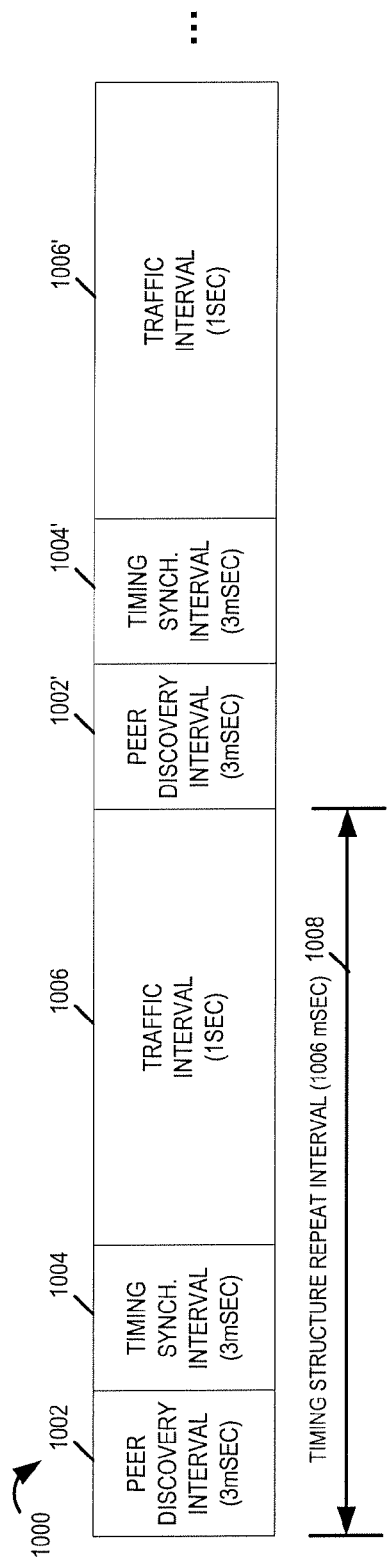
FIG. 10 is a drawing illustrating an exemplary peer to peer timing structure used by wireless terminals in accordance with various embodiments.

FIG. 10 is a drawing illustrating an exemplary peer to peer timing structure 1000 used by wireless terminals in accordance with various embodiments. Exemplary peer to peer timing structure 1000 includes a peer discovery time interval 1002 followed by a timing synchronization interval 1004, which is followed by a traffic interval 1006. Then, the pattern repeats as illustrated by peer discovery time interval 1002' followed by timing synchronization interval 1004' followed by traffic interval 1006'. Each peer discovery interval (1002, 1002') has a duration of 3 msec, each timing synchronization interval (1004, 1004') has a duration of 3 msec and each traffic interval (1006, . . . , 1006') has a duration of 1 sec. The timing structure repeat interval 1008 is 1006 msec.

It may be observed that the duration of the peer discovery interval, which is 3 msec, is less than 10 msec. In various embodiments, the timing synchronization intervals is a time interval used by the first wireless terminal to collect signal timing data from a signal received from a peer device, said signal timing data being for use in adjusting the first wireless terminal's signal timing.

Figure 11:
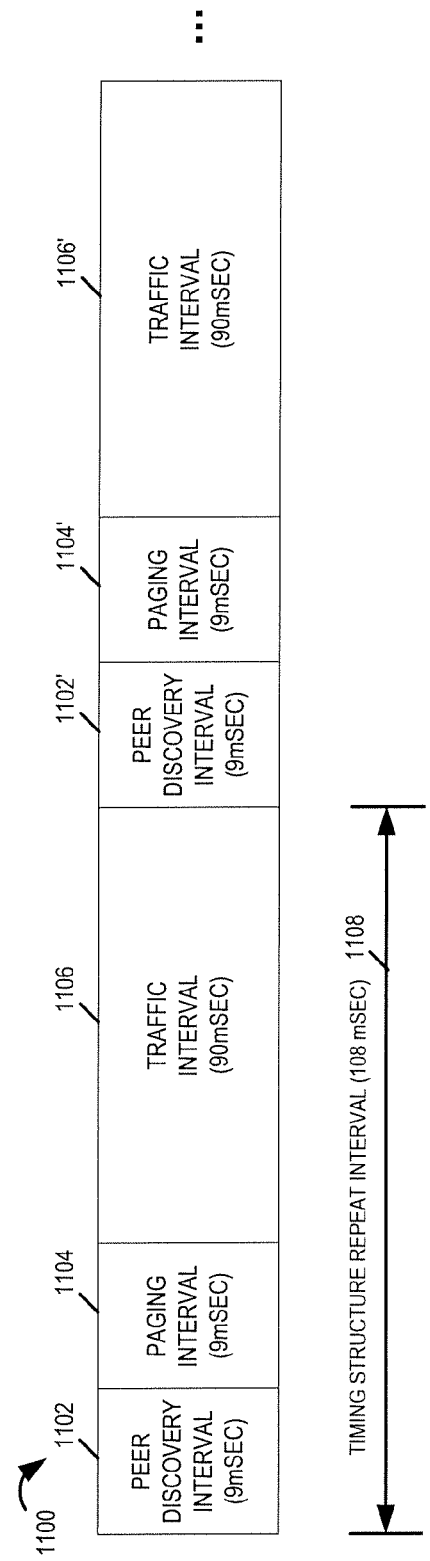
FIG. 11 is a drawing illustrating an exemplary peer to peer timing structure used by wireless terminals in accordance with various embodiments.

FIG. 11 is a drawing illustrating an exemplary peer to peer timing structure 1100 used by wireless terminals in accordance with various embodiments. Exemplary peer to peer timing structure 1100 includes a peer discovery time interval 1102 followed by a paging interval 1104, which is followed by a traffic interval 1106. Then, the pattern repeats as illustrated by peer discovery time interval 1102' followed by timing paging interval 1104' followed by traffic interval 1106'. Each peer discovery interval (1102, 1102') has a duration of 9 msec, each paging interval (1104, 1104') has a duration of 9 msec and each traffic interval (1106, . . . , 1106') has a duration of 90 msec. The timing structure repeat interval 1008 is 108 msec.

It may be observed that the duration of the peer discovery interval, which is 9 msec, is less than 10 msec. It may also be observed that the duration of the paging interval, which is 9 msec, is less than 10 msec. The total time allocated to traffic intervals is 10 times the total time allocated to paging intervals. In some other embodiments, the total time allocated to traffic intervals is more than 10 times the total time allocated to paging intervals.

Figure 12:
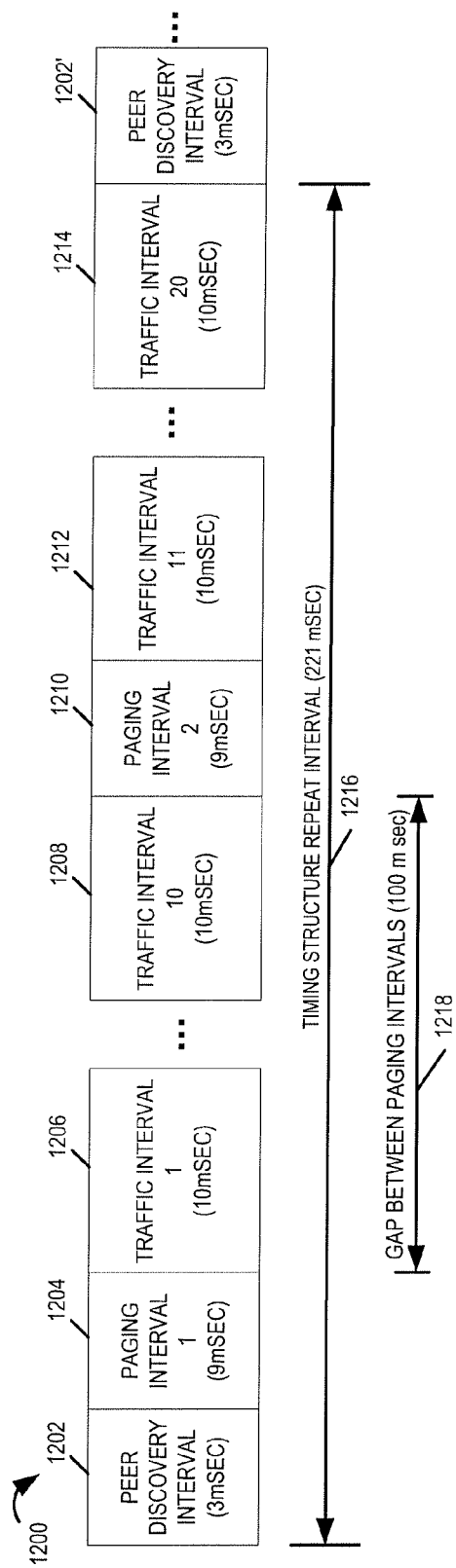
FIG. 12 is a drawing illustrating an exemplary peer to peer timing structure used by wireless terminals in accordance with various embodiments.

FIG. 12 is a drawing illustrating an exemplary peer to peer timing structure 1200 used by wireless terminals in accordance with various embodiments. Exemplary peer to peer timing structure 1200 includes a peer discovery time interval 1202 followed by a first paging interval, paging interval 1 1204, which is followed by ten traffic intervals (traffic interval 1 1206, . . . , traffic interval 10 1208), which is followed by a second paging interval, paging interval 2 1210, which is followed by 10 additional traffic intervals (traffic interval 11 1212, . . . , traffic interval 20 1214). Then, the pattern repeats starting with peer discovery intervals 1202'. Each peer discovery interval (1202, 1202') has a duration of 3 msec, each paging interval (1204, 1210) has a duration of 9 msec and each traffic interval (1206, . . . , 1208, 1212, . . . , 1214) has a duration of 10 msec. The timing structure repeat interval 1216 is 221 msec. The gap between paging intervals 1218 is 100 msec.

It may be observed that the duration of the peer discovery interval, which is 3 msec, is less than 10 msec. It may also be observed that the duration of the paging interval, which is 9 msec, is less than 10 msec. The total time allocated to traffic intervals is approximately 11 times the total time allocated to paging intervals. In some embodiments, the total time allocated to traffic intervals is at least 10 times the total time allocated to paging intervals. Each of the traffic intervals (1206, . . . , 1208, 1212, . . . , 1214) has a duration which is longer than the duration of any of the paging intervals (1204, 1210). The paging intervals have substantially the same duration as the traffic intervals. There are ten times as many traffic intervals as there are paging intervals in one iteration of the recurring timing structure.

Figure 13:
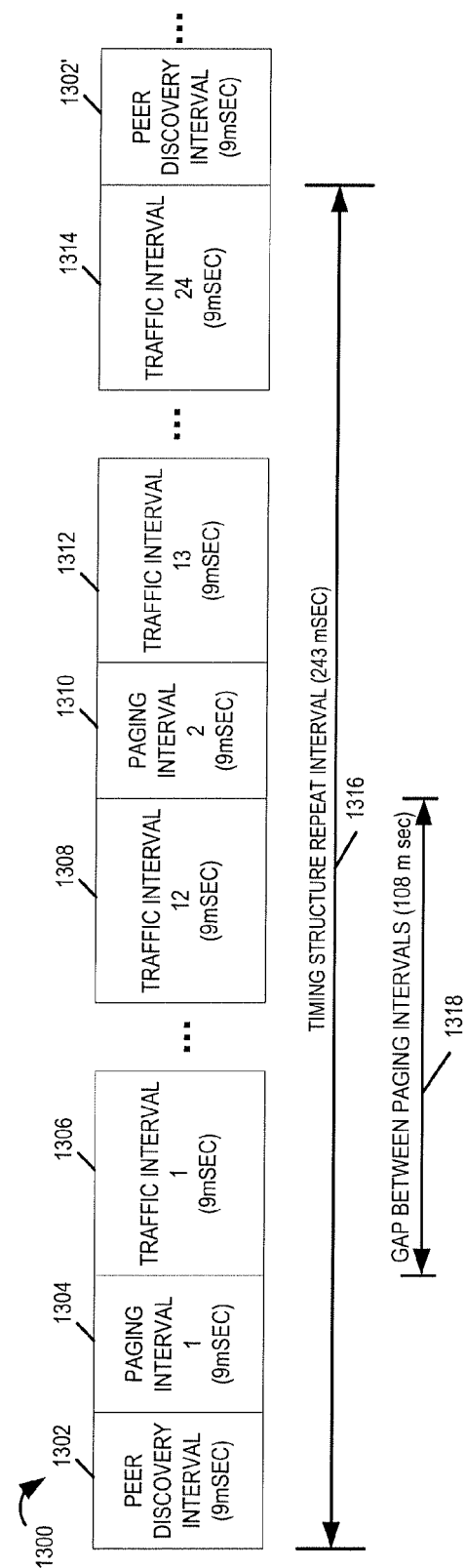
FIG. 13 is a drawing illustrating an exemplary peer to peer timing structure used by wireless terminals in accordance with various embodiments.

FIG. 13 is a drawing illustrating an exemplary peer to peer timing structure 1300 used by wireless terminals in accordance with various embodiments. Exemplary peer to peer timing structure 1300 includes a peer discovery time interval 1302 followed by a first paging interval, paging interval 1 1304, which is followed by twelve traffic intervals (traffic interval 1 1306, . . . , traffic interval 12 1308), which is followed by a second paging interval, paging interval 2 1310, which is followed by 12 additional traffic intervals (traffic interval 13 1312, . . . , traffic interval 24 1314). Then, the pattern repeats starting with peer discovery intervals 1302'. Each peer discovery interval (1302, 1302') has a duration of 9 msec, each paging interval (1304, 1310) has a duration of 9 msec and each traffic interval (1306, . . . , 1308, 1312, . . . ,

1314) has a duration of 9 msec. The timing structure repeat interval 1316 is 243 msec. The gap between paging intervals 1318 is 108 msec.

It may be observed that the duration of the peer discovery interval, which is 9 msec, is less than 10 msec. It may also be observed that the duration of the paging interval, which is 9 msec, is less than 10 msec. The total time allocated to traffic intervals is 12 times the total time allocated to paging intervals. In some embodiments, the total time allocated to traffic intervals is at least 10 times the total time allocated to paging intervals. Each of the traffic intervals (1306, . . . , 1308, 1312, . . . , 1314) has a duration which is the same as the duration of a paging interval. There are twelve times as many traffic intervals as there are paging intervals in one iteration of the recurring timing structure. In various embodiments, there are at least 10 times as many traffic intervals as there are paging intervals in one iteration of the timing structure.

Figure 14:
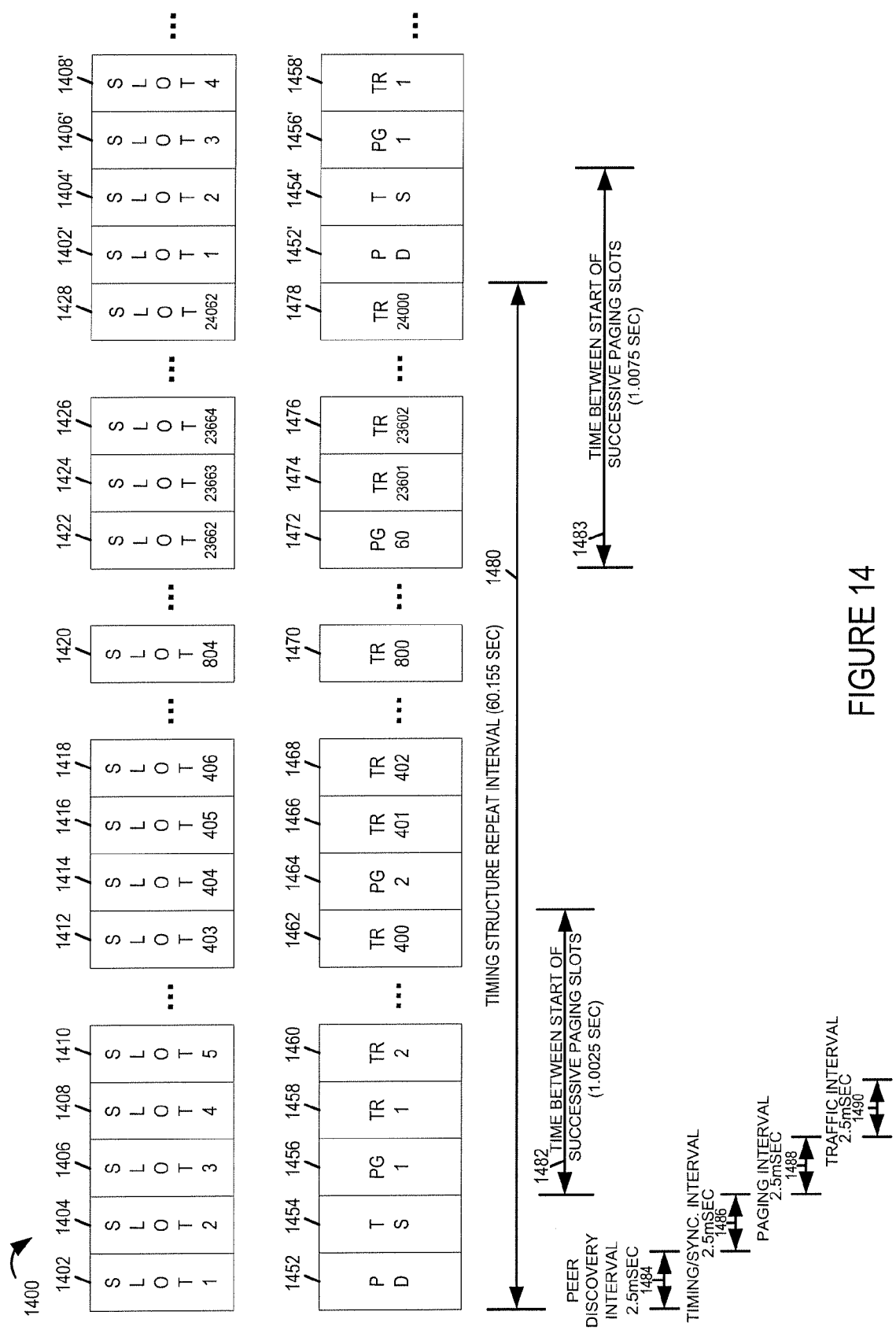
FIG. 14 is a drawing illustrating an exemplary peer to peer timing structure used by wireless terminals in accordance with various embodiments.

FIG. 14 is a drawing illustrating an exemplary peer to peer timing structure 1400 used by wireless terminals in accordance with various embodiments. In this exemplary embodiment, one recurring iteration of the timing structure includes a predetermined fixed number of equal duration time slots, e.g., 24062 indexed time slots (slot 1 1402, slot 2 1404, slot 3, 1406, slot 4 1408, slot 5 1410, . . . , slot 403 1412, slot 404 1414, slot 405 1416, slot 406 1418, . . . , slot 804 1420, . . . , slot 23662 1422, slot 23663 1424, slot 23664 1426, . . . , slot 24062 1428). A predetermined pattern of different types of intervals associated with those slots shall now be described. Exemplary peer to peer timing structure 1400 includes a peer discovery time interval 1452 followed by a timing synchronization interval 1454, followed by a first paging interval, paging interval 1 1456, which is followed by four hundred traffic intervals (traffic interval 1 1458, traffic interval 2 1460, . . . , traffic interval 400 1462), which is followed by a second paging interval, paging interval 2 1464, which is followed by four hundred additional traffic intervals (traffic interval 401 1466, traffic interval 402 1468, . . . , traffic interval 800 1470). This sequence of a paging interval followed by a set of 400 traffic intervals repeats for a total of 60 sets ending with paging interval 60 1472 followed by 400 traffic intervals (traffic interval 23601 1474, traffic interval 23602 1476, . . . , traffic interval 24000 1478). Then, the pattern repeats starting with peer discovery interval 1452' corresponding to slot 1 1402', timing synchronization interval 1454' corresponding to slot 2 1404', paging interval 1 1456' corresponding to slot 3 1406', traffic interval 1 1458' corresponding to slot 4 1408', etc. Each peer discovery interval (1452, 1452') has a duration 1484 of 2.5 msec. Each timing synchronization interval (1454, 1454') has a duration 1486 of 2.5 msec. Each paging interval (1456, 1464, . . . , 1472, 1456') has a duration 1488 of 2.5 msec. Each traffic interval (1458, 1460, . . . , 1462, 1466, 1468, . . . , 1470, 1474, 1476, . . . , 1478, 1458') has a duration of 2.5 msec. The timing structure repeat interval 1480 is 60.155 sec. The time between starts of successive paging slots 1482 is 1.0025 sec for paging slots within the same iteration of the recurring timing structure. The gap between successive paging slots is 1 sec for paging slots within the same iteration of the recurring timing structure. The time between starts of successive paging slots 1483 is 1.0075 msec for paging slots within different iterations of the recurring timing structure. The gap between successive paging slots is 1.0050 sec for paging slots within different iterations of the recurring timing structure.

The peer discovery intervals, which are 2.5 msec, are less than 10 msec. The paging intervals, which are 2.5 msec, are less than 10 msec. There are 24000 times as many traffic intervals as there are peer discovery intervals; therefore there are at least 10 times as many traffic intervals as there are peer discovery intervals. The total time allocated to traffic intervals is 24000 times the time allocated to peer discovery intervals; therefore there are at least 100 times as much time allocated to traffic intervals as allocated to peer discovery intervals. There are 400 times as many traffic intervals as there are paging intervals; therefore, there are at least 10 times the number of traffic intervals as there are paging intervals. The total time allocated to traffic intervals is 400 times the time allocated to peer discovery intervals; therefore there are at least 10 times as much time allocated to traffic intervals as allocated to peer discovery intervals. The time gap between two successive paging intervals is 1.0 sec for paging intervals within the same iteration of the recurring timing structure, and the gap between two successive paging intervals is 1.0050 sec for paging intervals in two different iterations of the recurring timing structure, which are both at least 100 msec. The time allocated for paging is 60 times the time allocated for peer discovery, which is at least twice the time allocated for peer discovery.

Figure 15:
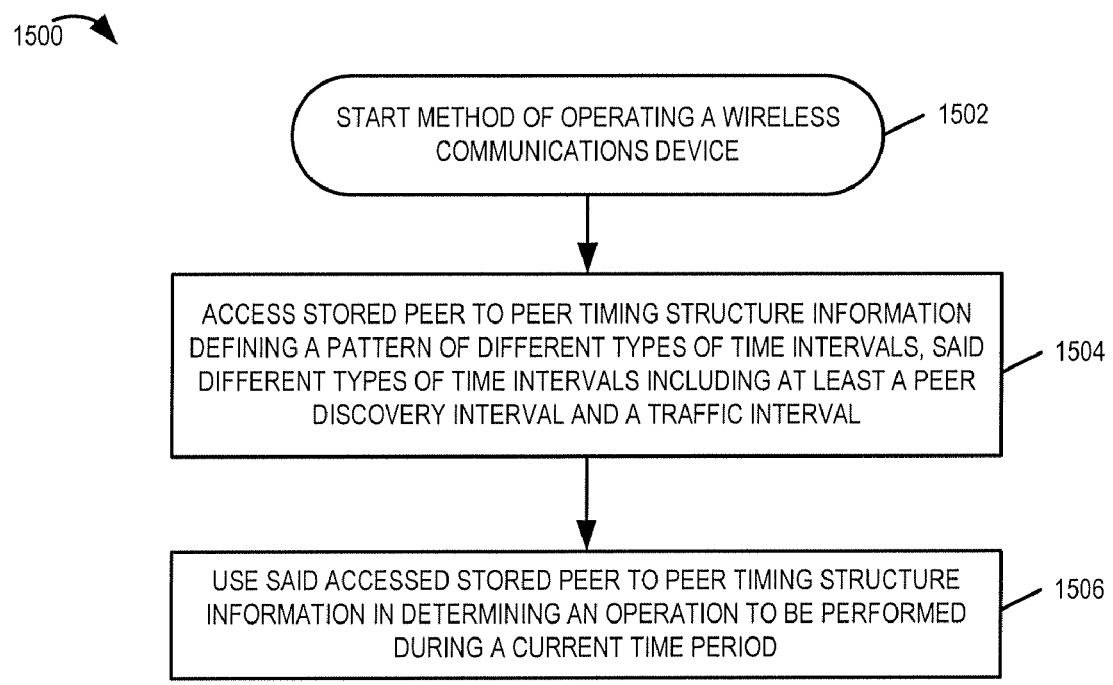
FIG. 15 is a flowchart of an exemplary method of operating a wireless communications device, e.g., a wireless terminal such as a mobile node supporting peer to peer communications and using OFDM signaling, in accordance with various embodiments.

FIG. 15 is a flowchart of an exemplary method of operating a wireless communications device, e.g., a wireless terminal such as a mobile node supporting peer to peer communications and using OFDM signaling, in accordance with various embodiments. Operation starts in step 1502, where the wireless communications device is powered on and initialized and proceeds to step 1504. In step 1504, the wireless communications device accesses stored peer to peer timing structure information, said stored peer to peer timing structure information defining a pattern of different types of time intervals, said different types of time intervals including at least a peer discovery time interval and a traffic interval. Other types of intervals include one or more of a timing synchronization interval and a paging interval. Operation proceeds from step 1504 to step 1506. Various exemplary peer to peer timing structures are illustrated in and described with respect to FIGS. 1, 6, 7, 8, 9, 10, 11, 12, 13 and 14.

In step 1506, the wireless communications device uses said accessed stored peer to peer timing structure information in determining an operation to be performed during a current time period.

In various embodiments, the pattern of different types of time intervals repeats over time. In some such embodiments, the pattern has a predetermined periodicity and wherein each period includes at least one peer discovery interval and at least one traffic interval. In some such embodiments, the duration of each peer discovery interval is less than 10 msec. In some such embodiments, the peer discovery interval duration is within the approximate range of 2 to 3 msec.

In various embodiments, the total time allocated to traffic intervals is at least 100 times the total time allocated to peer discovery intervals. In some embodiments, each of a plurality of traffic intervals included in each period has a duration which is longer than any of the peer discovery intervals in said period. In various embodiments, each time period includes at least 10 times as many traffic time intervals as peer discovery time intervals.

The traffic and peer discovery intervals, in some embodiments, have the same or substantially the same duration, and there are more traffic time intervals than peer discovery time intervals.

In some embodiments, two successive peer discovery time intervals in a time period including two repetitions of the recurring pattern are separated in time by a gap of at least 1 second.

In various embodiments, each period further includes a timing synchronization interval. The timing synchronization interval is, in various embodiments, a time interval for use by a wireless terminal to collect signal timing data from a signal received from a peer device, said signal timing data being for use in adjusting the wireless terminal's symbol timing.

In various embodiments, each period includes a paging interval, e.g., a paging interval having a duration of less than 10 msec. In some embodiments, pagings intervals have an approximate duration within the range of 2 to 3 msec. In some embodiments, the total time allocated to traffic intervals is at least 10 times the total time allocated to paging intervals.

Some embodiments have a single traffic interval in one iteration of the recurring timing structure, while in other embodiments there are a plurality of traffic intervals in one iteration of the recurring timing structure. In various embodiments, each of a plurality of traffic intervals included in each period has a duration which is longer than the duration of any of the paging intervals in the period, wherein the period is one iteration of the recurring timing structure.

In some embodiments, there are more traffic intervals than there are paging intervals, e.g., at least 10 times the number of traffic intervals as the number of paging intervals in one iteration of a recurring timing structure. In some embodiments, there are more traffic intervals than there are paging intervals, and the traffic and paging intervals have the same or substantially the same duration.

The gap between two successive paging intervals, in various embodiments, are separated in time by at least 100 msec. In some embodiments, the total amount of time allocated to paging intervals is at least twice the total amount of time allocated to peer discovery intervals in one iteration of a recurring timing structure.

Figure 16:
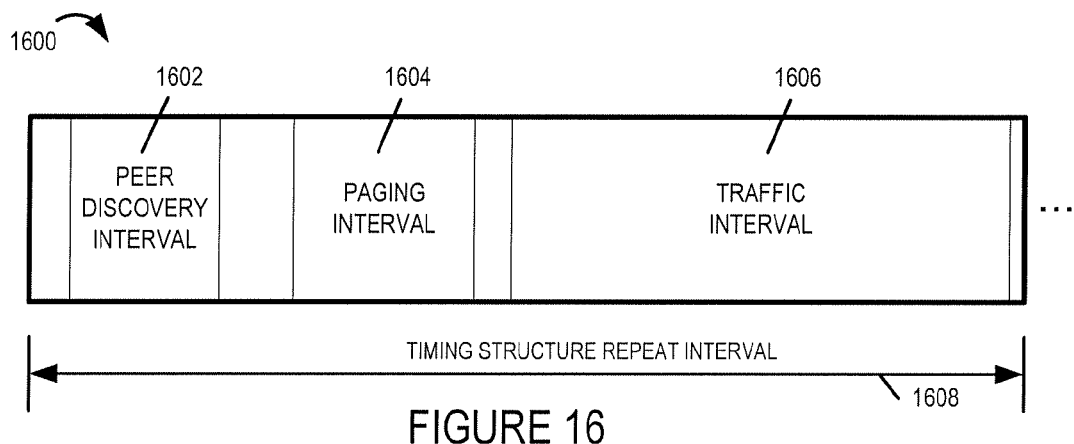
FIG. 16 is a drawing of an exemplary peer to peer timing structure in accordance with various embodiments.

FIG. 16 is a drawing of an exemplary peer to peer timing structure 1600 in accordance with various embodiments. Exemplary peer to peer timing structure 1600 has a timing structure repeat interval 1608. Each iteration of the peer to peer timing structure includes a peer discovery interval 1602, a paging interval 1604 and a traffic interval 1606.

Figure 17:
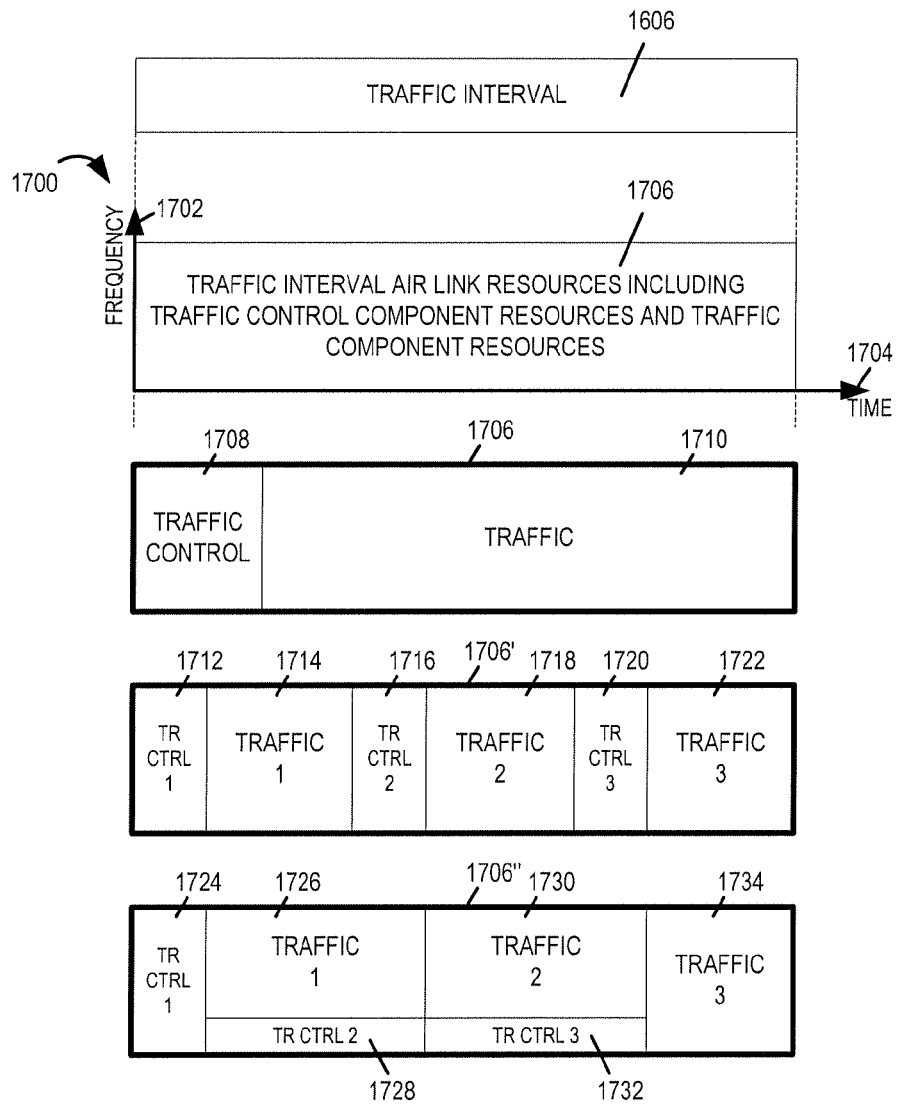
FIG. 17 illustrates exemplary air link resources corresponding to an exemplary traffic interval of FIG. 16.

FIG. 17 illustrates exemplary air link resources corresponding to the exemplary traffic interval 1606 of FIG. 16. Drawing 1700, which includes a vertical axis 1702 representing frequency and a horizontal axis 1704 representing time, illustrates exemplary traffic interval air link resources 1706 corresponding to traffic interval 1606. The traffic interval air link resources 1706 include traffic control component resources 1708 and traffic component resources 1710. Traffic control component resources are used for operations including user scheduling, interference management and rate scheduling. User scheduling operations include requesting to transmit user data and responding to a request to transmit user data. Interference management includes communicating signals used for SNR measurements and communicating SNR measurement data. Rate scheduling includes communicating data rate information and/or power information corresponding to user traffic. Traffic component resources are used for communicating user data between peers, e.g., communicating voice, audio, text, file, and/or image data.

Alternatively, the traffic interval air link resources may be, and sometimes are partitioned in a different manner. Exemplary traffic interval air link resources 1706' represent one such alternative embodiment. In this embodiment, the traffic interval air link resources include a plurality of distinct traffic control portions and traffic portions (traffic control portion 1 1712, traffic portion 1 1714, traffic control portion 2 1716, traffic portion 2 1718, traffic control portion 3 1720, traffic portion 3 1722). The traffic control and traffic portions alternate in time in traffic interval air link resources 1706'.

Exemplary traffic interval air link resources 1706" represent another alternative embodiment. In this embodiment, the traffic interval air link resources include a plurality of distinct traffic control portions and traffic portions (traffic control portion 1 1724, traffic portion 1 1726, traffic control portion 2 1728, traffic portion 2 1730, traffic control portion 3 1732, traffic portion 3 1734), at least some of which at least partially overlap in time. In this example, traffic control portion 2 1728 occurs concurrently with traffic portion 1 1726; and traffic control portion 3 1732 occurs concurrently with traffic portion 2 1730.

Figure 18:
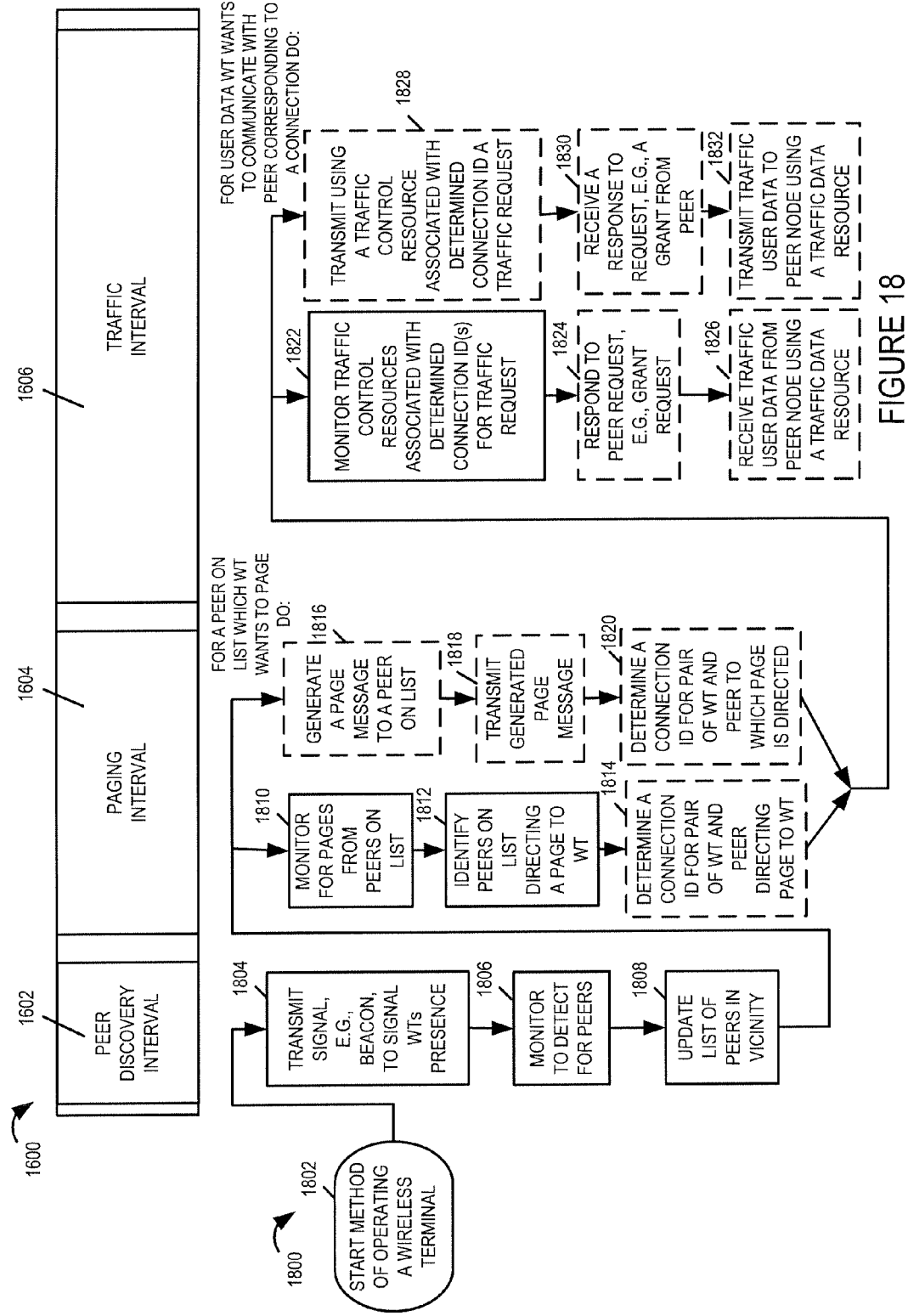
FIG. 18 includes an exemplary peer to peer timing structure and an exemplary flowchart of an exemplary method of operating a wireless terminal, e.g., a mobile node supporting peer to peer operations, in accordance with various embodiments.

FIG. 18 includes exemplary peer to peer timing structure 1600 and an exemplary flowchart 1800 of an exemplary method of operating a wireless terminal, e.g., a mobile node supporting peer to peer operations, in accordance with various embodiments. Operation of the exemplary method starts in step 1802, where the wireless terminal is powered on and initialized. Operation proceeds from start step 1802 to step 1804. In step 1804, which is performed during peer discovery interval 1602, the wireless terminal transmits a signal, e.g., a beacon signal to signal its presence. Operation proceeds from step 1804 to step 1806, which is also performed during peer discovery interval 1602, the wireless terminal monitors to detect for peers, e.g., the wireless terminal monitors to detect for beacon signals associated with peers. In some embodiments, step 1806 includes at times multiple disjoint monitoring portions with the transmit of step 1804 being performed between two of those disjoint monitoring portions. In some embodiments, the wireless terminal performs one of step 1804 and step 1806 during a peer discovery interval iteration.

Operation proceeds from step 1806 to step 1808. In step 1808, the wireless terminal updates a list of peers in the vicinity as a function of information obtained from the monitoring of step 1806. Operation proceeds from step 1808 to steps 1810 and step 1816.

In step 1810, which is performed during paging interval 1604, the wireless terminal monitors for pages from the peers on the list of step 1808. Then, in step 1812, the wireless terminal processes received paging messages and identifies peers on the list directing a page to the wireless terminal. Operation proceeds from step 1812 to step 1814 if a page has been detected which was directed to the wireless terminal; otherwise operation proceeds to steps 1822 and 1828. In step 1814, the wireless terminal determines a connection identifier for the pair of the wireless terminal and the peer which was directing the page to the wireless terminal. Operation proceeds from step 1814 to steps 1822 and 1828.

Returning to step 1816, step 1816 is performed for a peer on the list of step 1808, which the wireless terminal wants to send a page. In step 1816, the wireless terminal generates a page message to a peer on the list. Operation proceeds from step 1816 to step 1818. In step 1818, which is performed during paging interval 1604, the wireless terminal transmits the generated page message of step 1816. Then, in step 1820, the wireless terminal determines a connection identifier for the pair of the wireless terminal and peer to which the generated page is directed. Operation proceeds from step 1820 to steps 1822 and 1828.

In step 1822, the wireless terminal monitors traffic control resources associated with the determined connection identifier or determined connection identifiers for a traffic request. If a request is received, operation proceeds from step 1822 to step 1824, where the wireless terminal responds to the peer request, e.g., granting the request. Operation proceeds from step 1824 to step 1826, in response to a grant decision. In step 1826, the wireless terminal receives traffic user data from the peer node which sent the request using a traffic data resource.

Returning to step 1828, step 1828 is performed if the wireless terminal wants to communicate user data to peer with which the wireless terminal has a connection. In step 1828, the wireless terminal transmits, using a traffic control resource associated with the determined connection identifier a traffic request. Operation proceeds from step 1828 to step 1830. In step 1830, the wireless terminal receives a response to the request, e.g., a grant from the peer. Operation proceeds from step 1830 to step 1832, in response to a received grant. In step 1832, the wireless terminal transmits traffic user data to the peer node, from which it has sent a request, using a traffic data resource. Steps 1822, 1824, 1826, 1828, 1830, and 1832 are performed during traffic interval 1606.

FIG. 19 is a drawing 1900 illustrating the refinement of monitoring, by a wireless terminal, as a function of peer discovery operations and paging operations in accordance with various embodiments. Block 1902 illustrates that there are N wireless terminals in a peer to peer communications system, e.g., N wireless terminals which can potentially power on and be in the same local vicinity and are implemented to support peer to peer communications in accordance with the peer to peer communications system protocols. The N wireless terminals, in some embodiments, represent the total number of wireless terminals which have registered and are provisioned to be able to participate in the peer to peer communications networks of a service provider.

In block 1904, WT 1 peer discovery operations identify peers in its local vicinity and result in a list of N1 peers in vicinity, where N1≦N, and typically N1<<N. In block 1906, WT 1 paging operations identify K active connection peers and this results in a list of connection identifiers, where K≦N1, and typically K<<N1.

FIG. 20 a is drawing illustrating an example corresponding to FIG. 19 and further illustrating that the wireless terminal determines a portion or portions of the traffic control resources to use as a function of a connection identifier list. In this example, assume that there are 500 exemplary wireless terminals in the peer to peer communications system, e.g., N=500. As part of wireless terminal 1's peer discovery operations WT 1 forms peer discovery list 2002, which identifies that 8 peer wireless terminals (WTs corresponding to identifiers 3, 7, 23, 156, 196, 200, 456 and 499) are in the local vicinity. In this example N1=8.

As part of WT 1's paging operations, WT 1 forms active connection list 2004. Active connection list 2004 includes a first column 2006 which identifies wireless terminals from which WT 1 has received a page and wireless terminals to which WT 1 has sent a page. In this example, the number of K active connection peers=2, which are the wireless terminals corresponding to identifiers 7 and 499. Active connection list 2004 also includes a second column 2008 listing active connection identifiers. Active connection identifiers include an identifier corresponding to the pair of WT 1/WT 7 and an identifier corresponding to the pair of WT 1 and WT 499.

Drawing 2010 includes a plot of frequency on the vertical axis 2012 vs time on the horizontal axis 2014 and is used to illustrate exemplary OFDM traffic control resources 2016. Arrow 2018 indicates that the identifier for the WT 1/7 pair identifier maps to resource 2020. Arrow 2022 indicates that the identifier for the WT 1/499 pair maps to the resource 2024. Each air link resource unit represented by a small square box, e.g., air link resource 2020 is, e.g., a set of OFDM tone-symbols, where one OFDM tone-symbol is one OFDM tone for the duration of one OFDM symbol transmission time period. In various embodiments, WT 1 selectively monitors traffic control air link resources as a function of an active connection list. For example, consider that the air link resource units of traffic control resources 2016 are used for requests for traffic; however, in this embodiment at this time, WT 1 need only monitor resource units 2020 and 2024 to detect for a peer requesting to send traffic to WT 1. This narrowing down of the traffic control resources to monitor and process is advantageous in that it can reduce the amounts of false alarms and improper response signaling.

Figure 21:
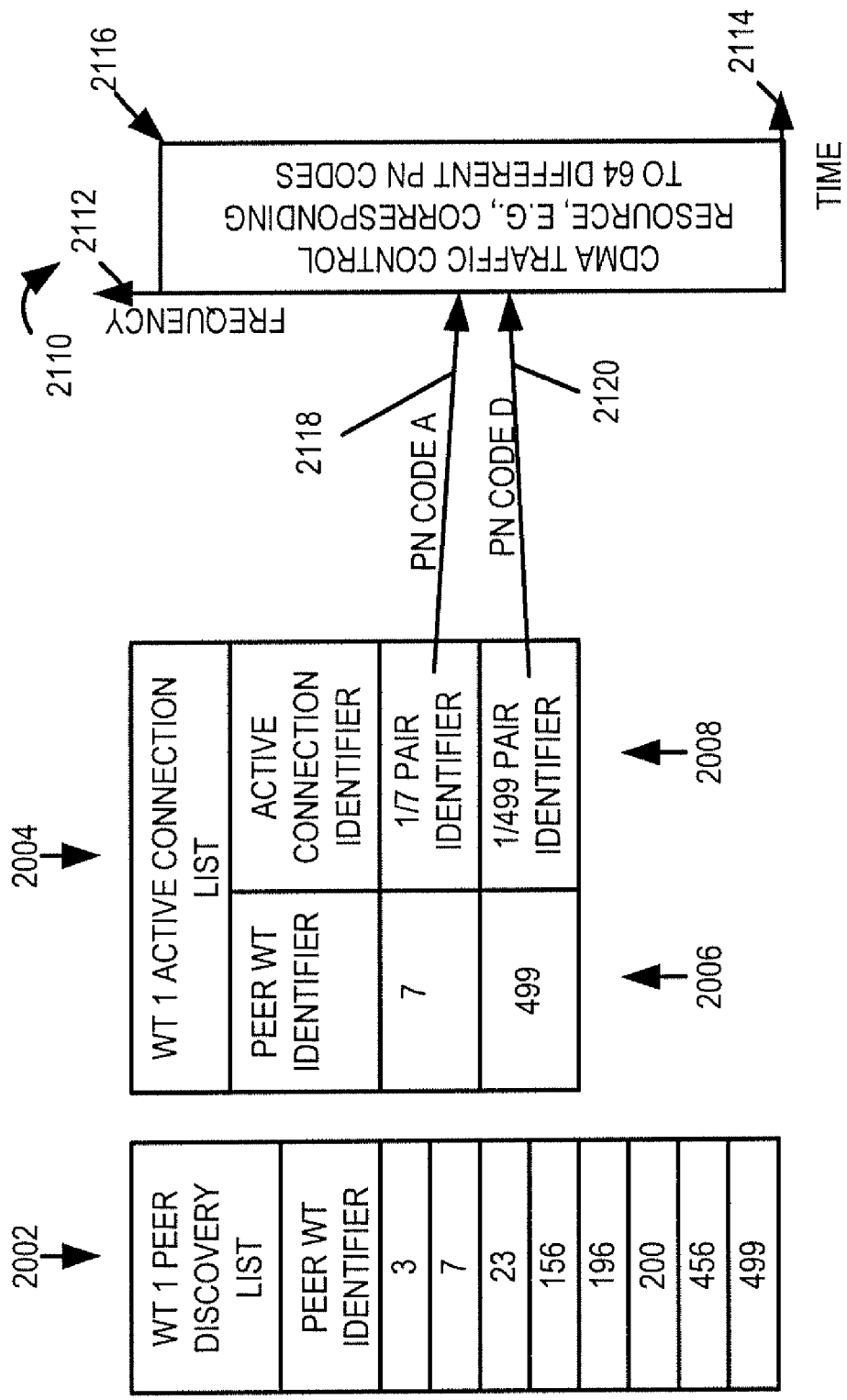
FIG. 21 is an alternative to FIG. 20 for an exemplary embodiment using CDMA signaling.

FIG. 21 is an alternative to FIG. 20 for an exemplary embodiment using CDMA signaling. Exemplary WT 1 peer discovery list 2002 and exemplary WT 1 active connection list 2004, have already been described with respect to FIG. 20. Drawing 2110 includes a plot of frequency on the vertical axis 2112 vs time on the horizontal axis 2114 and is used to illustrate exemplary CDMA traffic control resources 2116. In this example, resources 2116 correspond to 64 different NP codes. Arrow 2118 indicates that the identifier for the WT 1/7 pair maps to NP code A. Arrow 2120 indicates that the identifier for the WT 1/499 pair maps to NP code D. In this example, WT 1 need only monitor for two (NP code A and NP code D) of the 64 different NP codes in the air link resource 2116.

Figure 22:
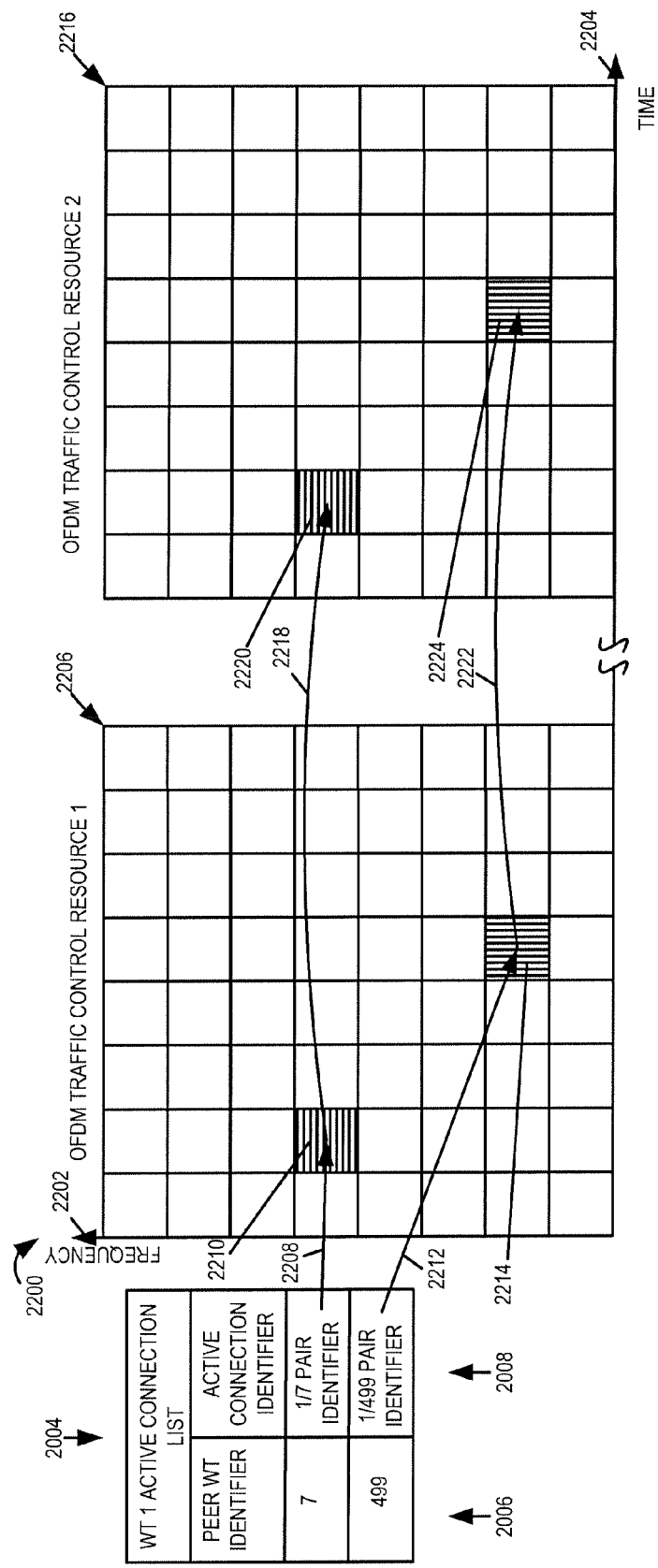
FIG. 22 is a variation on the exemplary embodiment of FIG. 20 illustrating an embodiment in which the position of the OFDM air link traffic control resources associated with an active connection pair remains fixed for multiple traffic control portions.

FIG. 22 is a variation on the exemplary embodiment of FIG. 20 illustrating an embodiment in which the position of the OFDM air link traffic control resources associated with an active connection pair remains fixed for multiple traffic control portions. The multiple traffic control portions, in some embodiments, are included in the same traffic interval. In some embodiments, the multiple control portions are included in different, e.g., successive traffic control intervals during which the active connection remains intact. Active table connection list 2004 has already been described with respect to FIG. 20.

Drawing 2200 includes a plot of frequency on the vertical axis 2202 vs time on the horizontal axis 2204 and is used to illustrate exemplary OFDM traffic control resources (OFDM traffic control resource 1 2206, OFDM traffic control resource 2 2216). Arrow 2208 indicates that the identifier for the WT 1/7 pair maps to resource unit 2210 in traffic control resource 1 2206, while arrow 2218 indicates that the identifier for the WT 1/7 pair maps to resource unit 2220 in traffic control resource 2 2216. Arrow 2212 indicates that the identifier for the WT 1/499 pair maps to resource unit 2214 in traffic control resource 1 2206, while arrow 2222 indicates that the identifier for the WT 1/499 pair maps to resource unit 2224 in traffic control resource 2 2216.

It may be observed that air link resource unit 2210 and air link resource unit 2220 occupy the same relative position in traffic control resource 1 2206 and traffic control resource 2 2216, respectively. Similarly, air link resource unit 2214 and air link resource unit 2224 occupy the same relative position in traffic control resource 1 2206 and traffic control resource 2 2216, respectively.

Figure 23:
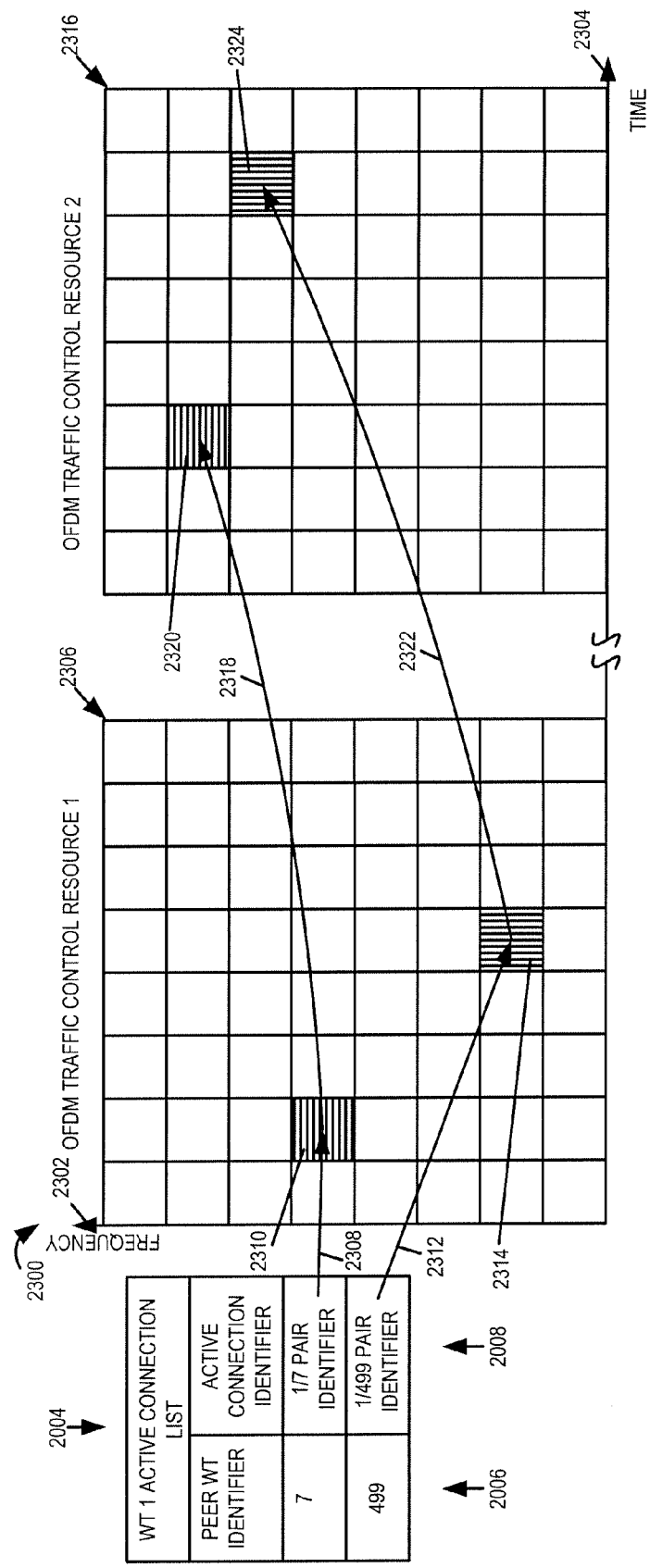
FIG. 23 is a variation on the exemplary embodiment of FIG. 20 illustrating an embodiment in which the position of the OFDM air link traffic control resources associated with an active connection pair varies between multiple traffic control portions.

FIG. 23 is a variation on the exemplary embodiment of FIG. 20 illustrating an embodiment in which the position of the OFDM air link traffic control resources associated with an active connection pair varies between multiple traffic control portions. The multiple traffic control portions, in some embodiments, are included in the same traffic interval. In some embodiments, the multiple control portions are included in different, e.g., successive traffic control intervals during which the active connection remains intact. Active table connection list 2004 has already been described with respect to FIG. 20.

Drawing 2300 includes a plot of frequency on the vertical axis 2302 vs time on the horizontal axis 2304 and is used to illustrate exemplary OFDM traffic control resources (OFDM traffic control resource 1 2306, OFDM traffic control resource 2 2316). Arrow 2308 indicates that the identifier for the WT 1/7 pair maps to resource unit 2310 in traffic control resource 1 2306, while arrow 2318 indicates that the identifier for the WT 1/7 pair maps to resource unit 2320 in traffic control resource 2 2316. Arrow 2312 indicates that the identifier for the WT 1/499 pair maps to resource unit 2314 in traffic control resource 1 2306, while arrow 2322 indicates that the identifier for the WT 1/499 pair maps to resource unit 2324 in traffic control resource 2 2316.

It may be observed that air link resource unit 2310 and air link resource unit 2320 occupy different relative positions in traffic control resource 1 2306 and traffic control resource 2 2316, respectively. Similarly, air link resource unit 2314 and air link resource unit 2324 occupy different relative positions in traffic control resource 1 2306 and traffic control resource 2 2316, respectively.

Although resource units corresponding to an active connection pair, e.g., resource unit 2210, in FIGS. 22 and 23 are shown as contiguous units in terms of time and frequency, in some embodiments, a resource unit such as resource unit 2210 comprises a plurality of components of which some may be, and sometimes are, disjoint, e.g., a set of OFDM tone-symbols which may be dispersed.

In some embodiments, the active connection identifier is an expressly defined value, e.g., associated with particular units in the traffic control resources. In some embodiments, the active connection identifier is implicitly conveyed, e.g., identification information maps to particular units of the air link resource. In some embodiments, the active connection identifier is fixed for particular wireless terminal identifiers, irrespective of time information. In other embodiments, the active connection identifier can vary for the same pair of wireless terminals, e.g., the active connection identifier is derived from information known to both peers, e.g., a common time reference, a value communicated in the paging, etc.

Figure 24A:
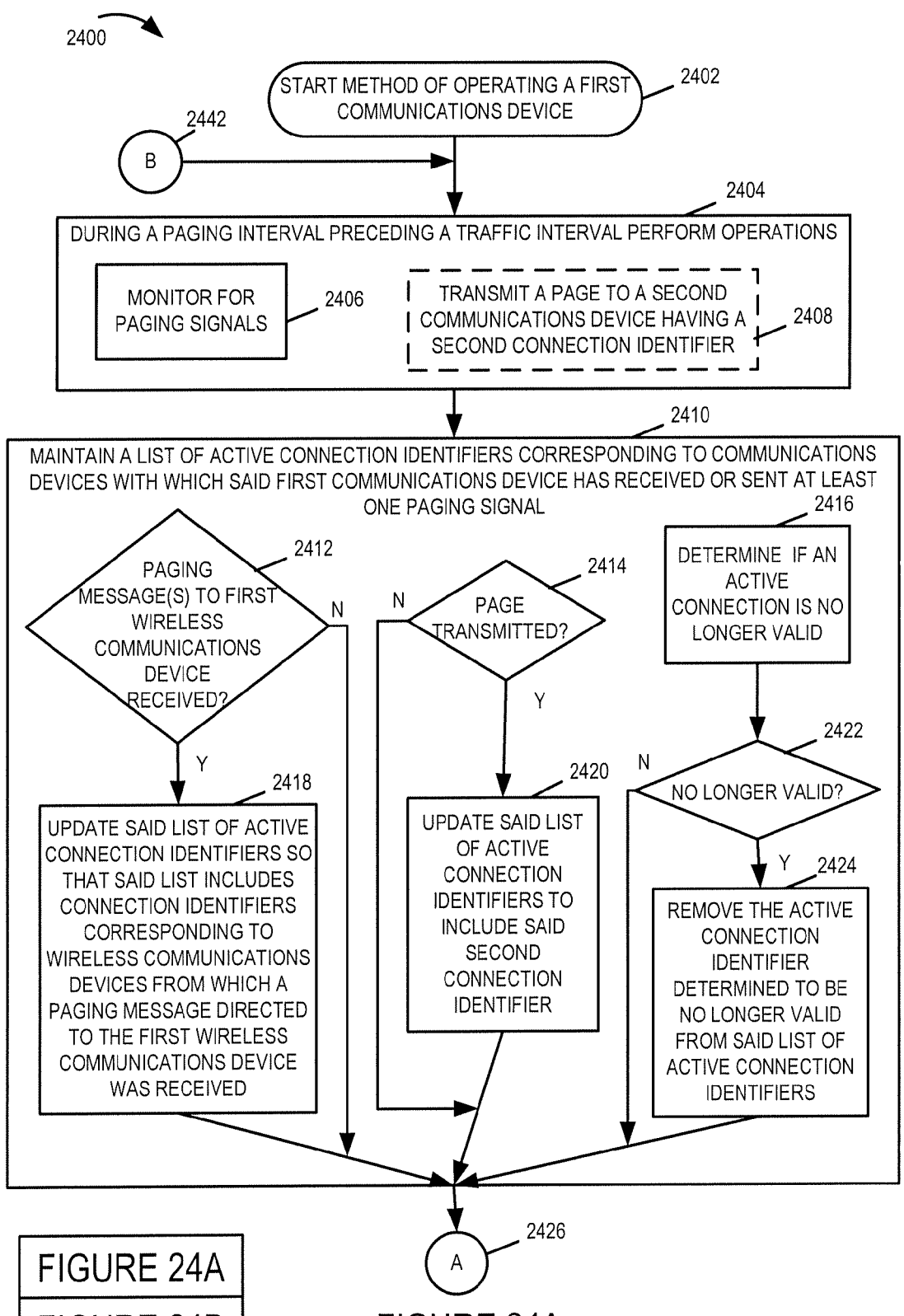
FIG. 24 comprising the combination of FIGS. 24A and 24B is a flowchart of an exemplary method of operating a first communications device in accordance with various embodiments.
Figure 24B:
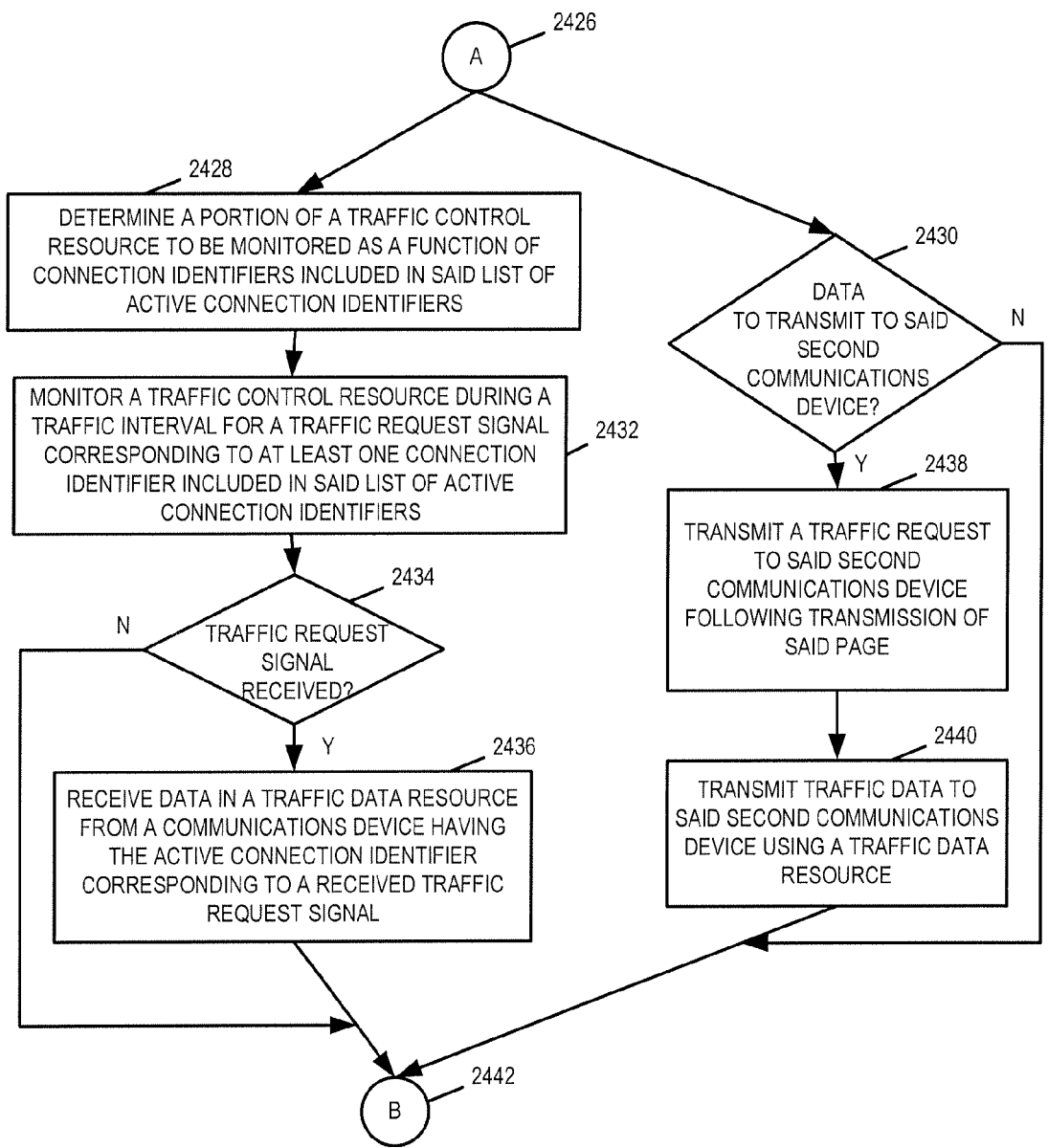

FIG. 24 is a flowchart 2400 of an exemplary method of operating a first communications device in accordance with various embodiments. For example, the first communications device is a wireless terminal such as a mobile node supporting peer to peer communications using OFDM signaling. As another example, the first communications device is a wireless terminal such as a mobile node supporting peer to peer communications using CDMA signaling.

Operation starts in step 2402, where the first communications device is powered on and initialized and proceeds to step 2404. In step 2404, the first communications device, during a paging interval preceding a traffic interval, performs operations. Step 2404 includes sub-step 2406, and at times includes sub-step 2408. In sub-step 2406, the first communications device monitors for paging signals. In sub-step 2408, the first communications device transmits a page to a second communications device having a second connection identifier. Operation proceeds from step 2404 to step 2410.

In step 2410, the first communications device maintains a list of active connection identifiers corresponding to communications devices with which said first communications device has received or sent at least one paging signal. Step 2410 includes sub-steps 2412, 2414, 2416, 2418, 2420 2422 and 2424. In sub-step 2412, the first communications device checks if a paging message or messages to the first communications device were received. If it is determined in sub-step 2412, that a page directed to the first communications device was received, then operation proceeds from sub-step 2412 to sub-step 2418; otherwise step 2418 is bypassed and operation proceeds to connecting node A 2426. In sub-step 2418, the first wireless communications device updates said list of active connection identifiers so that the list includes connection identifiers corresponding to wireless communications devices from which a paging message directed to the first wireless communications device was received.

In sub-step 2414, the first communications device determines if a page was transmitted by the first communications device, and if a page was transmitted then operation proceeds from sub-step 2414 to sub-step 2420; otherwise step 2420 is bypassed and operation proceeds to connecting node A 2426. In sub-step 2420, the first communications device updates said list of active connection identifiers to include said second connection identifier.

In sub-step 2416, the first communications device determines if an active connection is no longer valid. In some embodiments, determining if an active connection identifier is no longer valid includes processing a connection termination signal corresponding to the communications device to which said active connection identifier also corresponds. In some embodiments, determining if an active connection identifier is no longer valid includes detecting expiration of a timeout trigger, said timeout trigger being a function of signals sent to the communication device corresponding to said active connection identifier or received from said communications device corresponding to said active connection identifier. Operation proceeds from step 2416 to step 2422. In step 2422, the first communications device checks if the determination of step 2416 indicates that an active connection is no longer valid, and if the connection is no longer valid, operation proceeds from step 2422 to step 2424; otherwise step 2422 is bypassed and operation proceeds to connecting node A 2426. In step 2424, the first communications device removes the active connection identifier determined to be no longer valid from said list of active connection identifiers. Operation proceeds from step 2410 via connecting node A 2426 to steps 2428 and 2430.

In step 2428, the first communications device determines a portion of a traffic control resource to be monitored as a function of connection identifiers included in said list of active connection identifiers. In some embodiments, determining the portion of the traffic control resource to be monitored is also a function of a time index of said traffic interval.

Operation proceeds from step 2428 to step 2432. In step 2432, the first communications device monitors a traffic control resource during a traffic interval for a traffic request signal corresponding to at least one connection identifier included in said list of active connection identifiers. In various embodiments, the traffic control resource includes a plurality of resource unit subsets, and monitoring a traffic control resource includes monitoring less than the full set of resource unit subsets. In some embodiments, monitoring a traffic control resource includes monitoring to detect the presence of a predetermined waveform on said traffic control resource. In some embodiments, the predetermined waveform is an OFDM waveform. In some embodiments, the predetermined waveform is a NP sequence waveform. In various embodiments, the predetermined waveform is a function of at least one connection identifier included in said list of active connection identifiers.

Operation proceeds from step 2432 to step 2434. In step 2434, the first communications device determines whether or not a traffic request signal was received. If a traffic request signal was received operation proceeds from step 2434 to step 2436; otherwise step 2436 is bypassed and operation proceeds to connecting node B 2442. In step 2436, the first communications device receives data in a traffic data resource from a communications device having the active connection identifier corresponding to a received traffic request signal.

Returning to step 2430, in step 2430 the first communications device determines if there is data to be communicated, e.g., transmitted, to the second communications device. If there is data to be communicated to the second communications device, then operation proceeds from step 2430 to step 2438; otherwise steps 2438 and 2440 are bypassed and operation proceeds to connecting node B 2442. In step 2438, the first communications device transmits a traffic request to the second communications device following transmission of said page to the second communications device. Operation proceeds from step 2438 to step 2440, in which the first communications device transmits traffic data to the second communications device using a traffic data resource.

Operation proceeds from step 2436 and step 2440 to connecting node B 2442. From connecting node B 2442 operation returns to step 2404, where operations are performed during another paging interval.

Figure 25:
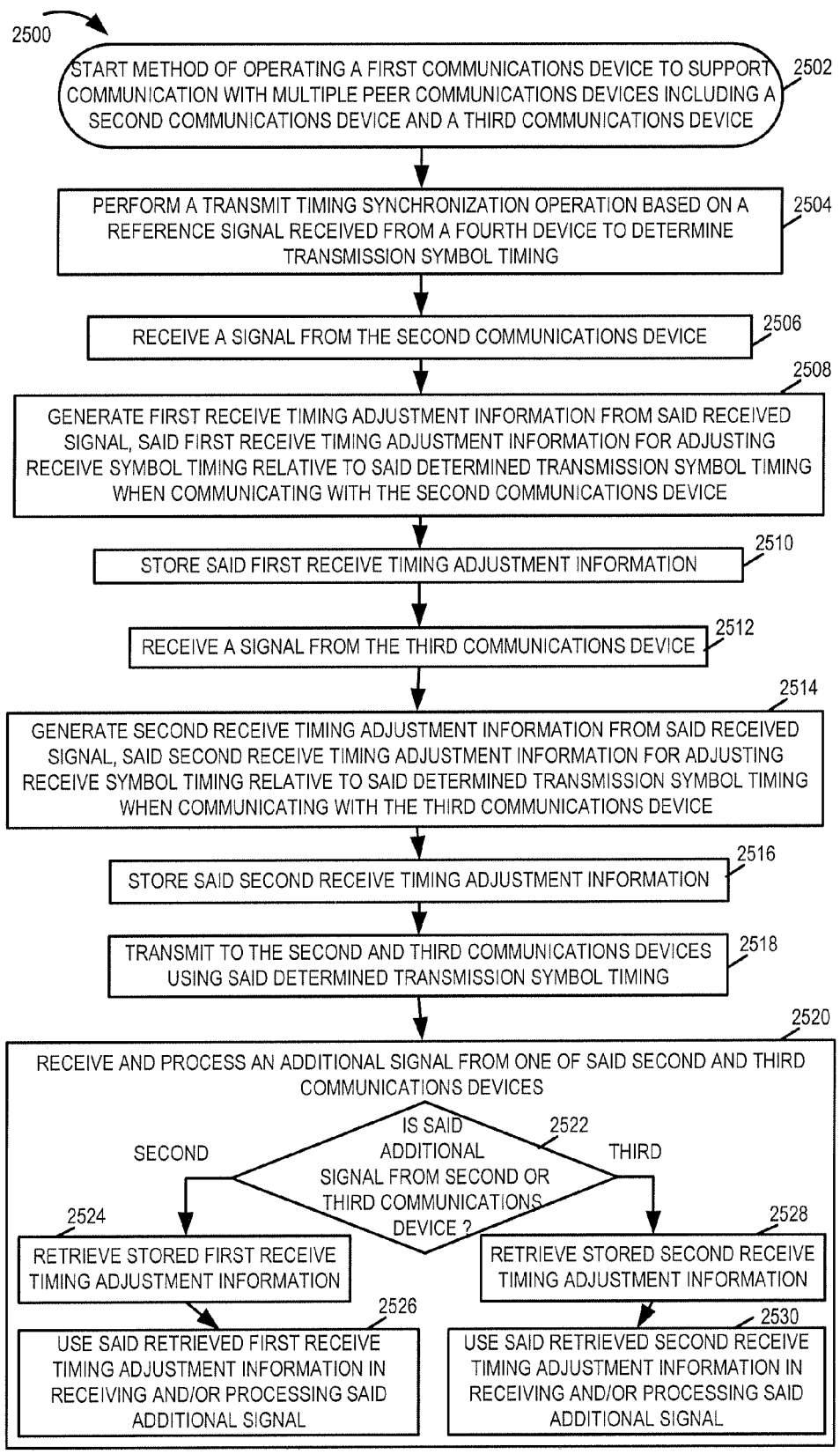
FIG. 25 is a flowchart of an exemplary method of operating a first communications device to support communications with multiple peer wireless communications devices including a second communications device and a third communications device in accordance with various embodiments.

FIG. 25 is a flowchart 2500 of an exemplary method of operating a first communications device to support communications with multiple peer wireless communications devices including a second communications device and a third communications device in accordance with various embodiments. The exemplary first, second, and third communications devices are, e.g., wireless terminals such as mobile nodes supporting peer to peer communications. In some embodiments, the communications devices use OFDM signaling for peer to peer communications. In some embodiments, the communications devices use CDMA signaling for peer to peer communications.

The exemplary method starts in step 2502, where the first communications device is powered on and initialized and proceeds from start step 2502 to step 2504. In step 2504, the first communications device performs a transmit timing synchronization operation based on a reference signal received from a fourth device to determine transmission symbol timing. In some embodiments, the fourth device is one of: a base station, a beacon signal transmitter which does not transmit user data, and a satellite. In various embodiments, the transmit timing is not adjusted based on signals received from said second and third communications devices.

Operation proceeds from step 2504 to step 2506. In step 2506, the first communications device receives a signal from a second communications device. In some embodiments, the received signal from the second communications device is one of a traffic signal sent from the second communications device to the first communications device and a traffic signal sent from the second communications device to another communications device. In some embodiments, the received signal from the second communications device is a wideband timing synchronization signal including at least some predetermined known modulation symbols and at least some intentional nulls.

Operation proceeds from step 2506 to step 2508. In step 2508, the first communications device generates first receive timing adjustment information from said received signal from the second communications device, said receive timing adjustment information for adjusting receive symbol timing relative to said determined transmission symbol timing when communicating with the second communications device. Then, in step 2510, the first communications device stores said first receive timing adjustment information. Operation proceeds from step 2510 to step 2512.

In step 2512, the first communications device receives a signal from a third communications device. In some embodiments, the received signal from the third communications device is one of a traffic signal sent from the third communications device to the first communications device and a traffic signal sent from the third communications device to another communications device. In some embodiments, the received signal from the third communications device is a wideband timing synchronization signal including at least some predetermined known modulation symbols and at least some intentional nulls.

Operation proceeds from step 2512 to step 2514. In step 2514, the first communications device generates second receive timing adjustment information from said received signal from the third communications device, said receive timing adjustment information for adjusting receive symbol timing relative to said determined transmission symbol timing when communicating with the third communications device. Then, in step 2516, the first communications device stores said second receive timing adjustment information. Operation proceeds from step 2516 to step 2518. In step 2518, the first communications device transmits to the second and third communications devices using said determined transmission symbol timing. Operation proceeds from step 2518 to step 2520.

In step 2520, the first communications device receives and processes an additional signal from one of said first and second communications devices. Step 2520 includes sub-steps 2522, 2524, 2526, 2528, and 2530. In sub-step 2522, the first communications device determines if the additional signal is from the second or third communications device. If the additional signal is from the second communications device, then operation proceeds to sub-step 2524; however, if the additional signal is from the third communications device then operation proceeds to step 2528. In step 2524, the first communications device retrieves stored first receive timing adjustment information. Operation proceeds from sub-step 2524 to sub-step 2526. In sub-step 2526, the first communications device uses said retrieved first receive timing adjustment information in receiving and/or processing the additional signal.

Returning to step 2528, in step 2528, the first communications device retrieves stored second receive timing adjustment information. Operation proceeds from sub-step 2528 to sub-step 2530. In sub-step 2530, the first communications device uses said retrieved second receive timing adjustment information in receiving and/or processing the additional signal.

Figure 26:
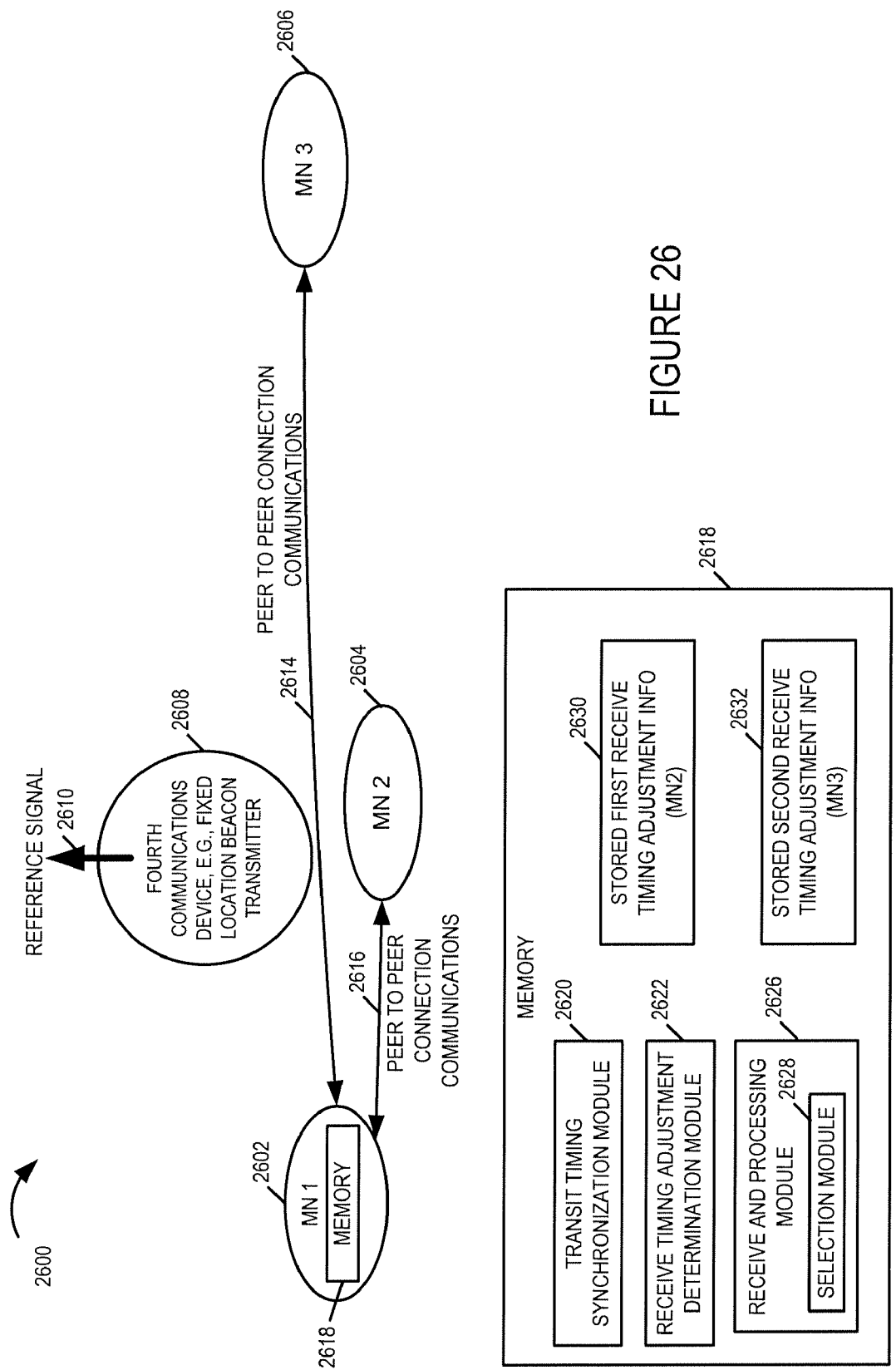
FIG. 26 is a drawing of an exemplary wireless communications system supporting peer to peer communications in accordance with various embodiments.

FIG. 26 is a drawing of an exemplary wireless communications system 2600 supporting peer to peer communications in accordance with various embodiments. Exemplary wireless communications system 2600 includes a plurality of mobile nodes (MN 1 2602, MN 2 2604, MN 3 2606) which may, and sometimes do, communicate with one other using peer to peer communication signaling connections. Exemplary system 2600 also includes a fourth node 2608, e.g., a fixed location beacon transmitter. Fourth communications device 2608 transmits a reference signal 2610 which is used by the mobile nodes to achieve a coarse level of synchronization and in performing a transmission time synchronization operation. A mobile node, e.g., MN 1 2602, implements the methods of flowchart 2500 of FIG. 25. Arrow 2616 indicates that MN 1 2602 and MN 2 2604 have a peer to peer communications connection; arrow 2614 indicates that MN 1 2602 and MN 3 2606 have a peer to peer communications connection.

MN 1 2602 includes a receiver, a transmitter, a processor, and memory 2618 which are coupled together and interchange data and information. Memory 2618 includes routines and data/information. The processor, e.g., a CPU, executes the routines and uses the data/information in memory 2618 to control the operation of MN 1 2602 and implement methods.

Memory 2618 includes a transmit timing synchronization module 2620, a receive timing adjustment determination module 2622, and a receive and processing module 2626. The receive and processing module 2626 includes a selection module 2628. Memory 2618 also includes stored first receive timing adjustment information 2630 corresponding to MN 2 and stored second receive timing adjustment information 2632 corresponding to MN 3. In this example, the magnitude of the stored second receive timing adjustment information 2632 is larger, at this time, than the magnitude of the stored first receive timing adjustment information, e.g., as a function of the positions of the MNs.

Transmit timing synchronization module 2620 performs a transmit time synchronization operation based on the reference signal 2610 received from the fourth node 2608 to determine transmission symbol timing to be used by MN 1. Receive timing adjustment determination module 2622 determines receive timing information to be used by MN 1 corresponding to different peer MNs. Stored first receive timing adjustment information 2630 corresponding to MN 2 2604 and stored second receive timing adjustment information 2632 corresponding to MN 3 2606 are outputs of module 2622. Receive and processing module 2626 receives and processes peer to peer communications signals from other MNs, e.g., MN 2 and MN 3. As part of the receiving and processing operations stored timing adjustment information is retrieved and used by module 2626. Selection module 2628 selects the appropriate stored timing adjustment information to use, e.g., one of information 2630 and information 2632, to match the source of the signal.

Figure 27:
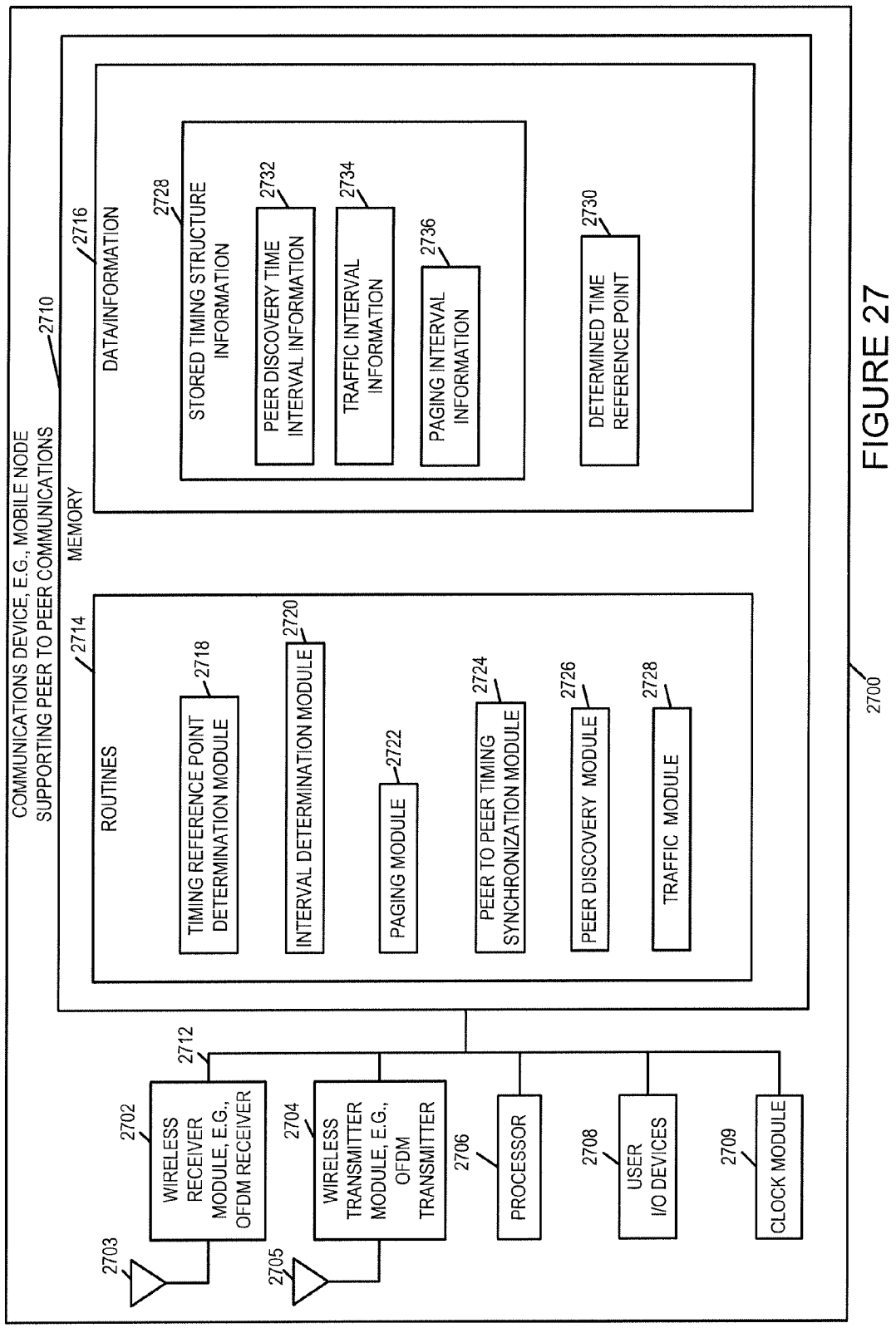
FIG. 27 is a drawing of an exemplary communications device, e.g., mobile node supporting peer to peer communications in accordance with various embodiments.

FIG. 27 is a drawing of an exemplary communications device 2700, e.g., mobile node supporting peer to peer communications in accordance with various embodiments. Exemplary communications device 2700 includes a wireless receiver module 2702, a wireless transmitter module 2704, a processor 2706, user I/O devices 2708, a clock module 2709, and memory 2710 coupled together via a bus 2712 over which the various elements may interchange data and information. Memory 2710 includes routines 2714 and data/information 2716. The processor 2706, e.g., a CPU, executes the routines 2714 and uses the data/information 2716 in memory 2710 to control the operation of the communications device 2700 and implement methods, e.g., the method of flowchart 300 of FIG. 3.

Wireless receiver module 2702, e.g., an OFDM receiver, is coupled to receive antenna 2703 via which the communications device 2700 receives signals. Received signals include, e.g., broadcast signals used to determine a timing reference point, signals identifying the presence of peers, signals used to perform a timing synchronization operation with respect to a peer or peers, traffic signals from a peer, and/or paging signals from a peer.

Wireless transmitter module 2704, e.g., an OFDM transmitter, is coupled to transmit antenna 2705 via which the communications device 2700 transmits signals to peers. In some embodiments, the same antenna is used for transmitter and receiver. Transmitted signals include, e.g., signals annunciating the presence of communications device 2700, signals used for timing synchronization with a peer, signals used to page a peer, and/or traffic signals directed to a peer.

User I/O devices 2708 include, e.g., microphone, keyboard, keypad, switches, camera, speaker, display, etc. User I/O devices 2708, allow a user to input data/information, access output data/information, and control at least some functions of the communications device, e.g., initiate sending of a page to a particular peer node, start a communications session with a peer node, terminate a communications session with a peer node, etc.

Clock module 2709, e.g., a module including an oscillator chip, is used in maintaining current internal timing of the communications device 2700, e.g., as the communications device 2700 is operated through a recurring timing structure.

Routines 2714 include a timing reference point determination module 2718, an interval determination module 2720, a paging module 2722, a peer to peer timing synchronization module 2724, a peer discovery module 2726, and a traffic module 2728. Data/information 2716 includes stored timing structure information 2728 and a determined time reference point 2730. Stored timing structure information 2728 includes peer discovery time interval information 2732, traffic interval information 2734 and paging interval information 2736.

Timing reference point determination module 2718 determines a time reference point. For example, the peer to peer communications network, in some embodiments, follows a recurring timing structure and the recurring timing structure is referenced to an external signal, e.g., a broadcast signal from a satellite, a broadcast signal from a base station in a cellular network, or a beacon transmitter that doesn't communicate user data. The communications device 2700 upon powering up, may be unaware of the current position within the recurring timing structure being used by the peer to peer network. Timing reference point determination module 2718 performs a coarse level of synchronization with respect to the recurring peer to peer timing structure. Determined time reference point 2730 is an output of timing reference point determination module 2718.

In this embodiment, the recurring timing structure used by the peer to peer network includes various predefined intervals such as peer discovery time intervals, traffic intervals and paging intervals. The interval determination module 2720 uses the stored timing structure information 2728 and determined time reference point 2730 to determine the particular type of interval corresponding to a point in time, e.g., a current time. Based on the result of the interval determination module 2720 operation is transferred to various other modules such as the peer discovery module 2726, the peer to peer timing synchronization module 2724, the paging module 2722, and the traffic module 2728.

Peer discovery module 2726 performs peer discovery operations during peer discovery intervals, e.g., detecting beacon signals identifying peer nodes in the vicinity. Peer to peer timing synchronization module 2724 performs timing synchronization during peer to peer timing synchronization intervals. In some embodiments, the peer to peer timing synchronization intervals are included as part of the peer discovery time intervals. The timing reference point determination module 2718 is used to achieve a coarse level of timing synchronization with respect to a recurring peer to peer timing structure, while the peer to peer timing synchronization module 2724 is used to provide a more refined level of synchronization between peer nodes.

Paging module 2722 performs paging operations during paging intervals, e.g., processing signals identifying that the communications device 2700 is being paged by a peer and/or generating a page signal directed to a peer node to indicate that communications device 2700 is paging the peer node. Traffic module 2728 performs traffic operations during traffic intervals, e.g., generating traffic signals communicating user data, e.g., voice, image, text, file data, etc., to a peer and/or processing received signals communicating user data from a peer.

The various modules (2722, 2724, 2726, 2728) also control operations within wireless receiver module 2702 and wireless transmitter module 2704.

In various embodiments, the stored timing structure information 2728 indicates that multiple paging intervals occur between peer discovery time intervals during at least one period of time for which timing structure information is stored. In some embodiments, the traffic intervals occupy more time than the time occupied by the combination of paging time intervals and peer discovery time intervals during one iteration of a communications timing structure defined by the stored timing structure information.

Figure 28:
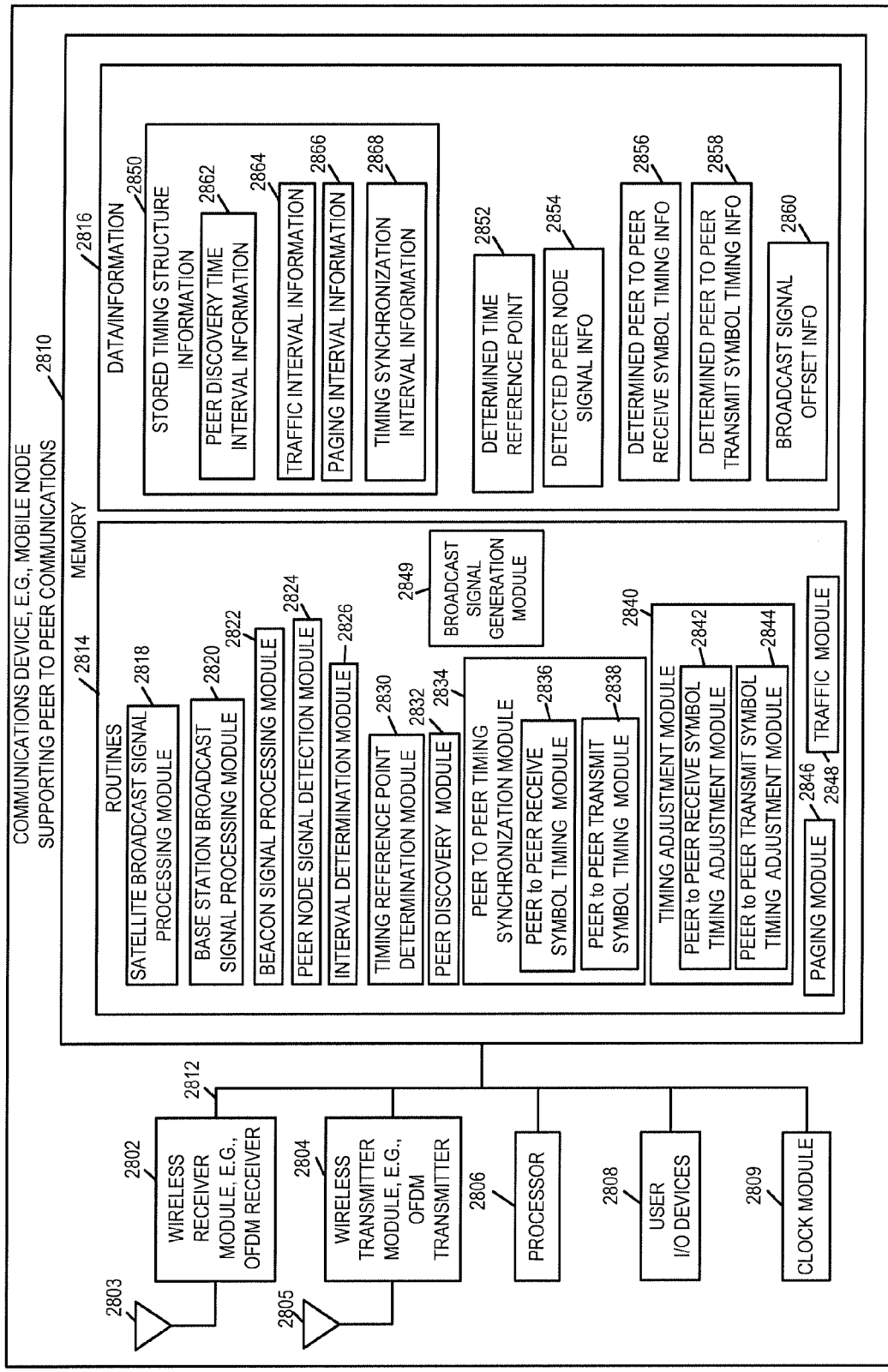
FIG. 28 is a drawing of an exemplary communications device, e.g., mobile node supporting peer to peer communications in accordance with various embodiments.

FIG. 28 is a drawing of an exemplary communications device 2800, e.g., mobile node supporting peer to peer communications in accordance with various embodiments. Exemplary communications device 2800 includes a wireless receiver module 2802, a wireless transmitter module 2804, a processor 2806, user I/O devices 2808, a clock module 2809, and memory 2810 coupled together via a bus 2812 over which the various elements may interchange data and information. Memory 2810 includes routines 2814 and data/information 2816. The processor 2806, e.g., a CPU, executes the routines 2814 and uses the data/information 2816 in memory 2810 to control the operation of the communications device 2800 and implement methods, e.g., the method of flowchart 400 of FIG. 4.

Wireless receiver module 2802, e.g., an OFDM receiver, is coupled to receive antenna 2803 via which the communications device 2800 receives signals. Received signals include, e.g., broadcast signals used to determine a timing reference point, signals identifying the presence of peers, signals used to perform a timing synchronization operation with respect to a peer or peers, traffic signals from a peer, and/or paging signals from a peer.

Wireless transmitter module 2804, e.g., an OFDM transmitter, is coupled to transmit antenna 2805 via which the communications device 2800 transmits signals to peers. In some embodiments, the same antenna is used for transmitter and receiver. Transmitted signals include, e.g., signals annunciating the presence of communications device 2800, signals used for timing synchronization with a peer, signals used to page a peer, and/or traffic signals directed to a peer.

User I/O devices 2808 include, e.g., microphone, keyboard, keypad, switches, camera, speaker, display, etc. User I/O devices 2808, allow a user to input data/information, access output data/information, and control at least some functions of the communications device, e.g., initiate sending of a page to a particular peer node, start a communications session with a peer node, terminate a communications session with a peer node, etc.

Clock module 2809, e.g., a module including an oscillator chip, is used in maintaining current internal timing of the communications device 2800, e.g., as the communications device 2800 is operated through a recurring timing structure.

Routines 2814 include a satellite broadcast signal processing module 2818, a base station broadcast signal processing module 2820, a beacon signal processing module 2822, a peer node signal detection module 2824, an interval determination module 2826, a timing reference point determination module 2830, a peer discovery module 2832, a peer to peer timing synchronization module 2834, a timing adjustment module 2840, a paging module 2846, a traffic module 2848, and a broadcast signal generation module 2849. Peer to peer timing synchronization module 2834 includes a peer to peer receive symbol timing module 2836 and a peer to peer transmit symbol timing module 2838. Timing adjustment module 2840 includes a peer to peer receive symbol timing adjustment module 2842 and a peer to peer transmit symbol timing adjustment module 2844.

Data/information 2816 includes stored timing structure information 2850, a determined time reference point 2852, detected peer node signal information 2854, determined peer to peer receive symbol timing information 2856, determined peer to peer transmit symbol timing information 2858 and broadcast signal offset information 2860. Stored timing structure information 2850 includes peer discovery time interval information 2862, traffic interval information 2864, paging interval information 2866 and timing synchronization interval information 2868.

Satellite broadcast signal processing module 2818 processes a received broadcast signal corresponding to a signal transmitted from a satellite, the received broadcast signal serving as a reference to be used in determining a timing reference point in a peer to peer timing structure. Base station broadcast signal processing module 2820 processes a received broadcast signal corresponding to a signal transmitted from a base station in a cellular network, the received broadcast signal serving as a reference to be used in determining a timing reference point in a peer to peer timing structure. Beacon signal processing module 2822 processes a received broadcast signal corresponding to a signal transmitted from a beacon transmitter that does not transmit user data, the received broadcast signal serving as a reference to be used in determining a timing reference point in a peer to peer timing structure.

Timing reference point determination module 2830 uses a received broadcast signal to determine a time reference point. For example, the peer to peer communications network, in some embodiments, follows a recurring timing structure and the recurring timing structure is referenced to an external signal, e.g., one of a broadcast signal from a satellite, a broadcast signal from a base station in a cellular network, or a beacon transmitter that doesn't communicate user data. In some embodiments, at different locations, different sources are used to obtain a reference broadcast signal. For example, in some locations where cellular networks exist, a base station is used to provide the reference broadcast signal; in some remote areas beacon transmitters are used to provide a broadcast reference signal for peer to peer timing; in some remote areas satellite broadcast signals are used to provide a broadcast reference signal for peer to peer timing The communications device 2800 upon powering up, may be unaware of the current position within the recurring timing structure being used by the peer to peer network. Timing reference point determination module 2830 performs a coarse level of synchronization with respect to the recurring peer to peer timing structure. Determined time reference point 2852 is an output of timing reference point determination module 2830.

In this embodiment, the recurring timing structure used by the peer to peer network includes various predefined intervals such as peer discovery time intervals, traffic intervals, paging intervals, and timing synchronization intervals. The interval determination module 2826 uses the stored timing structure information 2850 and determined time reference point 2852 to determine the particular type of interval corresponding to a point in time, e.g., a current time. Based on the result of the interval determination module 2826 operation is transferred to various other modules such as the peer discovery module 2832, the peer to peer timing synchronization module 2834, the paging module 2846, and the traffic module 2848.

Peer discovery module 2832 performs peer discovery operations during peer discovery intervals, e.g., detecting beacon signals identifying peer nodes in the vicinity.

Peer node signal detection module 2824 detects a signal transmitted by a peer communications device. In some embodiments, the detected signal from the peer communications device is a traffic signal used to communicate user data. In some embodiments, the detected signal is a predetermined broadcast signal. In some such embodiments, the predetermined broadcast signal is one of a multi-tone time varying signal and a predetermined time varying NP sequence signal. The detected signal transmitted by a peer communications device is, in some embodiments, a predetermined broadcast signal received from a peer communications device in one of a plurality of recurring timing synchronization intervals.

Peer to peer timing synchronization module 2834 performs timing synchronization during peer to peer timing synchronization intervals. In some embodiments, the peer to peer timing synchronization intervals are included as part of the peer discovery time intervals. The timing reference point determination module 2830 is used to achieve a coarse level of timing synchronization with respect to a recurring peer to peer timing structure, while the peer to peer timing synchronization module 2834 is used to provide a more refined level of synchronization between peer nodes. Peer to peer receive symbol timing module 2836 determines determined peer to peer receive symbol timing information 2856 which is subsequently used by timing adjustment module 2842. Peer to peer transmit symbol timing module 2838 determines determined peer to peer transmit symbol timing information 2858 which is subsequently used by timing adjustment module 2844.

Timing adjustment module 2840 adjusts at least one of peer to peer receive symbol timing and peer to peer transmit symbol timing as a function of the detected signal from peer node signal detection module 2824. Peer to peer receive symbol timing adjustment module 2842 uses the determined peer to peer receive symbol timing information 2856 to adjust peer to peer receive symbol timing in wireless receiver module 2802. Peer to peer transmit symbol timing adjustment module 2844 uses the determined peer to peer transmit symbol timing information 2858 to adjust peer to peer transmit symbol timing in wireless transmit module 2804.

Paging module 2846 performs paging operations during paging intervals, e.g., processing signals identifying that the communications device 2800 is being paged by a peer and/or generating a page signal directed to a peer node to indicate that communications device 2800 is paging a peer node. Traffic module 2848 performs traffic operations during traffic intervals, e.g., generating traffic signals communicating user data, e.g., voice, image, text, file data, etc., to a peer and/or processing received signals communicating user data from a peer.

Broadcast signal generation module 2849 generates a predetermined broadcast signal to be transmitted in a time interval having a predetermined offset from the determined time reference point. The predetermined offset is indicated in broadcast signal offset information 2860. The generated broadcast signal is, e.g., a user beacon indicating the presence of communications device 2800 to other peer communications devices which may be in the local vicinity. Alternatively, and/or in addition, the generated broadcast signal is, e.g., a timing synchronization signal, such as a wideband synchronization signal to be used by a peer node in the vicinity of communications device 2800 to achieve symbol timing synchronization.

In various embodiments, the stored timing structure information 2850 indicates that multiple paging intervals occur between peer discovery time intervals during at least one period of time for which timing structure information is stored. In some embodiments, the traffic intervals occupy more time than the time occupied by the combination of paging time intervals and peer discovery time intervals during one iteration of a communications timing structure defined by the stored timing structure information.

Determined time reference point 2852 is an output of timing reference point determination module 2830 and is subsequently used by interval determination module 2826, peer node signal detection module 2824, peer to peer timing synchronization module 2834, and broadcast signal generation module 2849. Detected peer node signal information 2854 is an output of peer node signal detection module 2824 and is used by peer to peer timing synchronization module 2834. Determined peer to peer receive symbol timing information 2856 is an output of module 2836 and is used by module 2842. Determined peer to peer transmit symbol timing information 2858 is an output of module 2838 and is used by module 2844. Broadcast signal offset information 2860 is used to determine when a broadcast signal generated by module 2849 is to be broadcast using wireless transmitter 2804.

Figure 29:
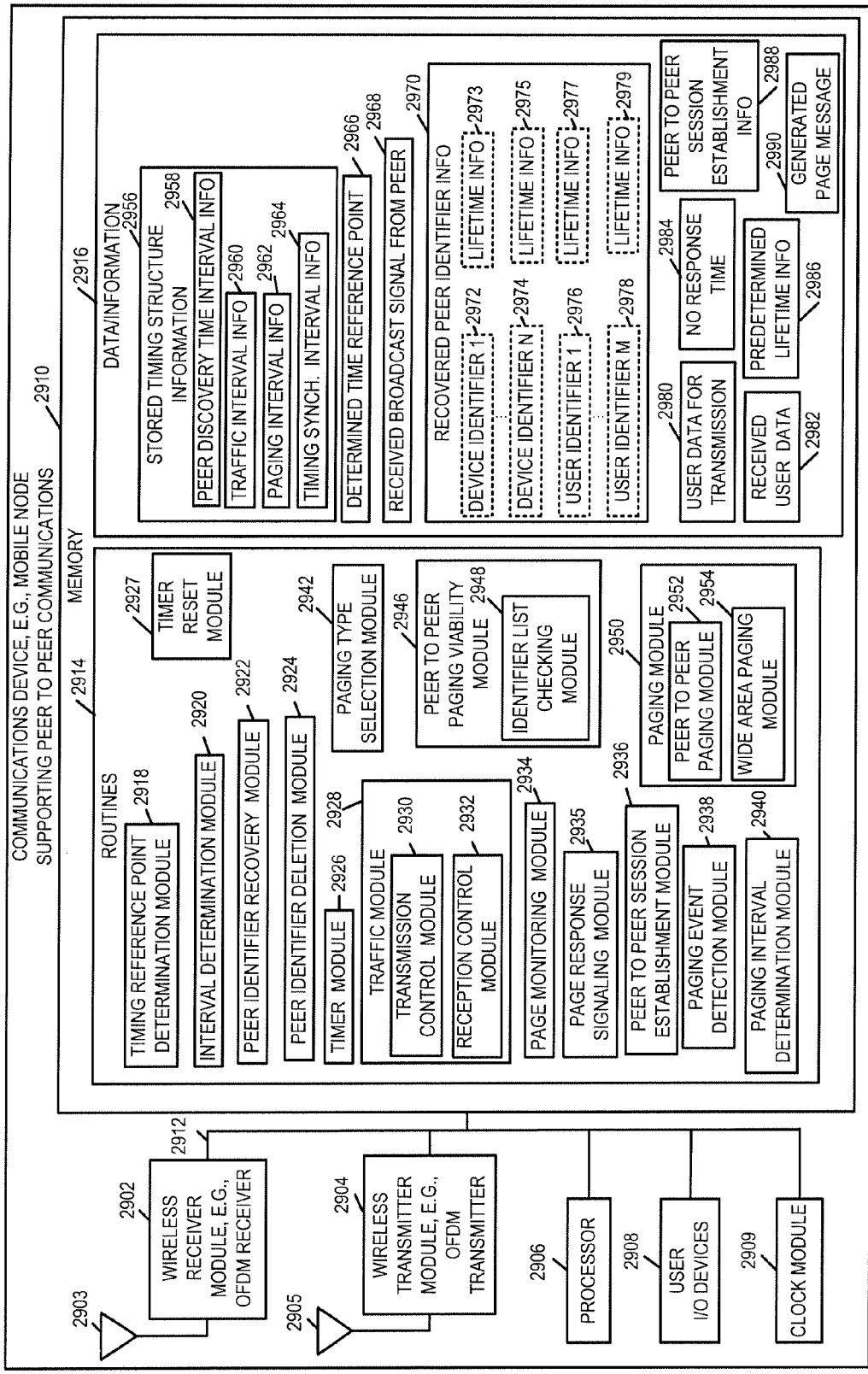
FIG. 29 is a drawing of an exemplary communications device, e.g., mobile node supporting peer to peer communications, in accordance with various embodiments.

FIG. 29 is a drawing of an exemplary communications device 2900, e.g., mobile node supporting peer to peer communications, in accordance with various embodiments. Exemplary communications device 2900 includes a wireless receiver module 2902, a wireless transmitter module 2904, a processor 2906, user I/O devices 2908, a clock module 2909, and memory 2910 coupled together via a bus 2912 over which the various elements may interchange data and information. Memory 2910 includes routines 2914 and data/information 2916. The processor 2906, e.g., a CPU, executes the routines 2914 and uses the data/information 2916 in memory 2910 to control the operation of the communications device 2900 and implement methods, e.g., the method of flowchart 500 of FIG. 5.

Wireless receiver module 2902, e.g., an OFDM receiver, is coupled to receive antenna 2903 via which the communications device 2900 receives signals. Received signals include timing reference broadcast signals, e.g., from satellites, base stations, and/or beacon signal transmitters, the timing reference signal to be used to establish a coarse level of synchronization with a recurring peer to peer timing structure. Received signals also include, peer node identification signals, e.g., peer node user beacon signals, peer node timing synchronization signals, peer node paging signals, base station paging signals, peer to peer session establishment signals, and peer to peer traffic signals. Wireless receiver module 2902 receives, during a peer discovery time interval, a broadcast signal from a peer communications device.

Wireless transmitter module 2904, e.g., an OFDM transmitter, is coupled to transmit antenna 2905 via which the communications device 2900 transmits signals. In some embodiments, the same antenna is used for transmitter and receiver. Transmitted signals include a peer node identification signal, e.g., a peer node user beacon signal conveying at least one of a device identifier and a user identifier, peer node timing synchronization signals, a peer to peer paging signal, a paging signal directed to a base station to be forwarded as a wide area paging signal, peer to peer session establishment signals, and peer to peer traffic signals.

User I/O devices 2908 include, e.g., microphone, keyboard, keypad, mouse, switches, camera, speaker, display. User I/O devices 2908 allow a user of communications device 2900 to input user data to be directed to a peer, access output user data from a peer, and control at least some functions of the communications device, e.g., page a peer node, establish a peer to peer communications session, terminate a peer to peer communications session.

Clock module 2909, e.g., a module including an oscillator chip, is used in maintaining current internal timing of the communications device 2900, e.g., as the communications device 2900 is operated through a recurring peer to peer timing structure.

Routines 2914 include a timing reference point determination module 2918, an interval determination module 2920, a peer identifier recovery module 2922, a peer identifier deletion module 2924, a timer module 2926, a timer reset module 2927, a traffic module 2928, a page monitoring module 2934, a page response signaling module 2935, a peer to peer session establishment module 2936, a paging event detection module 2938, a paging interval determination module 2940, a paging type selection module 2942, a peer to peer paging viability module 2946, and a paging module 2950.

Timing reference point determination module 2918 uses a received broadcast signal, e.g., from a satellite, base station, or beacon signal transmitter to determine a time reference point in a recurring peer to peer timing structure. Interval determination module 2920 determines a current interval type in a recurring peer to peer timing structure. Operations of interval determination module 2920 include accessing and using the stored timing structure information 2956 including the paging interval information 2962 to determine recurring paging intervals.

Peer identifier recovery module 2922 recovers an identifier from a received broadcast signal from a peer communications device, which was received during a peer discovery time interval. The recovered identifier is one a device identifier and a user identifier. Peer identifier recovery module 2922 also stores the recovered identifier in recovered peer identifier information 2970 in memory 2910. Device identifier 1 2972, device identifier N 2974, user identifier 1 2976, user identifier M 2978 are examples of stored recovered peer identifiers.

Peer identifier deletion module 2924 deletes a received identifier from memory in response to determining that a signal from a peer communications device corresponding to the identifier has not been detected within a period of time. In some embodiments, the period of time is a predetermined period of time, e.g., the predetermined period of time indicated by no response time information 2984.

In some embodiments, the predetermined period of time is a lifetime associated with a received identifier. Exemplary lifetimes associated with received identifiers are shown as lifetime information (2973, 2975, 2977, 2979). In some embodiments, different device and or user identifiers have different associated lifetimes. In some embodiments, the lifetime associated with a peer identifier is a function of the repeat interval between successive communications device identifier broadcast signals for the particular communications device.

Timer module 2926 which is updated by clock module 2909 is used to determine when a lifetime has expired. Timer module 2926 can, and sometimes does maintain independent status relative to lifetime expiration for a plurality of peers. Timer module 2926, in some embodiments, performs an incremental countdown, which continues until lifetime expiration occurs or an event occurs which resets the timer module 2926 with respect to a particular previously discovered peer being tracked. Timer reset module 2927 updates the timer module 2926 when a signal is received from a peer communications device. For example, the reception of an identification signal from a previously identified peer being tracked allows the communications device 2900 to recognize that the peer is still in the local vicinity and powered up, and the timer countdown can be restarted with respect to that peer.

Traffic module 2928 controls communication of user data between the communications device 2900 and a peer node via a wireless communications link, e.g., a direct wireless communications link between the communications device 2900 and a peer node, during a traffic interval of the recurring peer to peer timing structure. Traffic module 2928 includes a transmission control module 2930 and a reception control module 2932. Transmission control module 2930 controls the sending of user data during a peer to peer traffic interval. Reception control module 2932 controls the receiving of user data during a peer to peer traffic interval. In various embodiments, user data includes at least one of: text data, image data, voice data, and application data.

In some embodiments, the reception control module 2932 of the traffic module 2928 controls the wireless communications device 2900 to refrain from monitoring for traffic data during at least one traffic interval occurring which follows a paging interval in which no page was detected which was directed to the communications device and prior to the occurrence of another paging interval. In some embodiments, the reception control module 2932 of the traffic module 2928 controls the wireless communications device 2900 to refrain from monitoring for traffic data during any of the traffic intervals occurring between a paging interval in which no page was detected which was directed to the communications device 2900 and the next paging interval during which a page can be directed to communications device 2900.

Paging event detection module 2938 detects an event used to trigger sending of a paging message to a peer communications device. For example, a user of the communications device 2910 may perform an input operation via a user I/O device 2908 to generate a page to a particular user or device.

Paging interval determination module 2940 determines one of a plurality of paging intervals in the recurring timing structure to be used for transmitting a paging message to a peer communications device, the determined one paging interval being a function of the stored peer identifier corresponding to the peer communications device to which the page is to be directed. For example, in some embodiments, a peer communications device listens to a subset of paging intervals which correspond to its device identifier and/or user identifier, but intentionally do not listen to other paging intervals within the full set of paging intervals in the recurring peer to peer timing structure. Therefore the page is placed in the appropriate page interval so that it can be detected.

Peer to peer paging viability module 2946 determines if a peer communications device is pagable by a peer to peer page. The determination of the peer to peer paging viability module 2946 is used by the paging type selection module 2942. Peer to peer paging viability module 2946 includes an identifier list checking module 2948. Identifier list checking module 2948 checks a list of stored identifiers, e.g., identifiers in recovered peer identifier information 2970 to determine if the peer communications device is reachable by a peer to peer page.

Paging type selection module 2942 selects between sending a peer to peer page to a peer communications device, e.g., a direct page to the peer communications device and sending a page through a base station, e.g., sending a wide area page through a base station. The output of the paging selection module 2942 is used to control which of peer to peer paging module 2952 and wide area paging module 2954 is active for a particular page to be transmitted by wireless transmitter 2904. In some embodiments, the wide area paging is selected as a default when a peer communications device is determined to be unreachable by a peer to peer page.

Paging module 2950 operations include generating a page directed to a peer communications device prior to communicating user data to the peer communications device and controlling the wireless transmitter to transmit the generated page. Paging module 2950 controls operation of wireless transmitter module 2904 to communicate a page to a peer communications device during a paging interval. Paging module 2950 includes a peer to peer paging module 2952 and a wide area paging module 2954.

Peer to peer session establishment module 2936 controls communicating peer to peer session establishment information between the communications device 2900 and a peer communications device, e.g., prior to communicating user data. In various embodiments, communicating peer to peer session establishment information includes at least one of sending session establishment information and receiving session establishment information. In some embodiments, the peer to peer session establishment information includes at least one of a session identifier, session quality of service (QoS) information and an indicator of the type of traffic to be communicated during the session.

Page monitoring module 2934 monitors during at least some paging intervals in the recurring peer to peer timing structure for pages directed to the communications device 2900. In some embodiments, a subset of the set of paging intervals in the recurring timing structure can be used to direct peer to peer pages to wireless communications device 2900, and wireless communications device 2900 monitors during those paging intervals but does not monitor during other paging intervals.

In various embodiments, the page monitoring module 2934 monitors for additional paging signals during paging intervals occurring between traffic intervals in which user data is communicated as part of an ongoing peer to peer communications session between the communications device 2900 and a peer communications device. For example, an additional peer communications device may be seeking to establish a peer to peer communications session with communications device 2900. In some embodiments, wireless communications device 2900 supports a plurality of simultaneous ongoing peer to peer communications sessions. In some embodiments, wireless communications device 2900 may, and sometimes does terminate or suspend an ongoing peer to peer communications session to establish a new peer to peer communications session with a different peer communications device, e.g., in response to a received page indicating a higher priority level.

Page response signaling module 2935 generates a page response signal and controls the transmission of the page response signal in response to receiving a page directed to communications device 2900.

Data/information 2916 includes stored timing structure information 2956, determined time reference point 2966, received broadcast signal from peer 2968, recovered peer identifier information 2970, user data for transmission 2980, received user data 2982, no response time information 2984, predetermined lifetime information 2986, peer to peer session establishment information 2988 and generated page message 2990.

Stored timing structure information 2956 includes peer discovery time interval information 2958, traffic interval information 2960, paging interval information 2962, and timing synchronization interval information 2964.

Recovered peer identifier information 2970 includes peer device identifier information and/or peer user identifier information. A plurality of peer device identifiers are shown (device identifier 1 2972, . . . , device identifier N 2974). In some embodiments, at least some of the device identifiers have associated lifetime information. (Lifetime information 2973, . . . , lifetime information 2975) corresponds to (device identifier 1 2972, . . . , device identifier N 2974), respectively.

A plurality of peer user identifiers are shown (user identifier 1 2976, user identifier M 2978). In some embodiments, at least some of the user identifiers have associated lifetime information. (Lifetime information 2977, . . . , lifetime information 2979) corresponds to (user identifier 1 2976, . . . , user identifier M 2978), respectively.

Stored timing structure information 2956 is accessed and used by various modules including interval determination module 2920. Determined time reference point 2966 is an output of timing reference point determination module 2918. Recovered peer identifier information 2970 identifies a set of peer communications devices and/or users currently in the local vicinity of communications device 2900, which may be candidates for peer to peer communications sessions with communications device 2900. Recovered peer identifier information 2970 includes information recovered by peer identifier recovery module 2922. Various entries in recovered peer identifier information 2970 are deleted from the stored information by peer identifier deletion module 2924, e.g., in response to loss of identification signaling such as a user beacon from a peer communications device. The loss of the identification signal indicating that the peer is inaccessible at present, e.g., due to having powered down, moved out of range, and/or being situated in a dead spot with respect to communications device 2900.

User data for transmission 2980, e.g., text data, image data, voice data, file data, includes data to be transmitted by wireless transmitter module 2904 to a peer communications device as part of a peer to peer communications session, the transmission being under control of the transmission control module 2930 of traffic module 2928 during a traffic interval in the recurring peer to peer timing structure. Received user data 2982, e.g., text data, image data, voice data, file data, includes data received by wireless receiver module 2902 from a peer communications device as part of a peer to peer communications session, the reception being under control of the reception control module 2932 of traffic module 2928 during a traffic interval in the recurring peer to peer timing structure.

Peer to peer session establishment information 2988 includes information communicated by peer to peer session establishment module 2936. Peer to peer session establishment information 2988 includes at least one of: a peer to peer session identifier, peer to peer session quality of service information, and an indicator of the type of traffic to be communicated in the peer to peer communications session.

Generated page message 2990 is generated by paging module 2950 and transmitted by wireless transmitter module 2904. In various embodiments a first format is utilized for a peer to peer paging message and a second format is used for a wide area paging message, wherein the first and second formats are different. In some embodiments, peer to peer paging messages are controlled to be transmitted during peer to peer paging intervals defined by the recurring peer to peer timing structure, while wide area paging messages are transmitted during cellular network timing structure paging intervals corresponding to the base station to which the wide area page request is being sent. In some such embodiments, the timing structure of the base station is not synchronized with respect to the peer to peer timing structure. In some embodiments, the communications device 2900 suspends peer to peer signaling during at least some base station cellular network paging intervals to support wide area paging functionality.

Figure 30:
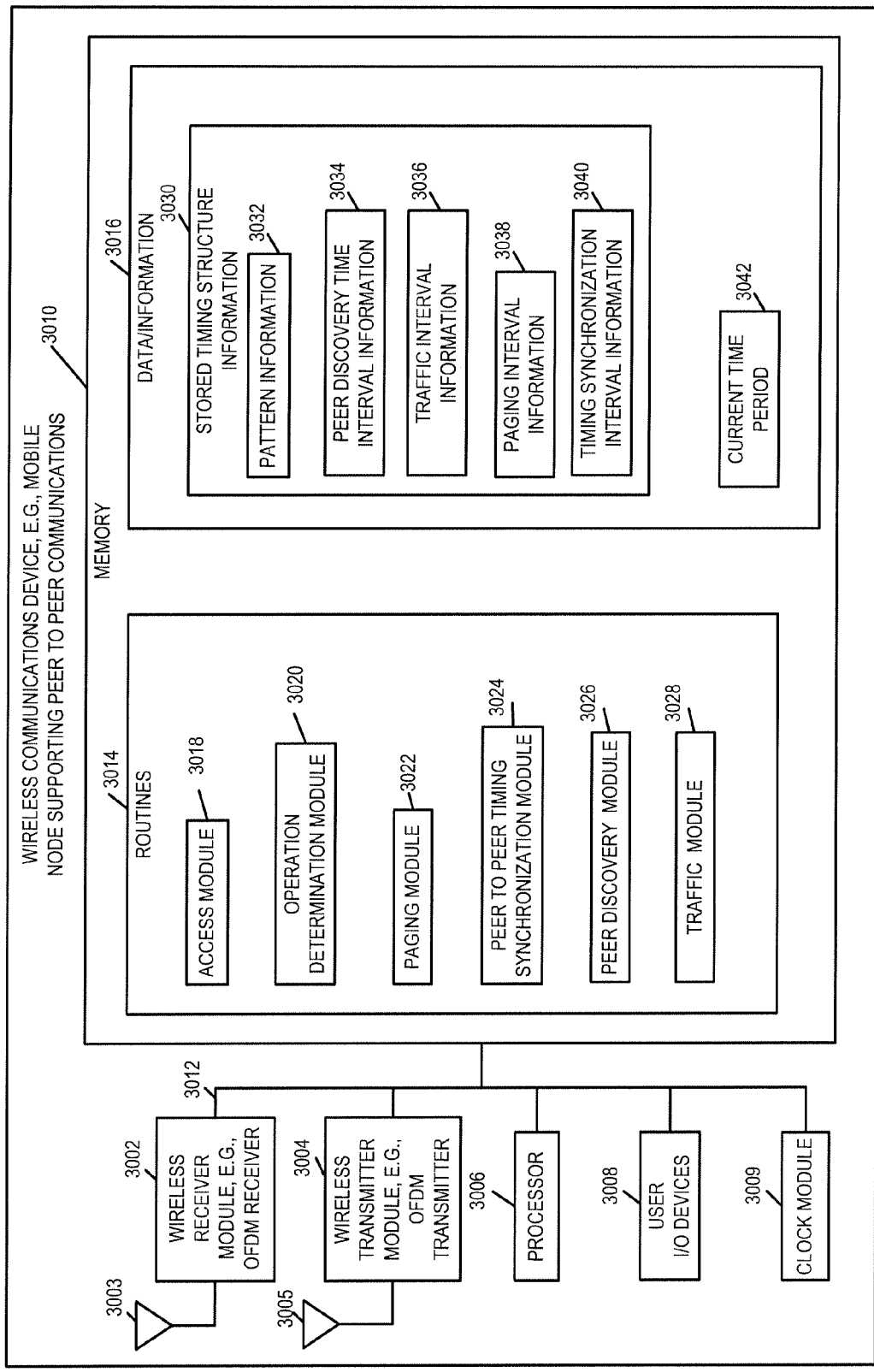
FIG. 30 is a drawing of an exemplary communications device, e.g., mobile node supporting peer to peer communications, in accordance with various embodiments.

FIG. 30 is a drawing of an exemplary communications device 3000, e.g., mobile node supporting peer to peer communications, in accordance with various embodiments. Exemplary communications device 3000 includes a wireless receiver module 3002, a wireless transmitter module 3004, a processor 3006, user I/O devices 3008, a clock module 3009, and memory 3010 coupled together via a bus 3012 over which the various elements may interchange data and information. Memory 3010 includes routines 3014 and data/information 3016. The processor 3006, e.g., a CPU, executes the routines 3014 and uses the data/information 3016 in memory 3010 to control the operation of the communications device 3000 and implement methods, e.g., the method of flowchart 1500 of FIG. 15.

Wireless receiver module 3002, e.g., an OFDM receiver, is coupled to receive antenna 3003 via which the communications device 3000 receives signals. Received signals include timing reference broadcast signals, e.g., from satellites, base stations, and/or beacon signal transmitters, the timing reference signal to be used to establish a coarse level of synchronization with a recurring peer to peer timing structure. Received signals also include, peer node identification signals, e.g., peer node user beacon signals, peer node timing synchronization signals, peer node paging signals, base station paging signals, peer to peer session establishment signals, and peer to peer traffic signals.

Wireless transmitter module 3004, e.g., an OFDM transmitter, is coupled to transmit antenna 3005 via which the communications device 3000 transmits signals. In some embodiments, the same antenna is used for transmitter and receiver. Transmitted signals include a peer node identification signal, e.g., a peer node user beacon signal conveying at least one of a device identifier and a user identifier, peer node timing synchronization signals, a peer to peer paging signal, a paging signal directed to a base station to be forwarded as a wide area paging signal, peer to peer session establishment signals, and peer to peer traffic signals.

User I/O devices 3008 include, e.g., microphone, keyboard, keypad, mouse, switches, camera, speaker, display. User I/O devices 3008 allow a user of communications device 3000 to input user data to be directed to a peer, access output user data from a peer, and control at least some functions of the communications device, e.g., page a peer node, establish a peer to peer communications session, terminate a peer to peer communications session.

Clock module 3009, e.g., a module including an oscillator chip, is used in maintaining current internal timing of the communications device 3000, e.g., as the communications device 3000 is operated through a recurring peer to peer timing structure.

Routines 3014 include an access module 3018, an operation determination module 3020, a paging module 3022, a peer to peer timing synchronization module 3024, a peer discovery module 3026 and a traffic module 3028.

Data/information 3016 includes stored timing structure information 3030 and current time period 3042. Stored timing structure information 3030 includes pattern information 3032, peer discovery time interval information 3034, traffic interval information 3036, paging interval information 3038 and timing synchronization interval information 3040. The stored timing structure information 3030 includes information identifying the duration of one iteration of the pattern, the sequential ordering between different intervals with the pattern, the duration of various different types of intervals, and relationship information corresponding to different types of intervals.

Access module 3018 accesses stored peer to peer timing structure information 3030, the stored peer to peer timing structure information 3030 including information defining a pattern of different types of time intervals, said different types of time intervals including at least a peer discovery interval and a traffic interval.

Operation determination module 3020 uses the accessed stored peer to peer timing structure information in determining an operation to be performed during a current time period. The current time period is indicated by information stored in current time period 3042 and represents an output of clock module 3009. Current time period 3042, in some embodiments, identifies an index value pointing to a particular symbol timing location in a recurring peer to peer timing structure, e.g. a particular OFDM symbol time interval position within the recurring peer to peer timing structure which falls into at least one of the different types of intervals, e.g. paging, traffic, peer discovery, timing synchronization.

The result of the operation determination module 3020 directs control to one of paging module 3022, peer to peer timing synchronization module 3024, peer discovery module 3026 and traffic module 3028, where a particular operation corresponding to the interval type is performed.

In various embodiments, the pattern of different types of time intervals in the peer to peer timing structure repeats over time. In some such embodiments, the pattern has a predetermined periodicity and each period includes at least one peer discovery interval and at least one traffic interval. In various embodiments, the duration of each peer discovery interval is less than 10 milli-seconds. In some embodiments, during each period, the total time allocated to traffic intervals is at least 100 times the total time allocated to peer discovery intervals.

In some embodiments, each of a plurality of traffic intervals included in each period has a duration which is longer than the duration of any of the peer discovery intervals included in said period. In some embodiments, each time period includes at least 10 times as many traffic time intervals as peer discovery time intervals.

In various embodiments, the traffic and peer discovery intervals have the same duration or substantially the same duration and there are more traffic time intervals then peer discovery time intervals.

In some embodiments, two successive peer discovery intervals in a time period including two repetitions of said pattern are separated in time by a gap of at least 1 second.

Peer to peer timing synchronization module 3024 collects signal timing data from a signal received from a peer device, e.g., during a timing synchronization time interval, said signal timing data being for use in adjusting the wireless terminal symbol timing. In some embodiments, the timing synchronization time interval occurs during the peer discovery time interval. In some embodiments, the peer to peer timing synchronization module 3024 collects signal timing data received from a peer device during a traffic interval. Peer to peer timing synchronization module 3024 determines timing adjustment to be applied, and adjusts the wireless terminals symbol timing by controlling adjustment of wireless receiver module 3002 and/or wireless transmitter module 3004, e.g. adjustment values are loaded into the receiver 3002 and/or transmitter 3004.

Paging module 3022 performs paging operations during paging intervals, e.g., monitoring for and processing peer to peer pages directed to wireless communications device 3000 and generating and controlling transmission of a peer to peer page directed to a peer communications device with which communications device 3000 desires to establish a peer to peer communications session. In some embodiments, each period of the recurring peer to peer timing structure includes at least one paging interval. In some such embodiments, the duration of each paging interval is less than 10 milli-seconds.

Traffic module 3028 performs traffic operations during traffic intervals, e.g., supporting the reception and transmission of user data between peers in a peer to peer communications session. In some embodiments, each time period in the recurring peer to peer timing structure allocates at least 10 times as much total time to traffic intervals as the amount of total time allocated to paging intervals. In some embodiments, each of a plurality of traffic intervals included in each period of the recurring peer to peer timing structure has a duration which is longer than the duration of any of the paging intervals included in said period.

In various embodiments, each time period in the recurring peer to peer timing structure includes at least ten times as many traffic intervals as paging intervals.

In various embodiments, the traffic and paging intervals have the same duration or substantially the same duration and there are more traffic intervals than paging intervals.

In some embodiments, two successive paging intervals in a time period including two repetitions of the pattern defining the recurring peer to peer timing structure are separated in time by a gap of at least 100 msec.

Peer discovery module 3026 performs peer discovery operations during peer discovery intervals in the recurring peer to peer timing structure. Peer discovery operations include monitoring for broadcast signals such as user beacons from peer communications devices in the local vicinity, detecting such broadcast signals, and attempting to recover at least one of a device identifier and a user identifier from the detected broadcast signal. In various embodiments, the total amount of time for paging is at least twice the total amount of time for peer discovery.

Figure 31:
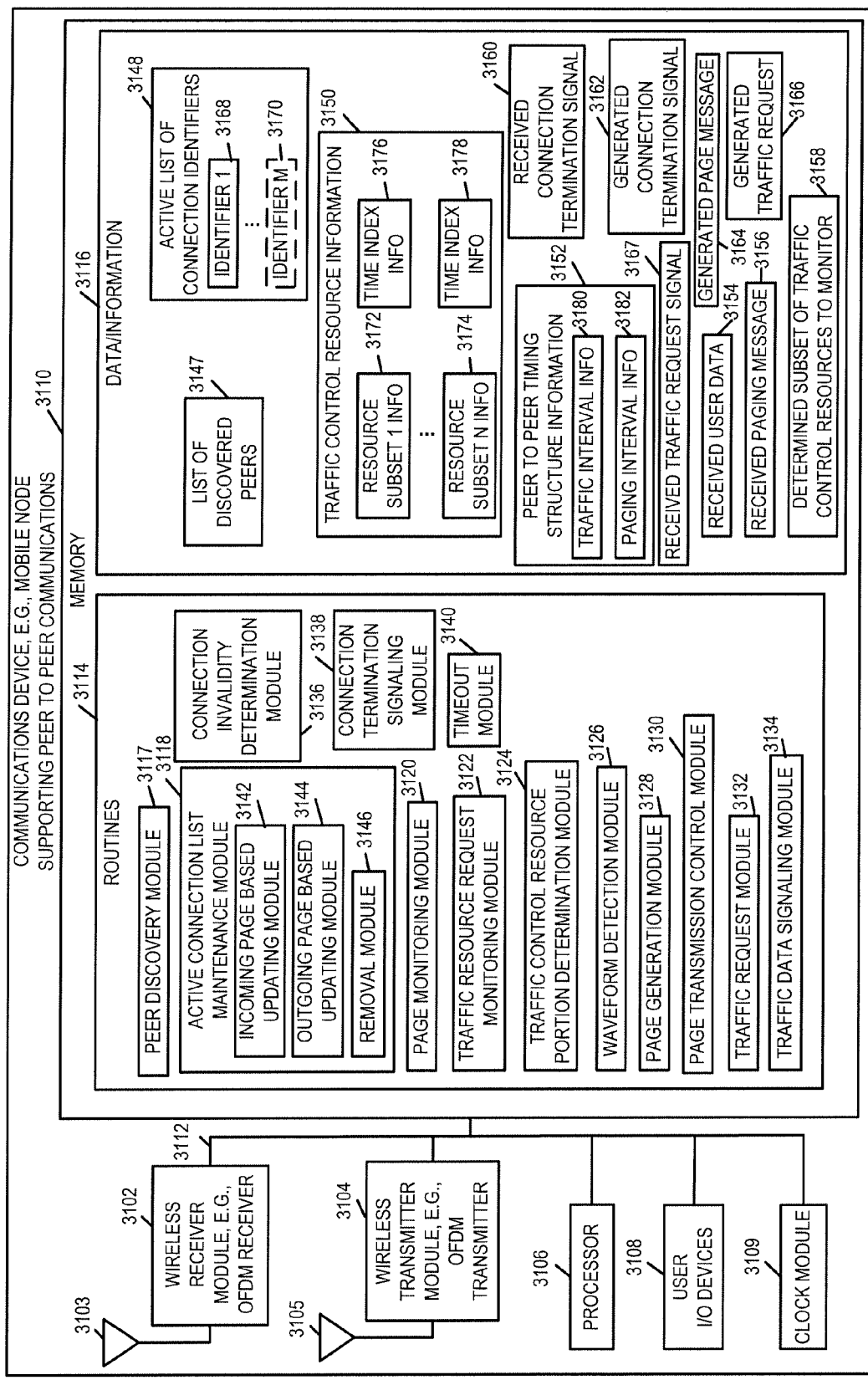
FIG. 31 is a drawing of an exemplary communications device, e.g., mobile node supporting peer to peer communications, in accordance with various embodiments.

FIG. 31 is a drawing of an exemplary communications device 3100, e.g., mobile node supporting peer to peer communications, in accordance with various embodiments. Exemplary communications device 3100 includes a wireless receiver module 3102, a wireless transmitter module 3104, a processor 3106, user I/O devices 3108, a clock module 3109, and memory 3110 coupled together via a bus 3112 over which the various elements may interchange data and information. Memory 3110 includes routines 3114 and data/information 3116. The processor 3106, e.g., a CPU, executes the routines 3114 and uses the data/information 3116 in memory 3110 to control the operation of the communications device 3100 and implement methods, e.g., the method of flowchart 2400 of FIG. 24.

Wireless receiver module 3102, e.g., an OFDM receiver, is coupled to receive antenna 3103 via which the communications device 3100 receives signals. Received signals include, peer node identification signals, e.g., peer node user beacon signals, paging signals, request for traffic resources, traffic signals conveying user data, and termination connection notification signals.

Wireless transmitter module 3104, e.g., an OFDM transmitter, is coupled to transmit antenna 3105 via which the communications device 3100 transmits signals. In some embodiments, the same antenna is used for transmitter and receiver. Transmitted signals include a peer node identification signal, e.g., a peer node user beacon signal conveying at least one of a device identifier and a user identifier, paging signals, traffic resource request signals, traffic signals conveying user data, and connection termination signals.

User I/O devices 3108 include, e.g., microphone, keyboard, keypad, mouse, switches, camera, speaker, display. User I/O devices 3108 allow a user of communications device 3100 to input user data to be directed to a peer, access output user data from a peer, and control at least some functions of the communications device, e.g., page a peer node, establish a peer to peer communications session, terminate a peer to peer communications session.

Clock module 3109, e.g., a module including an oscillator chip, is used in maintaining current internal timing of the communications device 3100, e.g., as the communications device 3100 is operated through a recurring peer to peer timing structure.

Routines 3114 include a peer discovery module 3117, an active connection list maintenance module 3118, a page monitoring module 3120, a traffic resource request monitoring module 3122, a traffic control resource portion determination module 3124, a waveform detection module 3126, a page generation module 3128, a page transmission control module 3130, a traffic request module 3132, a traffic data signaling module 3134, a connection invalidity determination module 3136, a connection termination signaling module 3138, and a timeout module 3140.

Data/information 3116 includes a list of discovered peers 3147, an active list of connection identifiers 3148, traffic control resource information 3150, peer to peer timing structure information 3152, received user data 3154, received paging message 3156, determined subset of traffic control resources to monitor 3158, received connection termination signal 3160, generated connection termination signal 3162, generated page message 3164, a generated traffic request 3166, and a received traffic request signal 3167.

Peer discovery module 3117 monitors for and detects for broadcast signals from peer communications devices in the local vicinity communicating identifier information, e.g., device identifier information and/or user identifier information. In some embodiments peer discovery broadcast signals used for identification such as user beacon signals are communicated during predetermined peer discovery time intervals in a recurring peer to peer timing structure. List of discovered peers 3147 is formed and updated by peer discovery module 3117.

Active connection list maintenance module 3118 maintains a list of active connection identifiers corresponding to communications devices with which communications device 3100 has received or sent at least one paging signal. Active list of connection identifiers 3148 is the list being maintained by maintenance module 3118. Active list of connection identifiers 3148 is shown including one or more active connection identifiers (active connection identifier 1 3168, . . . , active connection identifier M 3170).

Active connection list maintenance module 3118 includes an incoming page based updating module 3142, an outgoing page based updating module 3144, and a removal module 3146.

Page monitoring module 3120 monitors, during paging intervals, for paging signals indicating that communications device 3100 is being paged by a peer communications device, e.g., a peer communications device from the list of discovered peers. Incoming page based updating module 3142 updates the list of active connection identifiers so that the list includes connection identifiers corresponding to the peer communications devices from which a paging message directed to communications device 3100 was received.

Traffic resource request monitoring module 3122 monitors a traffic control resource during a traffic interval for a traffic request signal corresponding to at least one connection identifier in the list of active connection identifiers. The traffic control resource includes a plurality of resource unit subsets and monitoring a traffic control resource includes monitoring less than the full set of resource subsets. Traffic control resource information 3150 identifies a plurality of different resources subsets (resources subset 1 information 3172, ..., resource subset N information 3174). In this exemplary embodiment, time index information is associated with each of the resource subsets. Time index information 3176 is associated with traffic control resource subset 1 3172, while time index information 3178 is associated with traffic control resource subset N 3174.

Traffic control resource portion determination module 3124 determines the portion of the traffic control resource to be monitored as a function of an active connection identifier and/or time index information, e.g., a time index of the traffic interval.

Monitoring a traffic control resource includes monitoring to detect for the presence of a predetermined waveform on the traffic control resource. In various embodiments, the predetermined waveform is a function of at least one connection identifier in the active list of connection identifiers. Waveform detection module 3126 detects for predetermined waveforms of interest on the traffic control resource being monitored. In some embodiments, the predetermined waveform is a NP sequence waveform. In some embodiments, the predetermined waveform is an OFDM waveform.

Traffic data signaling module 3134 operations include receiving data, e.g., user data, communicated in a traffic data resource from a communications device having the active connection identifier corresponding to a received traffic request signal. Traffic data signaling module 3134 operations also include generating traffic data signals and controlling the transmission of the traffic data signals using a traffic data resource associated with a traffic control resource which has been used to communicate a traffic data request.

Page generation module 3128 generates a page to a peer node, e.g., a peer node from the list of discovered peers 3147. Page transmission control module 3130 controls the wireless transmitter module 3104 to transmit the generated page during a paging interval. A connection identifier corresponding to the device being paged and communications device 3100 is associated with the generated page. The outgoing page based updating module 3144 updates the list of active connections 3148 to include the connection identifier.

Traffic request module 3132 controls generation of and transmission of a traffic request to a peer node which was previously paged following transmission of a page. Connection invalidity determination module 3136 determines that an active connection identifier is no longer valid. The removal module 3146 uses a determination of module 3136 which indicates that a connection is no longer valid to remove a connection identifier from active list of connection identifiers 3148.

Connection termination signaling module 3138 processes a connection termination signal corresponding to a communications device to which an active connection corresponds to identify that a connection should no longer be considered valid.

Time out module 3140 determines if a connection is no longer valid due to expiration of a timeout trigger, the time out trigger being a function of signals sent to the peer communications device corresponding to the active connection identifier or received from the peer communication device corresponding to active connection identifier.

Peer to peer timing structure information 3152 includes information identifying various intervals included in the recurring peer to peer timing structure, information identifying the characteristics of the different intervals, information identifying the pattern of different intervals, and information identifying relationships between the various intervals. Peer to peer timing structure information includes traffic interval information 3180 and paging interval information 3182. In some embodiments, there are predetermined mapping relations between different resources. For, example, a particular paging slot may be, and sometimes is, associated with a particular traffic control resource, and/or a particular traffic control resource is associated with a particular traffic segment. Such predetermined relationships and/or mapping advantageously reduce overhead signaling and/or limit the amount of resources a particular communications device needs to monitor.

Received user data 3154 includes user data such as voice data, image data, text data, and/or file data, received from a peer communications device in a traffic data resource. Received paging message 3156 is a paging message detected by page monitoring module 3120. The source of the page is used to generate an active connection identifier for list 3148. Generated page message 3164 is a page message to be directed to a peer which is generated by page generation module 3128, the target of the page being used to generate an active connection identifier for list 3148. Received traffic request signal 3167 is a signal detected by traffic resource request monitoring module 3122, while generated traffic request 3166 is a signal generated by traffic request module 3132. Determined subset of traffic control resources to monitor 3158 is an output of traffic control resource portion determination module 3124 and is used by resource request monitoring module 3122 in deciding which subset or subset of traffic control resource information 3150 to currently monitor. Received connection termination signal 3160 is a signal received from a peer with which communications device 3100 has had an active connection, the termination signal indicating that the peer is terminating the active connection. Received connection termination signal 3160 is recovered by connection termination signaling module 3138. Generated connection termination signal 3162 is a signal generated by connection termination signaling module 3138 which is to be transmitted to a peer to indicate to that peer that communications device 3100 is ceasing to maintain the active connection.

Figure 32:
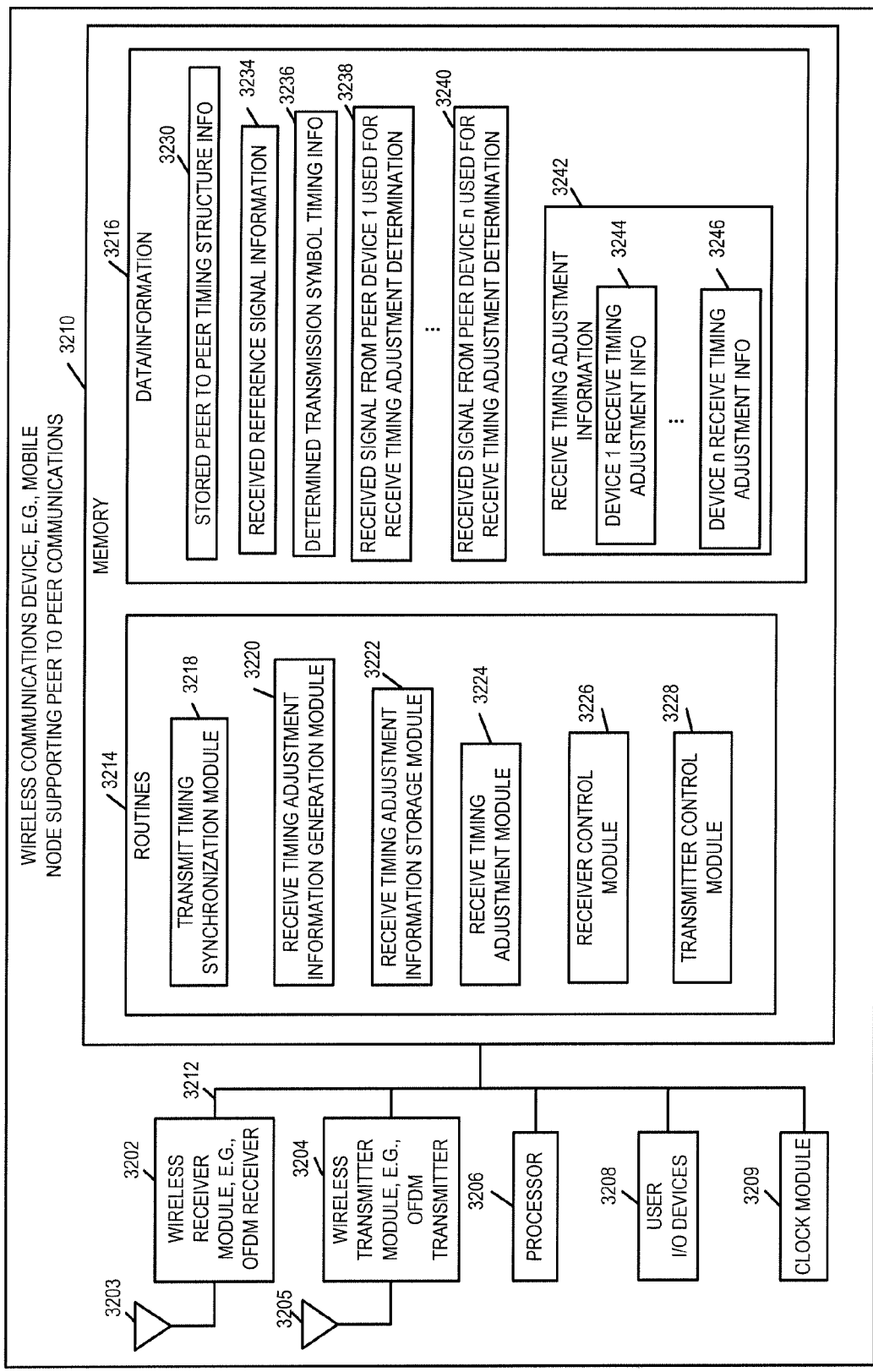
FIG. 32 is a drawing of an exemplary communications device, e.g., mobile node supporting peer to peer communications in accordance with various embodiments.

FIG. 32 is a drawing of an exemplary communications device 3200, e.g., mobile node supporting peer to peer communications in accordance with various embodiments. Exemplary wireless communications device 3200 supports the storage and maintenance of a plurality of different receive symbol timing adjustment settings corresponding to different peer nodes. Exemplary communications device 3200 includes a wireless receiver module 3202, a wireless transmitter module 3204, a processor 3206, user I/O devices 3208, a clock module 3209, and memory 3210 coupled together via a bus 3212 over which the various elements may interchange data and information. Memory 3210 includes routines 3214 and data/information 3216. The processor 3206, e.g., a CPU, executes the routines 3214 and uses the data/information 3216 in memory 3210 to control the operation of the communications device 3200 and implement methods, e.g., the method of flowchart 2500 of FIG. 25.

Wireless receiver module 3202, e.g., an OFDM receiver, is coupled to receiver antenna 3203 via which the communications device 3200 receives signals. Received signals include, e.g., broadcast signals used to determine a timing reference point, signals identifying the presence of peers, a signal from a first peer used to perform receive timing synchronization operation with respect to the first peer, a signal from a second peer used to perform a receive timing synchronization operation with respect to the second peer, traffic signals from peers, and/or paging signals from peers.

Wireless transmitter module 3204, e.g., an OFDM transmitter, is coupled to transmit antenna 3205 via which the communications device 3200 transmits signals to peers. In some embodiments, the same antenna is used for transmitter and receiver. Transmitted signals include, e.g., signals annunciating the presence of communications device 3200, signals used for timing synchronization with a peer, signals used to page a peer, and/or traffic signals directed to a peer.

User I/O devices 3208 include, e.g., microphone, keyboard, keypad, switches, camera, speaker, display, etc. User I/O devices 3208, allow a user to input data/information, access output data/information, and control at least some functions of the communications device, e.g., initiate sending of a page to a particular peer node, start a communications session with a peer node, terminate a communications session with a peer node, etc.

Clock module 3209, e.g., a module including an oscillator chip, is used in maintaining current internal timing of the communications device 3200, e.g., as the communications device 3200 is operated through a recurring timing structure.

Routines 3214 include a transmit timing synchronization module 3218, a receive timing adjustment information generation module 3220, a receive timing adjustment information storage module 3222, a receive timing adjustment module 3224, a receiver control module 3226 and a transmitter control module 3228.

Data/information 3216 includes stored peer to peer timing structure information 3230, received reference signal information 3234, determined transmission symbol timing information 3236, a plurality of received signal information used to determined receive timing adjustments (received signal from peer device 1 used for receive timing adjustment determination 3228, . . . , received signal from peer device n used for receive timing adjustment determination 3240), and receive timing adjustment information 3242 (device 1 receive timing adjustment information 3244, . . . , device n receive timing adjustment information 3246).

Transmit timing synchronization module 3218 performs a transmit timing synchronization operation based on a reference signal received from a communications device, e.g., a broadcast reference signal received from one of a satellite, a base station, and a beacon signal transmitter which does not transmit user data, to determine transmission symbol timing. The determined transmission symbol timing information 3236 is used by wireless transmitter control module 3228 to control wireless transmitter 3204 operation. Received reference signal information 3234 represents a signal received from a satellite, base station or beacon signal transmitter, which is utilized to lock the wireless terminal transmitter module's transmit symbol timing with respect to a recurring peer to peer timing structure. For example, wireless communications device 3200 powers up at a random point in time, and its clock module starts indexing time, but the time indexing at this point is not coordinated to any external reference. The detection and use of the received reference signal information 3234 allows coordination to an external reference point allowing multiple peers in the vicinity to lock up with the same reference and use the same recurring peer to peer timing structure.

Receive timing adjustment information generation module 3220 processes a received signal from a peer communications device and uses the received signal to determine a specific receive timing adjustment corresponding to that peer device. In some embodiments, the received signal used for the timing adjustment determination is a wideband synchronization signal broadcast from the peer communications device. In some embodiments, the received signal used for timing adjustment is a traffic channel signal transmitted by the peer wireless communications device and sent to one of wireless communications device 3200 and another wireless communications device.

Receive timing adjustment storage module 3222 stores the determined receive timing adjustment information corresponding to a peer device.

Received signal from peer device 1 3238 is used by module 3220 to determine and generate device 1 receive timing adjustment information 3244, and then module 3222 stores the information 3244 in memory 3210. Received signal from peer device n 3240 is used by module 3220 to determine and generate device n receive timing adjustment information 3246, and then module 3222 stores the information 3246 in memory 3210. This stored receive symbol timing adjustment information (3244, . . . , 3246) is available for later use when processing signals from different peer nodes, e.g., traffic signals.

Receive timing adjustment module 3224 retrieves and applies the appropriate receive timing adjustment information, e.g., one of information (3244, . . . , 3246) to a receive signal to match the particular device which transmitted the signal. In some embodiments, the receive timing adjustment module 3224 loads values into the wireless receiver module 3202 which performs the adjustment. In some embodiments, the adjustment involves time synchronization control of the receiver, which is facilitated through receiver control module 3226 operation. In some embodiments, the adjustment involves a mathematical processing adjustment of a received signal.

In various embodiments, the transmit timing is not adjusted based on signals received from the peer communications devices. Thus the peer to peer wireless communications device uses the same transmit timing irrespective of the peer node to which it is transmitting, but adjusts its receive timing as a function of the peer node which transmitted the signal being received.

The generation and maintenance of multiple sets of receive symbol timing adjustment information facilitates: rapid switching between multiple peers, concurrent peer to peer sessions with multiple peers, and/or smaller cyclic prefixes than would otherwise be needed if a single common receive symbol timing adjustment implementation was used.

In various embodiments, receive symbol timing adjustment information is generated and maintained during at least some time intervals for at least some peer nodes which do not have current active connections with wireless communications device 3200. Thus the adjustment information is readily available if and when an active connection is initialed.

FIG. 33 is a drawing of an exemplary peer to peer communications network 3300 in accordance with various embodiments. Exemplary communications network 3300 includes a plurality of wireless communications devices supporting peer to peer communications (WT 1 3306, WT 2 3308, WT 3 3310, . . . , WT N 3312). In some embodiments, the network includes a reference signal source node 3302, e.g., a satellite, a base station, or a beacon signal transmitter that does not transmit user data, the reference signal source node transmitting a reference broadcast signal 3304, that can be utilized by the wireless communications devices supporting peer to peer communications to synchronize with respect to a peer to peer timing structure.

Exemplary peer to peer connection communications signals 3314 are shown between WT 1 3306 and WT 3 3310. At least some of the wireless communications devices supporting peer to peer communications are mobile nodes. The exemplary peer to peer communications devices are, e.g., any of the exemplary communications devices 2700 of FIG. 27, 2800 of FIG. 28, 2900 of FIG. 29, 3000 of FIG. 30, 3100 of FIG. 31 or 3200 of FIG. 32. The exemplary peer to peer communications devices implement methods, e.g., one or more of the methods of flowchart 200 of FIG. 2, flowchart 300 of FIG. 3, flowchart 400 of FIG. 4, flowchart 500 of FIG. 5, flowchart 1500 of FIG. 15, flowchart 1800 of FIG. 18, flow 1900 of FIG. 19, flowchart 2400 of FIG. 24 or flowchart 2500 of FIG. 25. The exemplary peer to peer communications devices implement a peer timing structure, e.g., one or more of the timing structures described with respect to FIG. 1, FIG. 6, FIG. 7, FIG. 8, FIG. 9, FIG. 10, FIG. 11, FIG. 12, FIG. 13, FIG. 14, FIG. 16, FIG. 17, FIG. 20, FIG. 21, FIG. 22, or FIG. 23 or a peer to peer timing structure using a feature or features described therein.

While described in the context of an OFDM system, the methods and apparatus of various embodiments are applicable to a wide range of communications systems including many non-OFDM and/or non-cellular systems. Some exemplary systems include a mixture of technologies utilized in the peer to peer signaling, e.g., some OFDM type signals and some CDMA type signals.

In various embodiments nodes described herein are implemented using one or more modules to perform the steps corresponding to one or more methods, for example, determining a timing reference point, accessing stored peer to peer timing structure information, identifying a type of peer to peer timing structure time interval, performing peer discovery, performing peer to peer timing synchronization, performing peer to peer paging operations, identifying traffic control resources, monitoring identified traffic control resources, maintaining peer to peer active connection lists, performing peer to peer traffic operations, etc. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed:

1. A method, the method comprising operating a first communications device to perform the steps of:
    updating a list of active connection identifiers to include a first active connection identifier corresponding to a second communications device from which a first paging signal was received, said list of active connection identifiers listing connection identifiers of communications devices from which said first communications device has received a paging signal or sent a paging signal;
    updating said list of active connection identifiers to include a second active connection identifier corresponding to a third communications device to which said first communications device transmitted a second paging signal;
    monitoring a traffic control resource during a traffic interval for a traffic request signal corresponding to at least one active connection identifier included in said list of active connection identifiers; and
    determining if said active connection identifier is no longer valid includes detecting expiration of a time out trigger, said time out trigger being a function of signals sent to the communications device corresponding to said active connection identifier or received from said communication device correspond to said active connection identifier.

2. The method of claim 1, wherein the first communications device is a mobile node.

3. The method of claim 1, further comprising:
    receiving data in a traffic data resource from a communications device having the active connection identifier corresponding to a received traffic request signal.

4. The method of claim 1, wherein said traffic control resource includes a plurality of resource unit subsets, and wherein said monitoring a traffic control resource includes monitoring less than the full set of resource unit subsets.

5. The method of claim 4, further comprising:
    prior to performing said monitoring a traffic control resource, determining the portion of the traffic control resource to be monitored as a function of connection identifiers included in said list of active connection identifiers.

6. The method of claim 5, wherein determining the portion of traffic control resource to be monitored is also a function of a time index of said traffic interval.

7. The method of claim 1, wherein said monitoring a traffic control resource includes monitoring to detect for the presence of a predetermined waveform on said traffic control resource, said predetermined waveform being a function of at least one connection identifier included in said list.

8. The method of claim 7, wherein said predetermined waveform PN sequence waveform.

9. The method of claim 7, wherein said predetermined waveform is an OFDM waveform.

10. The method of claim 1, wherein said first communications device is a portable personal data assistant (PDA).

11. The method of claim 1, further comprising;
    transmitting a traffic request to said third communications device using a traffic control resource following transmission of said second paging signal.

12. The method of claim 11, further comprising:
    transmitting traffic data to said third communications device using a traffic data resource following transmission of said traffic request.

13. The method of claim 1, further comprising:
    determining that an active connection identifier is no longer valid; and removing the active connection identifier which is determined to no longer be valid from said list of active connection identifiers.

14. The method of claim 13, wherein said step of determining if said active connection identifier is no longer valid includes processing a connection termination signal corresponding to the communications device to which said active connection identifier also corresponds.

15. The method of claim 1, wherein an active connection identifier is a device pair identifier from which each device in the pair can be identified.

16. The method of claim 1, further comprising:
prior to said updating a list of active connection identifiers to include said first active connection identifier, receiving said first paging signal during a paging interval; and
wherein said updating a list of active connection identifiers to include said first active connection identifier is in response to receiving said first paging signal.

17. The method of claim 1, further comprising:
prior to said updating a list of active connection identifiers to include said second active connection identifier, transmitting said second paging signal during a paging interval; and
wherein said updating said list of active connection identifiers to include said second active connection identifier is in response to transmitting said second paging signal.

18. A method of operating a first communications device, the method comprising:
maintaining a list of active connection identifiers corresponding to communications devices with which said first communications device has received or sent at least one paging signal;
monitoring a traffic control resource during a traffic interval for a traffic request signal corresponding to at least one connection identifier included in said list of active connection identifiers;
during a paging interval preceding said traffic interval monitoring for paging signals; and
updating said list of active connection identifiers so that the list includes connection identifiers corresponding to communications devices from which a paging message directed to the first communications device were received;
determining that an active connection identifier is no longer valid, wherein said step of determining if said active connection identifier is no longer valid includes processing a connection termination signal corresponding to the communications device to which said active connection identifier also corresponds, and wherein said step of determining if said active connection identifier is no longer valid includes detecting expiration of a time out trigger, said time out trigger being a function of a signal sent to the communications device corresponding to said active connection identifier or a signal received from said communication device correspond to said active connection identifier; and
removing the active connection identifier which is determined to no longer be valid from said list of active connection identifiers.

19. A first communications device supporting peer to peer wireless operations, the first communications device comprising:
an incoming page based updating module for updating a list of active connection identifiers to include a first active connection identifier corresponding to a second communications device from which a first paging signal was received, said list of active connection identifiers listing connection identifiers of communications devices from which said first communications device has received a paging signal or sent a paging signal;
an outgoing page based updating module for updating said list of active connection identifiers to include a second active connection identifier corresponding to a third communications device to which said first communications device transmitted a second paging signal;
a traffic resource request monitoring module for monitoring a traffic control resource during a traffic interval for a traffic request signal corresponding to at least one active connection identifier included in said list of active connection identifiers; and
a timeout module for detecting expiration of a timeout trigger, said timeout trigger being a function of a signal sent to the communications device corresponding to said active connection identifier or a signal received from said communication device corresponding to said active connection identifier, and wherein said detected expiration of a timeout trigger is used by said connection invalidity determination module to determine connection invalidity.

20. The first communications device of claim 19, wherein the first communications device is a mobile node.

21. The first communications device of claim 19, further comprising:
a wireless receiver for receiving data in a traffic data resource from a communications device having the active connection identifier corresponding to a received traffic request signal.

22. The first communications device of claim 19, wherein said traffic control resource includes a plurality of resource unit subsets, and wherein said traffic resource request monitoring module monitoring of a traffic control resource includes monitoring less than the full set of resource unit subsets.

23. The first communications device of claim 22, further comprising:
a traffic control resource portion determination module for determining the portion of the traffic control resource to be monitored as a function of connection identifiers included in said list of active connection identifiers, prior to performing said monitoring a traffic control resource.

24. The first communications device of claim 23, wherein said traffic control resource portion determination module determines the portion of traffic control resource to be monitored as a function of a time index of said traffic interval.

25. The first communications device of claim 19, further comprising a waveform detection module for detecting for the presence of a predetermined waveform on said traffic control resource, said predetermined waveform being a function of at least one connection identifier included in said list, and wherein said traffic resource request monitoring module uses the waveform detection module.

26. The first communications device of claim 25, wherein said predetermined waveform is a PN sequence waveform.

27. The first communications device of claim 25, wherein said predetermined waveform is an OFDM waveform.

28. The first communications device of claim 19, wherein said first communications device is a portable personal data assistant (PDA).

29. The first communications device of claim 19, further comprising;
a traffic request module for controlling the generation and transmission of a traffic request to said third communications device using a traffic control resource following transmission of said second paging signal.

30. The first communications device of claim 29, further comprising:
a traffic data signaling module for generating traffic data signals and controlling the transmission of traffic data to said third communications device using a traffic data resource following transmission of said traffic request.

31. The first communications device of claim 19, further comprising:
a connection invalidity determination module for determining that an active connection identifier is no longer valid; and
a removal module for removing the active connection identifier which is determined to no longer be valid from said list of active connection identifiers.

32. The first communications device of claim 31, further comprising:
a connection termination signaling module for processing a connection termination signal corresponding to the communications device to which said active connection identifier also corresponds, said connection terminal signal being used by said connection invalidity determination module to determine connection invalidity.

33. A first communications device supporting peer to peer wireless operations, the first communications device comprising:
an active connection list maintenance module for maintaining a list of active connection identifiers corresponding to communications devices with which said first communications device has received or sent at least one paging signal;
a traffic resource request monitoring module for monitoring a traffic control resource during a traffic interval for a traffic request signal corresponding to at least one connection identifier included in said list of active connection identifiers
a page monitoring module for monitoring for paging signals during a paging interval preceding said traffic interval;
an incoming page based updating module for updating said list of active connection identifiers so that the list includes connection identifiers corresponding to communications devices from which a paging message directed to the first communications device were received;
a connection invalidity determination module for determining that an active connection identifier is no longer valid;
a removal module for removing the active connection identifier which is determined to no longer be valid from said list of active connection identifiers;
a connection termination signaling module for processing a connection termination signal corresponding to the communications device to which said active connection identifier also corresponds, said connection terminal signal being used by said connection invalidity determination module to determine connection invalidity; and
a timeout module for detecting expiration of a timeout trigger, said timeout trigger being a function of a signal sent to the communications device corresponding to said active connection identifier or a signal received from said communication device corresponding to said active connection identifier, and wherein said detected expiration of a timeout trigger is used by said connection invalidity determination module to determine connection invalidity.

34. A first communications device supporting peer to peer wireless operations, the first communications device comprising:
means for updating a list of active connection identifiers to include a first active connection identifier corresponding to a second communications device from which a first paging signal was received, said list of active connection identifiers listing connection identifiers of communications devices from which said first communications device has received a paging signal or sent a paging signal;
means for updating said list of active connection identifiers to include a second active connection identifier corresponding to a third communications device to which said first communications device transmitted a second paging signal;
means for monitoring a traffic control resource during a traffic interval for a traffic request signal corresponding to at least one active connection identifier included in said list of active connection identifiers; and
means for detecting expiration of a timeout trigger, said timeout trigger being a function of a signal sent to the communications device corresponding to said active connection identifier or a signal received from said communication device corresponding to said active connection identifier, and wherein said detected expiration of a timeout trigger is used by said connection invalidity determination module to determine connection invalidity.

35. The first communications device of claim 34, further comprising:
wireless receiver means for receiving data in a traffic data resource from a communications device having the active connection identifier corresponding to a received traffic request signal.

36. The first communications device of claim 34, further comprising:
waveform detection means for detecting for the presence of a predetermined waveform on said traffic control resource, said predetermined waveform being a function of at least one connection identifier included in said list, and wherein said means for monitoring uses the waveform detection means.

37. The first communications device of claim 34, further comprising:
page generation means for generating a page to a second communications device having a second connection identifier;
means for transmitting a page to a second communications device having a second connection identifier during a paging interval preceding said traffic interval; and
means for updating said list of active connection identifiers to include said second connection identifier.

38. The first communications device of claim 34, further comprising:
connection invalidity determination means for determining that an active connection identifier is no longer valid; and
means for removing the active connection identifier which is determined to no longer be valid from said list of active connection identifiers.

39. A non-transitory computer readable medium embodying machine executable instructions to implement a method for operating a first communications device, the method comprising:

updating a list of active connection identifiers to include a first active connection identifier corresponding to a second communications device from which a first paging signal was received, said list of active connection identifiers listing connection identifiers of communications devices from which said first communications device has received a paging signal or sent a paging signal;

updating said list of active connection identifiers to include a second active connection identifier corresponding to a third communications device to which said first communications device transmitted a second paging signal; and monitoring a traffic control resource during a traffic interval for a traffic request signal corresponding to at least one active connection identifier included in said list of active connection identifiers; and determining if said active connection identifier is no longer valid includes detecting expiration of a time out trigger, said time out trigger being a function of signals sent to the communications device corresponding to said active connection identifier or received from said communication device correspond to said active connection identifier.

40. The non-transitory computer readable medium of claim 39, wherein said monitoring a traffic control resource includes monitoring to detect for the presence of a predetermined waveform on said traffic control resource, said predetermined waveform being a function of at least one connection identifier included in said list.

41. The non-transitory computer readable medium of claim 39, further embodying machine executable instructions for:
determining that an active connection identifier is no longer valid; and
removing the active connection identifier which is determined to no longer be valid from said list of active connection identifiers.

42. The non-transitory computer readable medium of claim 41, wherein said step of determining if said active connection identifier is no longer valid includes processing a connection termination signal corresponding to the communications device to which said active connection identifier also corresponds.

43. An apparatus comprising:
a processor configured to:
update a list of active connection identifiers to include a first active connection identifier corresponding to a second communications device from which a first paging signal was received, said list of active connection identifiers listing connection identifiers of communications devices from which said first communications device has received a paging signal or sent a paging signal;
update said list of active connection identifiers to include a second active connection identifier corresponding to a third communications device to which said first communications device transmitted a second paging signal; monitor a traffic control resource during a traffic interval for a traffic request signal corresponding to at least one active connection identifier included in said list of active connection identifiers; and
determine if said active connection identifier is no longer valid includes detecting expiration of a time out trigger, said time out trigger being a function of signals sent to the communications device corresponding to said active connection identifier or received from said communication device correspond to said active connection identifier.

44. The apparatus of claim 43, wherein said processor is further configured to:
determine that an active connection identifier is no longer valid; and
remove the active connection identifier which is determined to no longer be valid from said list of active connection identifiers.

45. The apparatus of claim 44, wherein said processor is further configured to process a connection termination signal corresponding to the communications device to which said active connection identifier also corresponds as part of determining if said active connection identifier is no longer valid.

46. The apparatus of claim 43, wherein said processor is further configured to: monitor to detect for the presence of a predetermined waveform on said traffic control resource as part of monitoring a traffic control resource, said predetermined waveform being a function of at least one connection identifier included in said list.

* * * * *